(12) United States Patent
Khalid et al.

(10) Patent No.: US 11,108,585 B2
(45) Date of Patent: Aug. 31, 2021

(54) SYSTEMS AND METHODS FOR WIRELESS MONITORING AND CONTROL OF POOL CHEMICAL CONTROLLERS

(71) Applicant: Pentair Water Pool and Spa, Inc., Cary, NC (US)

(72) Inventors: Hassan Khalid, Greenfield, WI (US); Micheal Pasche, Sharon, WI (US); Brian Broga, Elkhorn, WI (US); Robert Westphal, Lake Geneva, WI (US); Brian Boothe, Raleigh, NC (US)

(73) Assignee: Pentair Water Pool and Spa, Inc., Cary, NC (US)

( * ) Notice: Subject to any disclaimer, the term of this patent is extended or adjusted under 35 U.S.C. 154(b) by 0 days.

(21) Appl. No.: 16/250,882

(22) Filed: Jan. 17, 2019

(65) Prior Publication Data
US 2019/0158307 A1 May 23, 2019

Related U.S. Application Data

(63) Continuation of application No. 15/380,628, filed on Dec. 15, 2016, now abandoned.
(Continued)

(51) Int. Cl.
*H04L 12/28* (2006.01)
*H04W 4/80* (2018.01)
*H04W 88/16* (2009.01)

(52) U.S. Cl.
CPC .......... *H04L 12/2818* (2013.01); *H04W 4/80* (2018.02); *H04W 88/16* (2013.01)

(58) Field of Classification Search
CPC ...... H04L 12/2818; H04W 4/80; H04W 88/16
See application file for complete search history.

(56) References Cited

U.S. PATENT DOCUMENTS

| 4,210,533 A | 7/1980 | Astl |
| 4,830,757 A | 5/1989 | Lynch et al. |

(Continued)

FOREIGN PATENT DOCUMENTS

| CN | 204755329 U | 11/2015 |
| CN | 105673467 A | 6/2016 |

(Continued)

*Primary Examiner* — Qun Shen
(74) *Attorney, Agent, or Firm* — Husch Blackwell LLP

(57) ABSTRACT

Embodiments of the invention provide a system for adapting a pool chemical controller for wireless communication. In some embodiments, a system for adapting a pool chemical controller with a serial communication port for communication with a user via a remote server, an internet connection, and internet enabled device is provided, the system comprising: a wireless gateway device connected to a router; and a wireless adapter connected to the serial communication port, comprising: a gateway node; a transceiver; and a processor programmed to: establish a wireless connection with the wireless gateway; receive a first message from the pool chemical controller; cause the gateway node to modify the first message; cause the first modified message to be transmitted to the remote server via the wireless gateway; receive a second message from the remote server; modify the second message for output to the pool chemical controller; and transmit the second modified message to the pool chemical controller.

26 Claims, 47 Drawing Sheets

Related U.S. Application Data

(60) Provisional application No. 62/267,830, filed on Dec. 15, 2015.

(56) References Cited

U.S. PATENT DOCUMENTS

| | | | |
|---|---|---|---|
| 5,002,664 A | 3/1991 | Clack et al. |
| 5,058,032 A | 10/1991 | Farrell et al. |
| 5,492,632 A | 2/1996 | Reber |
| 5,494,573 A | 2/1996 | Schoenmeyr et al. |
| 5,681,482 A | 10/1997 | Reber |
| 5,751,598 A | 5/1998 | Zabinski et al. |
| 5,774,529 A | 6/1998 | Johannsen et al. |
| 5,876,610 A | 3/1999 | Clack et al. |
| 5,895,565 A | 4/1999 | Steininger et al. |
| 6,051,144 A | 4/2000 | Clack et al. |
| 6,096,224 A | 8/2000 | Champie |
| 6,228,255 B1 | 5/2001 | Peterson et al. |
| 6,332,110 B1 | 12/2001 | Wolfe |
| 6,377,171 B1 | 4/2002 | Fewel |
| 6,436,299 B1 | 8/2002 | Baarman et al. |
| 6,453,257 B1 | 9/2002 | Juhasz |
| 6,456,202 B2 | 9/2002 | Johannsen et al. |
| 6,491,828 B1 | 12/2002 | Sivavec et al. |
| 6,529,590 B1 | 3/2003 | Centers |
| 6,553,336 B1 | 4/2003 | Johnson et al. |
| 6,560,543 B2 | 5/2003 | Wolfe et al. |
| 6,575,662 B2 | 6/2003 | French |
| 6,609,070 B1 | 8/2003 | Lueck |
| 6,616,839 B1 | 9/2003 | Peterson et al. |
| 6,625,548 B2 | 9/2003 | Babel |
| 6,670,810 B2 | 12/2003 | Duncan et al. |
| 6,753,186 B2 | 6/2004 | Moskoff |
| 6,822,200 B1 | 11/2004 | Grosch et al. |
| 6,826,267 B2 | 11/2004 | Daum et al. |
| 6,853,291 B1 | 2/2005 | Aisa |
| 6,870,480 B2 | 3/2005 | Suzuki et al. |
| 6,954,701 B2 | 10/2005 | Wolfe |
| 6,992,590 B1 | 1/2006 | Tietsworth et al. |
| 7,014,777 B2 | 3/2006 | Ishikawa et al. |
| 7,104,115 B2 | 9/2006 | Kahn et al. |
| 7,110,920 B2 | 9/2006 | McCarter et al. |
| 7,126,469 B2 | 10/2006 | Fish |
| 7,204,930 B2 | 4/2007 | Nightingale |
| 7,249,000 B2 | 7/2007 | Kahn et al. |
| 7,292,898 B2 | 11/2007 | Clark et al. |
| 7,307,538 B2 | 12/2007 | Kochan, Jr. |
| 7,319,921 B2 | 1/2008 | Underwood et al. |
| 7,364,651 B2 | 4/2008 | Baarman et al. |
| 7,404,926 B2 | 7/2008 | Rhoades |
| 7,409,301 B2 | 8/2008 | Tynkov |
| 7,414,516 B2 | 8/2008 | Yoon et al. |
| 7,424,399 B2 | 9/2008 | Kahn et al. |
| 7,454,295 B2 | 11/2008 | Wolfe |
| 7,497,957 B2 | 3/2009 | Frank |
| 7,683,776 B2 | 3/2010 | Glenn et al. |
| 7,698,073 B2 | 4/2010 | Wolfe |
| 7,758,315 B2 | 7/2010 | Moskun |
| 7,767,093 B2 | 8/2010 | Frank |
| 7,820,059 B2 | 10/2010 | Frank |
| 7,873,699 B2 | 1/2011 | Ha et al. |
| 7,874,808 B2 | 1/2011 | Stiles |
| 7,919,001 B2 | 4/2011 | Haas et al. |
| 7,949,747 B1 | 5/2011 | Van Oosterwijck et al. |
| 7,988,852 B2 | 8/2011 | Duplessis et al. |
| 7,991,490 B2 | 8/2011 | Kargenian |
| 8,090,480 B2 | 1/2012 | Brumfield et al. |
| 8,118,997 B2 | 2/2012 | Ebrom et al. |
| 8,133,385 B2 | 3/2012 | Premathilake et al. |
| 8,137,537 B2 | 3/2012 | Hirata et al. |
| 8,180,489 B2 | 5/2012 | Quinn et al. |
| 8,211,296 B2 | 7/2012 | Angelilli et al. |
| 8,321,039 B2 | 11/2012 | Graves |
| 8,356,628 B2 | 1/2013 | Quinn et al. |
| 8,377,314 B2 | 2/2013 | Frank |
| 8,392,561 B1 | 3/2013 | Dyer et al. |
| 8,417,377 B2 | 4/2013 | Rothschild |
| 8,504,305 B2 | 8/2013 | Wolfe |
| 8,518,262 B2 | 8/2013 | Watkins et al. |
| 8,529,768 B2 | 9/2013 | Chandler, Jr. |
| 8,532,829 B2 | 9/2013 | Haller et al. |
| 8,535,539 B2 | 9/2013 | Chandler, Jr. |
| 8,535,540 B2 | 9/2013 | Chandler, Jr. |
| 8,540,872 B1 | 9/2013 | Ryan et al. |
| 8,577,623 B2 | 11/2013 | Wolfe |
| 8,588,990 B2 | 11/2013 | Caceres et al. |
| 8,599,008 B2 | 12/2013 | Watson et al. |
| 8,702,977 B2 | 4/2014 | Shah et al. |
| 8,754,780 B2 | 6/2014 | Petite et al. |
| 8,758,628 B2 | 6/2014 | Quinn |
| 8,788,090 B2 | 7/2014 | Rothschild |
| 8,805,594 B2 | 8/2014 | Shah et al. |
| 8,920,619 B2 | 12/2014 | Salzer et al. |
| 8,949,075 B2 | 2/2015 | Higgins et al. |
| 8,958,917 B2 | 2/2015 | Wolfe et al. |
| 8,981,930 B2 | 3/2015 | Horstemeyer et al. |
| 9,015,003 B2 | 4/2015 | Wolfe |
| 9,043,032 B2 | 5/2015 | Paragot et al. |
| 9,056,783 B2 | 6/2015 | Wolfe |
| 9,061,224 B2 | 6/2015 | Verdegan et al. |
| 9,069,927 B2 | 6/2015 | Wolfe |
| 9,159,222 B2 | 10/2015 | Chen et al. |
| 9,212,070 B2 | 12/2015 | Chandler, Jr. |
| 9,223,322 B2 | 12/2015 | Dopslaff et al. |
| 9,225,766 B2 | 12/2015 | Philip et al. |
| 9,270,645 B2 | 2/2016 | Dyer et al. |
| 9,360,018 B2 | 6/2016 | Milthers et al. |
| 9,409,110 B2 | 8/2016 | Urmenyi et al. |
| 9,418,541 B2 | 8/2016 | Huang et al. |
| 9,435,325 B2 | 9/2016 | Boeing et al. |
| 9,441,625 B2 | 9/2016 | Schoendorff |
| 9,441,632 B2 | 9/2016 | Bishop et al. |
| 9,453,299 B2 | 9/2016 | Park et al. |
| 9,534,593 B2 | 1/2017 | Cummings et al. |
| 9,714,715 B2 | 7/2017 | Chandler, Jr. et al. |
| 9,800,500 B2 | 10/2017 | West et al. |
| 9,951,451 B2 | 4/2018 | Park et al. |
| 9,970,558 B1 | 5/2018 | Chandler, Jr. et al. |
| 10,011,500 B1 | 7/2018 | Chandler, Jr. et al. |
| 10,012,319 B1 | 7/2018 | Chandler, Jr. et al. |
| 10,552,911 B1* | 2/2020 | Allen ............ G06Q 30/0215 |
| 2001/0015099 A1 | 8/2001 | Blaine |
| 2001/0039465 A1 | 11/2001 | Schultz et al. |
| 2002/0095269 A1 | 7/2002 | Natalini et al. |
| 2003/0066788 A1 | 4/2003 | Wang et al. |
| 2003/0168389 A1 | 9/2003 | Astle et al. |
| 2003/0174070 A1 | 9/2003 | Garrod et al. |
| 2003/0205509 A1 | 11/2003 | Barnes et al. |
| 2003/0236487 A1 | 12/2003 | Knowlton |
| 2004/0238420 A1 | 12/2004 | Oldendorf et al. |
| 2005/0236307 A1 | 10/2005 | Mazurek et al. |
| 2005/0236308 A1 | 10/2005 | Lin |
| 2005/0242013 A1 | 11/2005 | Hunter et al. |
| 2005/0251366 A1 | 11/2005 | Kahn et al. |
| 2005/0263444 A1 | 12/2005 | Baca et al. |
| 2006/0020427 A1 | 1/2006 | Kahn et al. |
| 2006/0078435 A1 | 4/2006 | Burza |
| 2007/0090059 A1 | 4/2007 | Plummer et al. |
| 2007/0119789 A1 | 5/2007 | Layton |
| 2007/0129825 A1* | 6/2007 | Kargenian ............ G16H 40/40 |
| | | 700/83 |
| 2007/0219728 A1 | 9/2007 | Papageorgiou et al. |
| 2008/0039977 A1 | 2/2008 | Clark et al. |
| 2008/0047329 A1 | 2/2008 | Breed |
| 2008/0105620 A1 | 5/2008 | Hicks |
| 2008/0167931 A1* | 7/2008 | Gerstemeier ............ H02J 3/14 |
| | | 705/7.22 |
| 2008/0210315 A1 | 9/2008 | Harrison |
| 2008/0215263 A1 | 9/2008 | Flohr |
| 2008/0229927 A1 | 9/2008 | Singh et al. |
| 2009/0078621 A1 | 3/2009 | Nicolai et al. |
| 2009/0166272 A1 | 7/2009 | Selsdon |
| 2009/0250397 A1 | 10/2009 | Geisen et al. |
| 2010/0096302 A1 | 4/2010 | Astle et al. |
| 2010/0204924 A1 | 8/2010 | Wolfe et al. |

(56) References Cited

U.S. PATENT DOCUMENTS

| | | | |
|---|---|---|---|
| 2010/0305759 A1 | 12/2010 | Paragot et al. | |
| 2010/0332149 A1 | 12/2010 | Scholpp | |
| 2011/0011079 A1* | 1/2011 | Kamen | F02G 1/043 |
| | | | 60/520 |
| 2011/0077875 A1 | 3/2011 | Tran et al. | |
| 2011/0202195 A1 | 8/2011 | Finch et al. | |
| 2011/0210049 A1 | 9/2011 | O'Regan, Jr. | |
| 2011/0284433 A1 | 11/2011 | Shah et al. | |
| 2011/0286859 A1 | 11/2011 | Ortiz et al. | |
| 2011/0307221 A1 | 12/2011 | Higgins et al. | |
| 2011/0311370 A1 | 12/2011 | Sloss et al. | |
| 2012/0074069 A1 | 3/2012 | Ripley et al. | |
| 2012/0078722 A1* | 3/2012 | Van Oosterwijck | |
| | | | G06Q 30/0261 |
| | | | 705/14.58 |
| 2012/0125771 A1 | 5/2012 | Salzer et al. | |
| 2012/0204965 A1 | 8/2012 | Loldj et al. | |
| 2012/0234776 A1 | 9/2012 | Sand | |
| 2012/0259470 A1 | 10/2012 | Nijhawan et al. | |
| 2012/0267318 A1 | 10/2012 | Hatten | |
| 2012/0312756 A1 | 12/2012 | Chandler, Jr. | |
| 2012/0318723 A1 | 12/2012 | Guess | |
| 2013/0009781 A1 | 1/2013 | Wolfe | |
| 2013/0015137 A1 | 1/2013 | Urmenyi et al. | |
| 2013/0062288 A1 | 3/2013 | Spani | |
| 2013/0073611 A1 | 3/2013 | Wolfe | |
| 2013/0079936 A1 | 3/2013 | Cullen et al. | |
| 2013/0092704 A1* | 4/2013 | Tincher | D06F 39/02 |
| | | | 222/1 |
| 2013/0185079 A1 | 7/2013 | Park et al. | |
| 2013/0185786 A1 | 7/2013 | Dyer et al. | |
| 2013/0193041 A1 | 8/2013 | Rhode | |
| 2013/0197700 A1 | 8/2013 | Kochan, Jr. et al. | |
| 2013/0214937 A1 | 8/2013 | Petite et al. | |
| 2013/0221091 A1 | 8/2013 | Koo | |
| 2013/0226752 A1 | 8/2013 | Moriya et al. | |
| 2013/0243614 A1 | 9/2013 | Moon et al. | |
| 2014/0013839 A1 | 1/2014 | Chandler, Jr. | |
| 2014/0067131 A1 | 3/2014 | Park et al. | |
| 2014/0069908 A1 | 3/2014 | Yang et al. | |
| 2014/0091041 A1 | 4/2014 | Nielsen | |
| 2014/0094975 A1 | 4/2014 | Nielsen | |
| 2014/0119947 A1 | 5/2014 | Bishop et al. | |
| 2014/0172322 A1 | 6/2014 | Wolfe | |
| 2014/0266788 A1 | 9/2014 | Bauckman et al. | |
| 2014/0277788 A1* | 9/2014 | Forbes, Jr. | H02J 13/00017 |
| | | | 700/286 |
| 2014/0290181 A1 | 10/2014 | Edwards et al. | |
| 2014/0303791 A1* | 10/2014 | Batchelder | F04B 53/06 |
| | | | 700/281 |
| 2014/0303935 A1 | 10/2014 | Kamel et al. | |
| 2014/0340203 A1 | 11/2014 | Chen et al. | |
| 2014/0373926 A1 | 12/2014 | Jha et al. | |
| 2014/0379302 A1 | 12/2014 | Park | |
| 2015/0014250 A1 | 1/2015 | Volker | |
| 2015/0064021 A1 | 3/2015 | Laing | |
| 2015/0108071 A1 | 4/2015 | Kalh?j et al. | |
| 2015/0134116 A1 | 5/2015 | Li et al. | |
| 2015/0134727 A1 | 5/2015 | Lee et al. | |
| 2015/0147190 A1 | 5/2015 | Cummings et al. | |
| 2015/0219612 A1 | 8/2015 | Wolfe | |
| 2015/0243154 A1 | 8/2015 | Uy | |
| 2015/0244675 A1 | 8/2015 | Dyer et al. | |
| 2015/0271257 A1* | 9/2015 | Abramov | H04L 67/148 |
| | | | 709/222 |
| 2015/0277463 A1 | 10/2015 | Hazzard et al. | |
| 2015/0292763 A1 | 10/2015 | Jung et al. | |
| 2015/0294558 A1 | 10/2015 | Huang et al. | |
| 2015/0322951 A1 | 11/2015 | Bishop et al. | |
| 2015/0343348 A1 | 12/2015 | Morris et al. | |
| 2015/0347683 A1 | 12/2015 | Ansari et al. | |
| 2015/0358364 A1 | 12/2015 | Lee | |
| 2015/0378371 A1 | 12/2015 | Lange et al. | |
| 2015/0379856 A1 | 12/2015 | Glenn et al. | |
| 2016/0015885 A1* | 1/2016 | Pananen | A61M 5/142 |
| | | | 604/111 |
| 2016/0052798 A1* | 2/2016 | Downs | B01J 49/85 |
| | | | 210/742 |
| 2016/0096741 A1 | 4/2016 | Lee et al. | |
| 2016/0108607 A1 | 4/2016 | Weinstein | |
| 2016/0121246 A1 | 5/2016 | Yang et al. | |
| 2016/0229704 A1 | 8/2016 | Bardwell et al. | |
| 2016/0280562 A1 | 9/2016 | Liao et al. | |
| 2016/0292990 A1 | 10/2016 | Pesz et al. | |
| 2016/0358443 A1 | 12/2016 | True | |
| 2016/0373944 A1 | 12/2016 | Jain et al. | |
| 2017/0197854 A1 | 7/2017 | Chandler, Jr. et al. | |
| 2017/0228892 A1 | 8/2017 | Nichol et al. | |
| 2017/0372600 A1* | 12/2017 | Palin | H04L 67/2804 |

FOREIGN PATENT DOCUMENTS

| | | |
|---|---|---|
| CN | 205823599 U | 12/2016 |
| EP | 2706138 A1 | 3/2014 |
| GB | 2465974 A | 6/2010 |
| WO | 9422261 A1 | 9/1994 |
| WO | 2014066687 A3 | 5/2014 |
| WO | 2014124416 A1 | 8/2014 |
| WO | 2016087595 A1 | 6/2016 |
| WO | 2016102021 A1 | 6/2016 |

* cited by examiner

SYSTEMS AND METHODS FOR WIRELESS MONITORING AND CONTROL OF POOL CHEMICAL CONTROLLERS

CROSS-REFERENCE TO RELATED APPLICATIONS

The present application claims priority to U.S. Utility patent application Ser. No. 15/380,628, filed Dec. 15, 2016, and U.S. Provisional Application Ser. No. 62/267,830, filed Dec. 15, 2015, both of which are hereby incorporated by reference in their entirety for all purposes.

BACKGROUND

Multiple devices are used in modern homes to perform a multitude of tasks, including water pumping for homes and pools, as well as devices related to pool or spa maintenance, or heating or freeze protection. These devices operate throughout the day, even when a homeowner is away. Accordingly, when these devices experience a failure or fault, the results can be devastating for the homeowner.

For example, many homes have basements which require the use of sump pumps to prevent flooding. Basement flooding can cause substantial damage and result in substantial costs to the homeowner. Often, multiple sump pumps are used in a household basement to ensure that flooding does not occur. Additionally, the sump pumps are connected to a backup power system, such as a battery backup unit. When power is lost to the home, the battery backup unit can automatically energize the sump pump to prevent water from flooding the basement. However, battery backup units can only operate the sump pumps for a limited amount of time (i.e., until the battery has insufficient charge to continue to power the sump pump). If a homeowner is not home, the battery backup unit can continue to run while the power is out, until the battery is exhausted. Further, even if power is restored to the home, circuits may need to be reset to provide primary power to the sump pump. If the circuit is not reset, the battery backup system can again run until the battery is exhausted. Without notification that the sump pump is being run off of the battery backup system, a homeowner is unable to take actions to ensure that the sump pump remains operational, such as by providing a fully charged battery or resetting the home electrical circuits.

In another example, some homes can rely on well water for the primary water source for the home. This can include drinking and cooking water, as well as water for showers, baths, toilets, and even heat. Thus, a loss of water can be devastating to a number of residential systems. Homes that rely on well water often employ pump control systems to control the pumping of the water from the well to the home. For example, a homeowner may use an IntelliDrive® continuous water pressure system from Sta-Rite by Pentair. Again, if the homeowner is away when the water pumping system experiences a fault, such as loss of power, loss of flow, loss of pressure, etc., no action may be taken until the homeowner returns home to discover the problem. In cold environments, this can result in frozen or burst pipes, or if the water is used for the HVAC system, overheating or component burnout can occur. Further, if the there is a problem in the plumbing that is causing a loss of pressure or flow through the pump, the pump may be damaged if proper flow cannot be achieved.

Further, where a home relies solely on a well for its water supply, any loss of water to the home can be a nuisance, with the potential to cause substantial disruption to the household. These disruptions can often require a homeowner to contact the proper service provider and schedule an appointment for a service technician to come to evaluate the problem. Often, the technician will have to schedule a follow-up time to come back to fix the problem after it is diagnosed. This can result in unnecessary delays and inconvenience to the homeowner, including potential costs associated with not having water, such as temporary relocation.

Additionally, some homeowners have pools or spas on their property. Pools and spas can require a constant flow of water to ensure both clarity and sanitation of the pool or spa. To ensure proper flow and turnover through a filter is achieved, many homeowners use pool pump controllers, such as an IntelliFlow® pool pump and onboard controller from Pentair. These pool controllers can provide status information, as well as possible maintenance information to the homeowner, if the homeowner interfaces with the pool controller. However, homeowners may not check the status of the pump controller until a problem has occurred. Or, if the homeowners are away, a fault in the pool pumping system can cause the pool or spa to fill with algae and other debris if the pumping system is not returned to operation quickly.

Further, even if a homeowner is quickly able to recognize that the pool pumping system is not operating correctly, the homeowner must schedule a service technician to come and evaluate the problem. As discussed above, this can cause delays in correcting or fixing the problem as the technician may need to schedule a second appointment to fix the problem, which may be further delayed due to delivery times of necessary replacement parts.

Pools and spas can also have other operational components, such as chemical dispensers, chlorinators, heaters, and pH controllers. It can be critical to verify operation of these components, especially if they are relied upon to keep a pool or spa clean and sanitary while the homeowners are away from the home for any period of time. Also, delays in fixing the components can require additional work and/or cost on the part of the homeowner to properly maintain their pool and/or spa.

Finally, some homeowners can have additional heating located throughout the home, for example in the floors, to supplement the HVAC system. Further, some homeowners may have heating devices on the exterior of the home, such as on the roof or gutters, to prevent ice from accumulating on those exterior portions of the house. These heaters, along with corresponding interior heaters, such as those used on pipes, can be critical to homeowners located in colder climates. For example, ice or snow buildup on a roof or in residential gutters can result in damage to the home. Additionally, ice buildup in gutters can result in clogs (e.g., ice dams) which could cause flooding either around the home or in the walls of the home itself. This damage can be even more substantial when a homeowner is unaware that the malfunction has occurred. Furthermore, delays associated with scheduling a service technician to evaluate the problem, including potential delays associated with ordering the necessary replacement parts can result in increased risk or additional damage, as well as further inconvenience for the homeowner.

SUMMARY

The subject matter disclosed herein relates generally to wireless communication adaptors for use with residential devices such as residential pumps, pump controllers, heating systems, and pool accessories, as well as other residential devices.

In accordance with some embodiments of the disclosed subject matter, a system for adapting a residential device with a serial communication port for wireless communication with a user via a remote server, an internet connection, and an internet enabled device is provided, the system comprising: a wireless gateway device connected to a router; and a wireless adapter connected to the serial communication port of the residential device, the wireless adapter comprising: a gateway node; a transceiver; and a processor that is programmed to: establish a wireless connection with the wireless gateway device using the transceiver; receive a first message from the residential device; cause the gateway node to modify the first message for transmission to the remote server over a wide area network; cause, using the transceiver, the first modified message to be transmitted to the remote server via the wireless gateway device using the transceiver; receive, using the transceiver, a second message from the remote server via the wireless gateway device and the gateway node; modifying the second message for output to the residential device using the serial communication port; and transmitting the second modified message to the residential device using the serial communication port.

DETAILED DESCRIPTION

Figure 1:
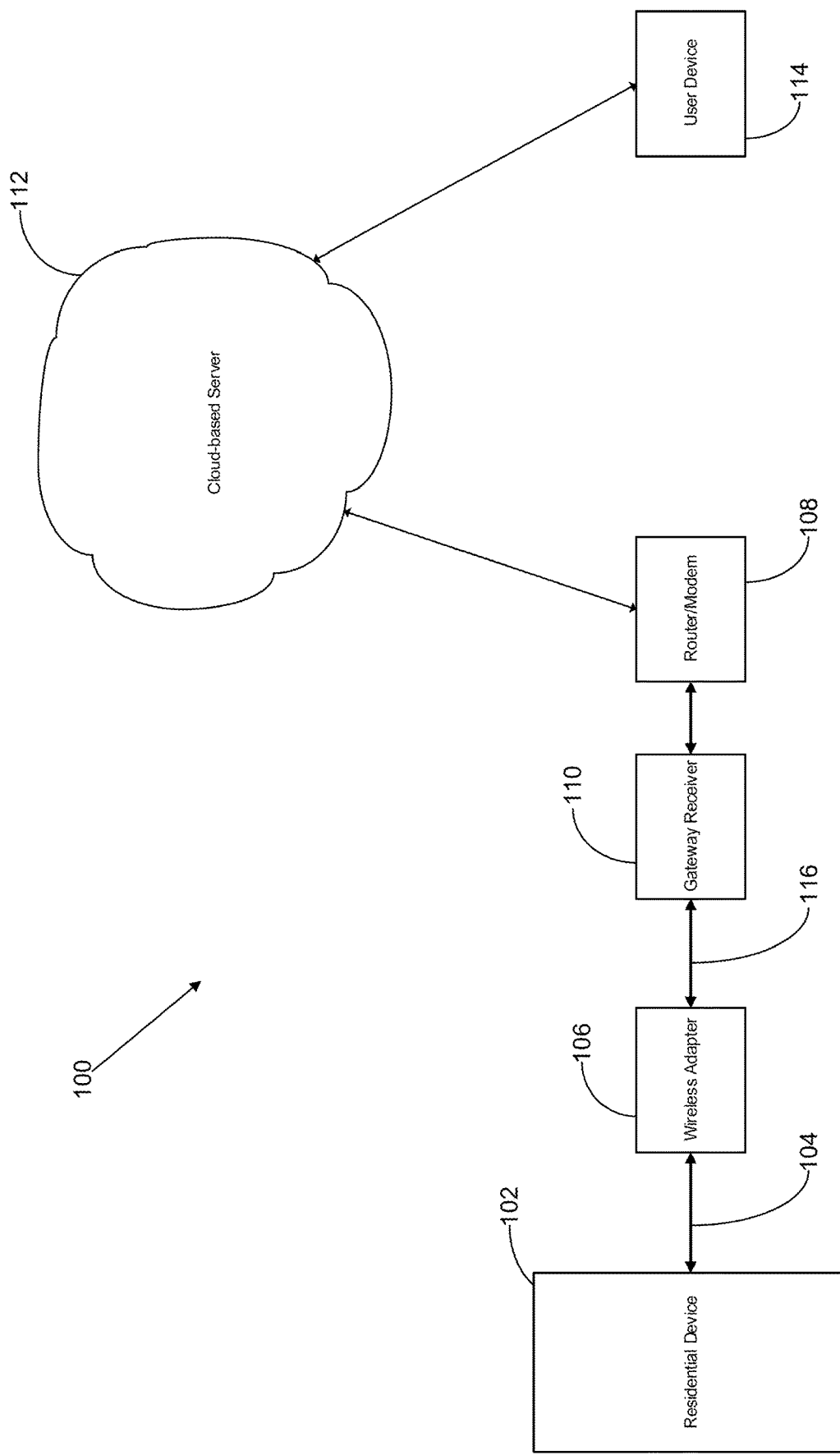
FIG. 1 is a block diagram of a residential control system using a wireless gateway device according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. Skilled artisans will recognize the examples provided herein have many useful alternatives and fall within the scope of embodiments of the invention.

Additionally, while the following discussion may describe features associated specific devices, it is understood that additional devices and or features can be used with the described systems and methods, and that the discussed devices and features are used to provide examples of possible embodiments, without being limited.

FIG. 1 illustrates a wireless monitoring and control system 100 for communicating with a residential device 102. The residential device 102 can be any residential device having a communication port, for example sump pump controllers, residential water pump controllers, pool pump controllers, automated pool controllers, heat trace controllers, floor heating controllers, and other residential devices. Specific examples of residential devices can include the Battery Backup ("BBU") Sump Pump controller from Sta-Rite, as well as IntelliDrive®, IntelliFlow®, and DriverConnect® controllers from Pentair. However, other brands and types of residential devices 102 can be used with the described monitoring and control system 100. In one example, residential devices can include all Pentair® branded residential products or those residential products from subsidiaries of Pentair. Other residential devices 102 can include irrigation pump variable frequency drives and driver controllers, water detectors, level sensors, Penduino® based controllers, universal data collection and components control platforms, etc.

The residential device 102 can have a communication port for transmitting data over a communication line 104. In one embodiment, the residential device 102 can transmit data using a serial RS-485 communication protocol. However, alternative communication protocols, including but not limited to, MODBUS, CAN, DeviceNet, ControlNet, Ethernet TCP/IP, RS-232, Universal Serial Bus (USB), Firewire, or other known communication protocol as applicable. The communication line 104 can provide the transmitted data to a wireless adapter 106. The wireless adapter 106 can provide a communication interface between the residential device 102 and a router/modem 108 via a wireless gateway receiver 110.

The wireless adapter 106 can communicate with the router/modem 108 using the wireless gateway receiver 110. In one embodiment, a link to the wireless gateway link 110 can be a wireless connection 116, such as an RF connection. In one embodiment, the wireless adapter 106 can communicate to the wireless gateway receiver 110 using a 900 MHz connection. Alternatively, the wireless adapter 106 can communicate with the wireless gateway receiver 110 using other wireless communication protocols, such as Wi-FI (802.11x), Bluetooth, Cellular RF (3G, 4G, LTE, etc.), Zigbee Pro, ENOCEAN, WIBUTLER, AFRISO or other suitable wireless communication protocols. In one embodiment, the wireless gateway receiver 110 can be a dedicated device for communicating with the wireless adapter 106. Alternatively, the wireless receiver device 110 can be capable of communicating with multiple wireless adapters. The wireless gateway receiver 110 can communicate with the router/modem 108 using a wired connection. For example, the wireless gateway receiver 110 can communicate with the router/modem 108 using a standard Ethernet (TCP/IP) wired connection.

The router/modem 108 can be a standard, off-the-shelf router and/or modem used for connecting to the Internet. The router/modem 108 can receive the data from the wireless adapter 106 via the wireless gateway receiver 110 and then provide the data to a cloud based server 112 via the Internet. The cloud based server 112 can store the data for later access. In one embodiment, the cloud based server 112 can store the received data in a location associated with the residential device 102. Alternatively, the cloud based server 112 can store the data in a location associated with a given user account associated with the residential device.

A user can access the data stored in the cloud based server 112 using a user device 114. The user device 114 can be any device capable of connecting with the Internet. In one embodiment, the user device 114 is a portable device such as a smartphone (iPhone, Android, Windows Mobile), or a tablet computer (iPad, Microsoft Surface, Amazon Fire, Android, etc.). In one embodiment, a user can install an application on their smartphone or tablet computer allowing them to access the user account associated with the user. Furthermore, the user device 114 can be a computer such as a Windows® based PC or a Mac® computer, although other types of personal computers can also be used. Further, as the user account is located on the cloud based server 112, the user can access their user account from multiple user devices 114, as needed.

A user can set up a user account when the user registers the residential device 102. In some embodiments, a user may have multiple residential devices associated with a given user account. In one embodiment, the user account can provide access to information stored in the cloud based server 112. A user account can contain information about the user, such as contact information (address, e-mail, phone number, etc.), a list of residential devices associated with the user account, maintenance information, secondary contact information, etc. To register the residential device 102, the user can enter information about the residential device 102, such as model numbers, serial numbers, location purchased (online, distributor, big box store, etc.), installer information, etc.

The information provided when registering the residential device 102 can be used to provide analytic information to a distributor and or service provider, as well as the manufacturer of the residential device 102. The provided information can be accessed by customer support personnel, allowing faster and more accurate diagnosis of a given problem, and/or dispatch of replacement parts and/or service personnel.

Figure 2:
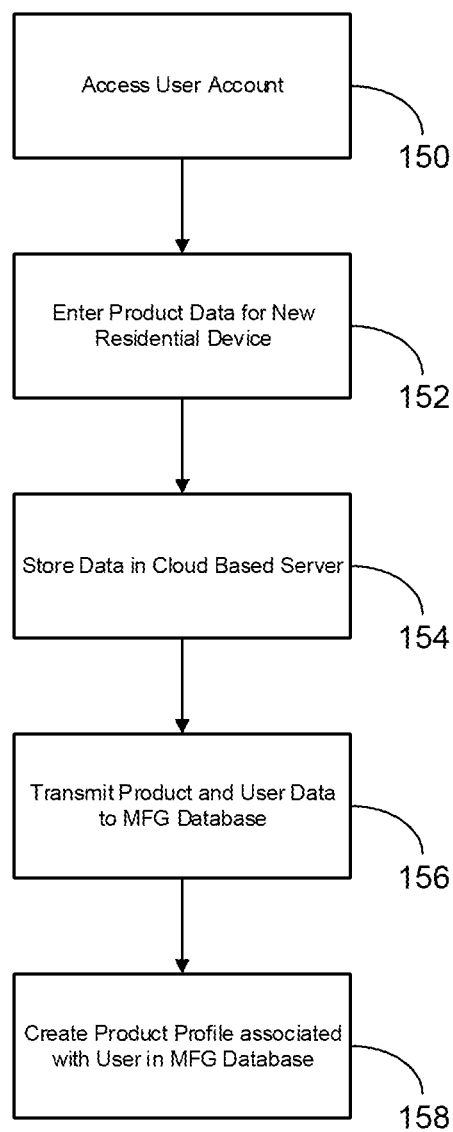
FIG. 2 is a flow chart illustrating a method for providing analytic data to a central repository.

FIG. 2 shows a process of providing information to a central repository for analysis. In process block 150 a user can access their user account. At process block 152, the user can enter data about a residential device 102. In one embodiment, the product data can include information such as the model number, serial number, sizing (HP, kW, voltage rating, etc.), and/or options or accessories installed on the residential device 102. Further, the product data can include purchase information, such as purchase location (distributor, store, previous owner, etc.), price, date of sale, salesperson(s), and/or warranty information. The product data can also include installation/application data. For example, the product data can include installation location data, loading data, network/IP addresses for networked devices, interfaces to other residential devices, parameter settings, etc. In one embodiment, the information able to be input by the user can be limited by the type of residential device. Once the user has entered all of the relevant data, the product data can be stored in a cloud based server at process block 154. Storing the data in a cloud based server can allow a user to access the product data from any internet connected device.

Once the data is stored in the cloud based server, the data can then be transmitted to a manufacturer's database at process block 156. The manufacturer's database can be a database maintained by the manufacturer of the residential device. Alternatively, the manufacture's database could be a database associated with an Original Equipment Manufacturer ("OEM"), a distributor, an outside marketing firm, etc. In one embodiment, both the product data and data associated with the user can be transmitted to the manufacturer's database. At process block 158, a product profile can be created. The product profile can associate the product data with information about the user. Additionally, the product data can be used to provide analytic data to the manufacturer. The analytic data can allow the manufacturer to monitor sales. For example, the analytic data can allow the manufacturer to track sales data with regards to distributors, stores, online sales, and re-sales, as well as tracking sales data by location/region, customer demographic, etc. Additionally, the product profile can be used to provide accurate and prompt customer service by providing detailed information about the installation of the product to a customer server technician/professional. In addition to providing installation data, the product profile can allow the customer service technician/professional to see distributor, warranty, and geographic location information for the residential device. This can allow the technician/professional to quickly determine how to send service personnel, if required. Additionally, the technician/professional can check replacement part inventory at the local distributor and arrange for parts to be quickly routed to the proper distributor to reduce delays in repairing the residential device.

Figure 3:
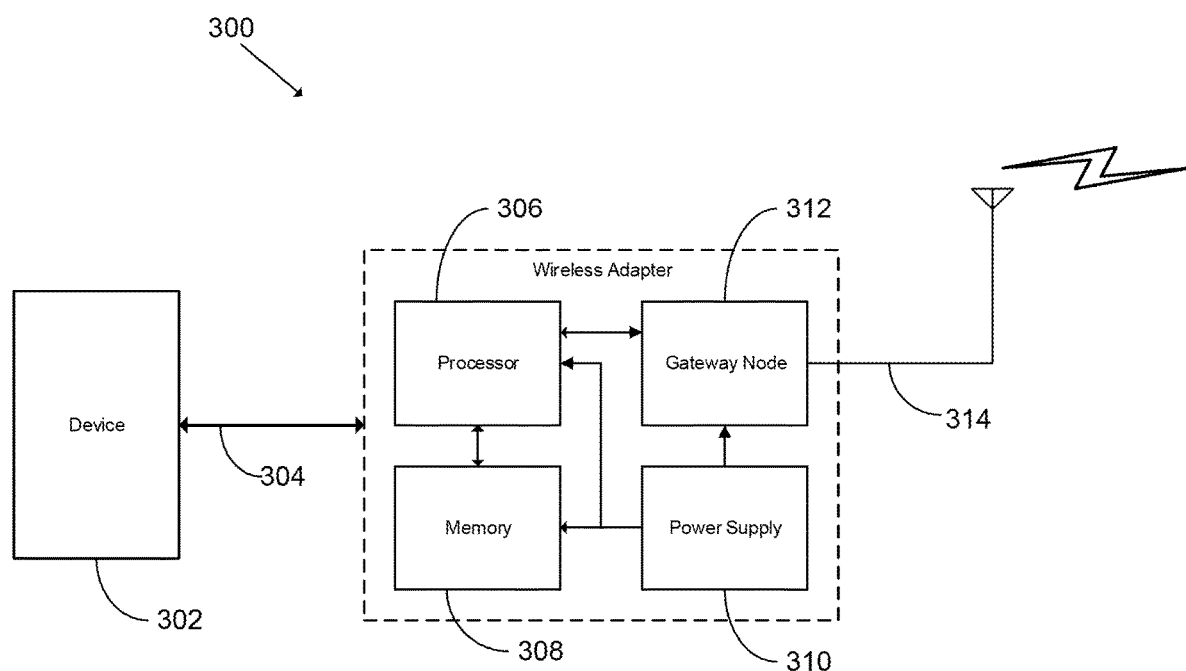
FIG. 3 is a block diagram of a wireless adapter.

FIG. 3 illustrates a system view of a wireless adapter 300. The wireless adapter 300 can be connected to a residential device 302. The residential device 302 can communicate via communication line 304. In one embodiment, communication line 304 is a RS-485 communication line. Alternatively, communication line 304 can be a CAN based communication line, a MODBUS, a DeviceNet communication line, a ControlNet communication line, an Ethernet TCP/IP communication line, a USB communication line, a serial (e.g., RS-232) communication line, or another suitable communication line. The wireless adapter 300 can include a processor 306, a memory device 308, a power supply 310, a gateway node 312, and a transceiver 314.

The processor 306 can receive data from the residential device 302 via the communication line 304. Alternatively, the processor 306 can transmit data to the residential device 302 via the communication line 304. The processor 306 can be an Intel® based processor. Alternatively, the processor can be a programmable logic device ("PLD"), an Application Specific Integrated Circuit ("ASIC"), a PIC controller, or another suitable processing device. The processor 306 can be in communication with the memory device 308. The memory device 308 can be a non-transitory storage medium such as a RAM or ROM type memory. Alternatively, the memory device can be a solid state drive ("SSD").

The power supply 310 can be in electronic communication with the processor 306, the memory 308, and the gateway node 312. In one embodiment, a single power supply 310 can supply power to the processor 306, the memory device 308, and the gateway node 312. Alternatively, multiple power supplies 310 may be required to achieve multiple voltage and/or power levels. In one embodiment, the power supply 310 can be a 5V, 300 mA power supply. In some examples, the power supply 310 can be internal to the wireless adapter 300. Alternatively, the power supply 310 can be external to the wireless adapter, such as a "wall wart" type power supply. Further, a combination of internal and external power supplies 310 can be used where multiple voltage levels are required.

The gateway node 312 can be in communication with the processor 306. In one embodiment, the processor 306 can convert the data received from the residential device 302 into a format readable by the gateway node 312. Further, the processor 306 can translate data received by the gateway node 312 into data readable by the residential device 302. In one embodiment, the gateway node 312 can be a U17-2018 from Arrayent. The gateway node 312 can translate data received from the processor 306 for transmission to the Internet. In one embodiment, the gateway node 312 can translate the data into a data packet for transmission to a wireless gateway receiver over a wireless connection, such as a 900 MHz wireless connection. Further, the gateway node 312 can translate the data for transmission into data packets for Wi-Fi, ZigBee, or Z-Wave local area networks. Once the gateway node 312 has translated the data as required, the gateway node can transmit the data via transceiver 314. In one embodiment, the transceiver 314 is a wireless RF transceiver for transmitting and receiving data using an RF signal. For example, the transceiver 314 can transmit or receive using a 900 MHz RF signal. In other embodiments, the transceiver 314 can transmit and receive using other wireless protocols such as Wi-Fi, ZigBee, Z-Wave, Bluetooth or cellular (3G, 4G, LTE, etc.). Alternatively, the transceiver 314 can be a wired transceiver, such as for communicating over an Ethernet cable. In one embodiment, the gateway node 312 can transmit data to a cloud based server via the transceiver 314. For example, the transceiver can be used to communicate with a wireless gateway receiver (e.g., wireless gateway receiver 110), which can access the cloud based server via the Internet. Further, the transceiver 314 can also be a receiver for receiving data. For example, the transceiver can receive data from the cloud based server via a wireless gateway receiver (e.g., the wireless gateway receiver 110). The gateway node 312 can translate data received from the transceiver 314 into a format readable by the processor 306.

Figure 4:
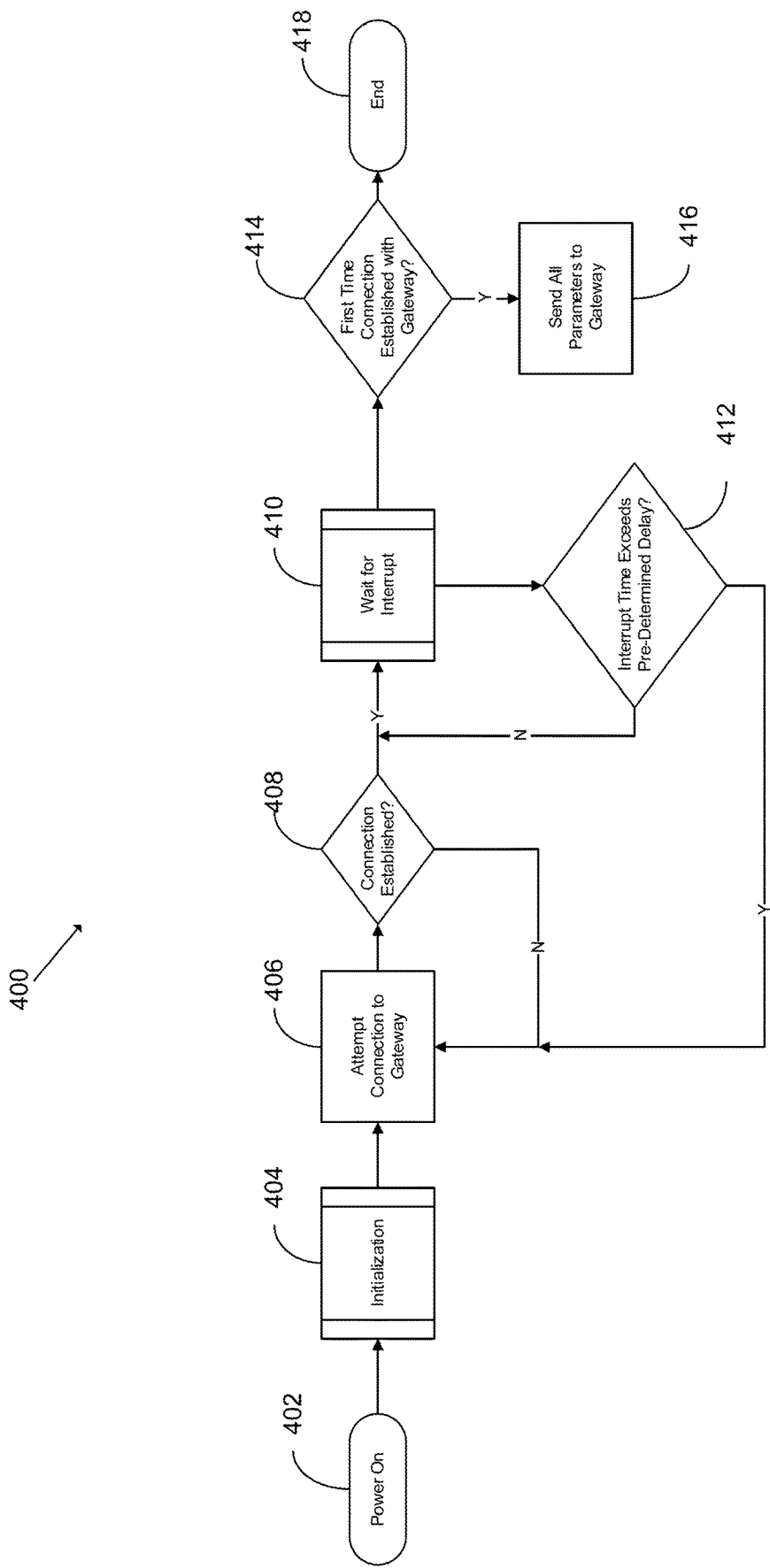
FIG. 4 is a flow chart for a process for establishing an initial connection between a wireless adapter and a wireless gateway according to one embodiment of the invention.

FIG. 4 illustrates a process 400 for establishing an initial connection between the wireless adapter 106 and the wireless gateway receiver 110. At process block 402, power can be applied to the wireless adapter 106. After power is applied, the wireless adapter 106 can perform an initialization process at process block 404. After the initialization process is complete, the wireless adapter 106 can attempt to connect to the wireless gateway 110 at process block 406. In one embodiment, proprietary communication protocols can be used to establish connection between the wireless adapter 106 and the wireless gateway 110, such as those from Arrayent. The process 400 can determine if a connection is established between the wireless adapter 106 and the gateway receiver 110 at process block 408. If the connection is not established at process block 408, the wireless adapter 106 can return to process block 406 to again attempt to connect to the wireless gateway 110 at process block 406. In one embodiment, the wireless adapter 106 can attempt to establish a connection to the wireless gateway 110 for a predetermined number of attempts. For example, the wireless adapter 106 can attempt to establish a connection to the wireless gateway 110 five times in a row before initiating a fault. Alternatively, the wireless adapter 106 may attempt to establish a connection with the wireless gateway 110 for a predetermined period of time. In one embodiment, the predetermined period of time can be about one minute. If the wireless adapter 106 is unable to establish a connection to the wireless gateway 110 within the predetermined period of time, the wireless adapter 106 can initiate a fault. In one example, the wireless adapter 106 can attempt to establish a connection to the wireless gateway 110 after a predetermined period of time after a connection fault is initiated. In one embodiment, the predetermined period of time can be one minute.

If the connection is established at process block 408, the wireless adapter 106 can wait to receive an interrupt from the wireless gateway 110 at process block 410. At process block 412, the wireless adapter 106 can determine if the wait for the interrupt from the wireless gateway 110 has exceeded a predetermined period of time. In one example the predetermined period of time can be 100 ms. If the wireless adapter 106 has not received the interrupt from the wireless gateway 110 before the expiration of the predetermined period of time, the wireless adapter 106 can continue to wait for the interrupt at process block 410. If the wireless adapter 106 has not received the interrupt by the expiration of the predetermined period of time, the wireless adapter 106 can return to process block 406 to attempt to connect to the wireless gateway 110.

Once the interrupt is received at process block 410, the wireless adapter 106 can determine if this is the first time a connection has been established with the gateway receiver 110 at process block 414. In one embodiment, the wireless adapter 106 can determine if it is the first connection to the wireless gateway 110 by accessing a memory device to determine if any flags have been set indicating a previous connection to the wireless gateway 110. Alternatively, other data present in the memory device may be able to be accessed by wireless adapter 106 to determine if a previous connection had been made to the wireless gateway 110. If the wireless adapter 106 determines that this is the first connection to wireless gateway 110 at process block 414, the wireless adapter 106 can send all parameters associated with the residential device 302 to the wireless gateway 110, which the wireless gateway 110 can then transmit to the cloud based server 112 at process block 416. If the wireless adapter 106 determines that this is not the first established connection with the wireless gateway 110, the initial connection process 400 is completed at process block 418.

Figure 5:
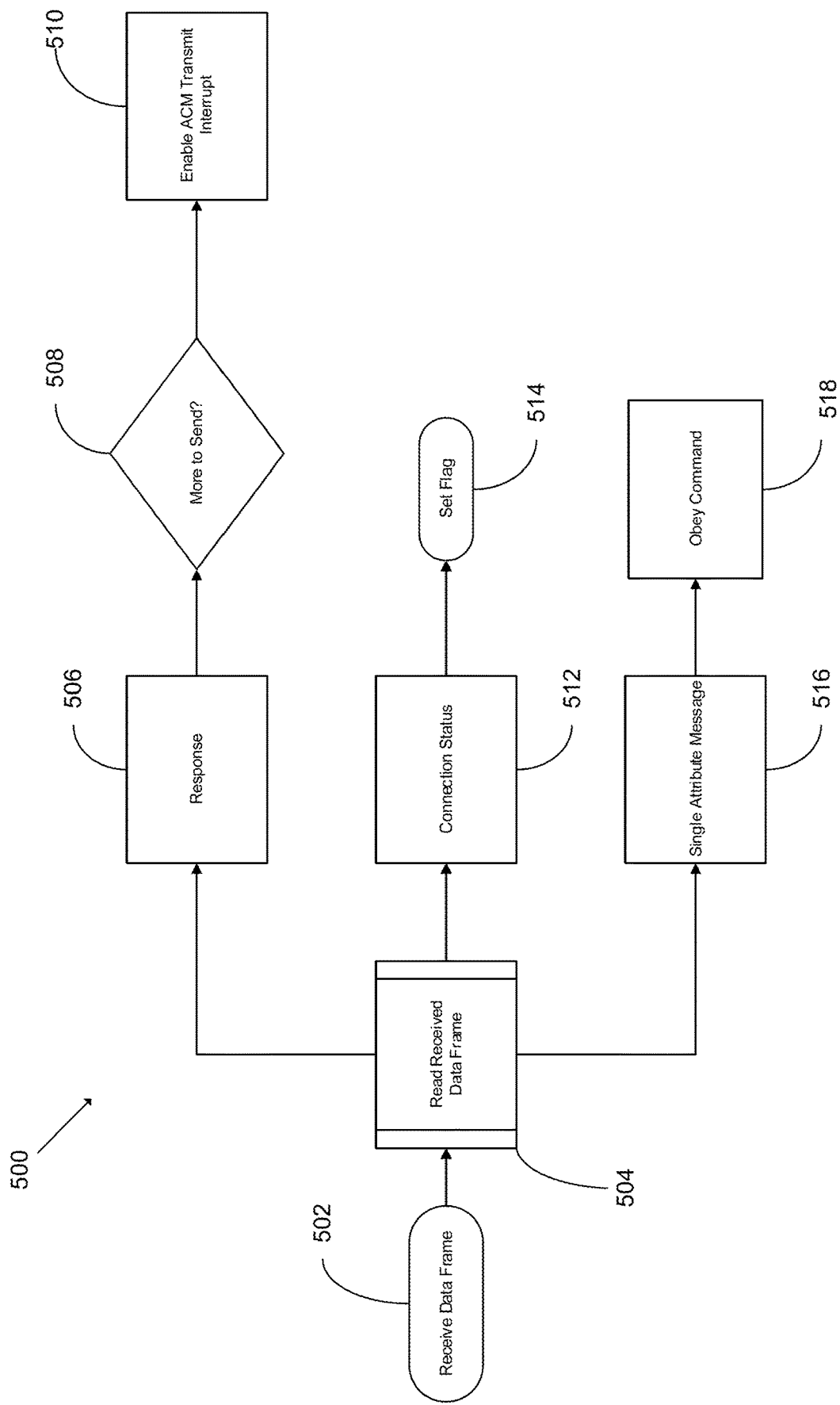
FIG. 5 is a flow chart for a process for reading data received from a wireless gateway.

FIG. 5 illustrates a process for reading data from the wireless gateway 110. At process block 502, the wireless adapter 106 can receive a message from the wireless gateway 110. In one embodiment, the message can be encoded as a data frame readable by the wireless adapter 106. At process block 504, the wireless adapter 106 can read the received message. The wireless adapter 106, upon reading the received message, can further determine what type of message was received. In some embodiments, the wireless adapter 106 can determine if a correct checksum was contained within the received message. If the checksum is incorrect, the wireless adapter 106 can disregard the received message. Example message types can include a response message, a connection status message, and a single attribute message. While response, connection status, and single attribute messages are discussed below, other suitable message types are available as well. If the message is a response message, the wireless adapter 106 can read the response message at process block 506. A response message can be used by a low-level communication handler of the wireless adapter 106 to acknowledge that the wireless gateway 110 received a message. At process block 508, the wireless adapter 106 can evaluate if there is additional data required to be sent to the wireless gateway 110. If no more data is required to be sent to the wireless gateway 110, the process can end. If more data is required to be sent, a transmit interrupt in the wireless adapter 106 can be enabled, allowing a further data packet to be sent to the wireless gateway 110.

If the message is determined to be a connection status, the wireless adapter 106 can read the connection status message at process block 512. A connection status message can allow the wireless adapter to determine if there is a connection problem with the wireless gateway 110. For example, if the wireless gateway 110 loses the connection to the cloud based server 112, the wireless gateway 110 can relay that message to the wireless adapter 106. If there is a connection status problem, such as lost communication, the wireless adapter can set a flag at process block 514. In some embodiments, the wireless adapter 106 may have an indicator to provide notice to a user that there is a communication issue. For example, the wireless adapter 106 may have an LED which can be activated to alert a user to the status of the connection to the cloud based server 112. For example, the LED can be activated when the connection to the cloud based server 112 is established. As another example, the LED can be activated when the connection to the cloud based server 112 cannot be established (and/or has become disconnected). As yet another example, a first LED (e.g., a yellow LED) can be activated when the wireless adapter is attempting to establish the connection to the cloud based server 112, a second LED (e.g., a green LED) can be activated when the connection to the cloud based server 112 is established, and a third LED (e.g., a red LED) can be activated when the connection to the cloud based server 112 cannot be established or has become disconnected. As another example, the LED can be activated using different patterns to indicate a status (e.g., blinking can indicate an attempt to establish a connection, continuous activation can indicate that a connection has been established, etc.). In one embodiment, setting the flag at process block 514 can activate the indicator on the wireless adapter 106.

If the message is determined to be a single attribute message, the wireless adapter 106 can read the connection status message at process block 516. A single attribute message can be used to give commands to the wireless adapter 106, which can then be passed to the residential device 102. Commands can include updating a firmware of the wireless adapter 106 or residential device 102, operational commands (start, stop, etc.), requests for data/parameters, etc. Once the single attribute message is read at process block 516, the command within the single attribute message can be obeyed at process block 518.

Figure 6:
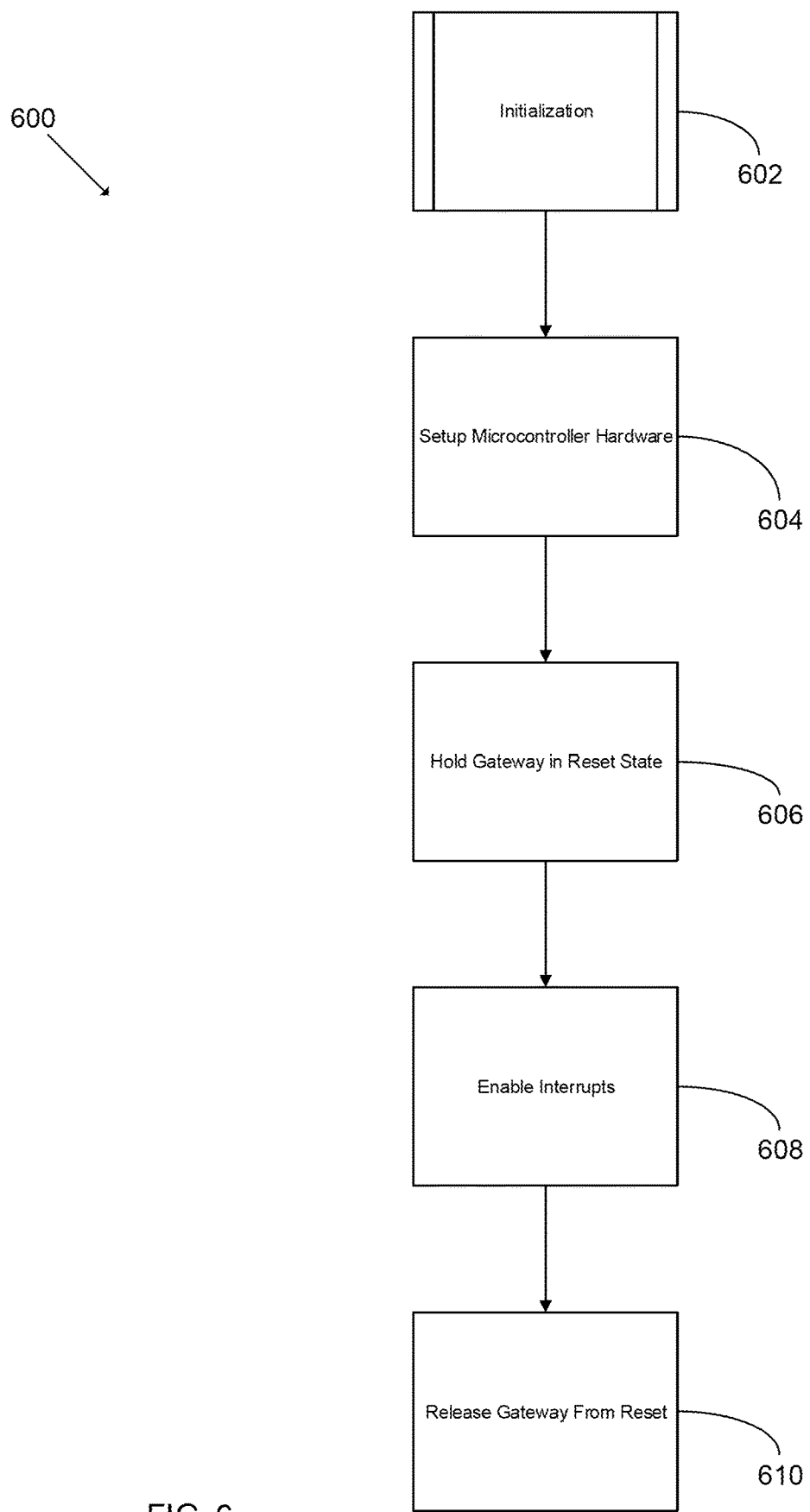
FIG. 6 is a flow chart for an initialization process for a wireless gateway.

FIG. 6 illustrates an initialization process 600 for the wireless gateway 110. In one embodiment, the initialization process 600 in FIG. 6 is a detailed view of the initialization process 404 illustrated in FIG. 4. However, the initialization process 404 can use other methodologies or processes and is not limited to the example of FIG. 6. Returning to FIG. 6, the initialization process 600 can be initiated at process block 602. The initialization process 600 can then setup the wireless adapter 106 at process block 604. The wireless adapter 106 can include the processor 306, the memory device 308, and the power supply 310 as shown in FIG. 3. However, the wireless adapter 106 can include more or fewer components than those shown in FIG. 3, as discussed above.

After the controller hardware has been set up at process block 604, the initialization process 600 can proceed to process block 606 and hold the wireless gateway 110 in a reset state. Once the wireless gateway 110 is in the reset state, the initialization process 600 can enable interrupts in the wireless gateway 110 at process block 608. Once the interrupts have been enabled, the initialization process 600 can proceed to release the wireless gateway 110 from reset at process block 610.

Figure 7:
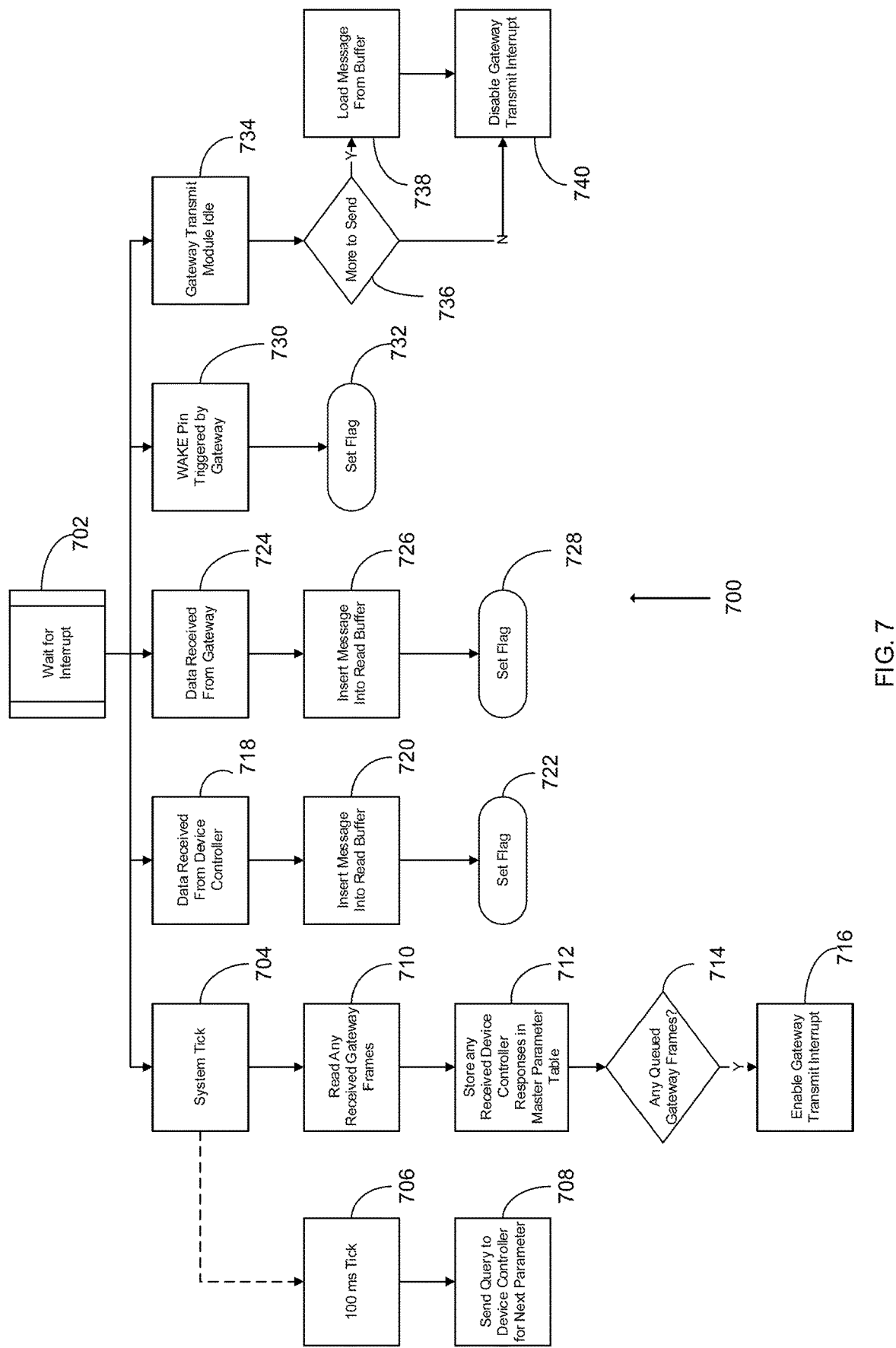
FIG. 7 is a flow chart for a state process for processing data in a wireless adapter.

FIG. 7 illustrates a steady state process 700 for processing data in the wireless adapter 106. At process block 702, the wireless adapter 106 can wait for an interrupt. In one embodiment, the interrupt can be triggered when the wireless adapter 106 receives a message. Further, the interrupt can be triggered when the wireless adapter 106 receives a polling signal from the residential device 102. At process block 704, the wireless adapter 106 can perform a system tick. In one embodiment, the system tick can be one or more timing periods associated with transmitting and/or receiving messages from the wireless adapter 106 and/or the wireless gateway 110. At process block 706, the wireless adapter 106 can use a 100 millisecond tick to query the residential device 102. In some embodiments, a tick of more than 100 milliseconds or less than 100 milliseconds can be used. The wireless adapter 106 can transmit a tick at 100 millisecond intervals in perpetuity to request parameters values from the residential device 102. At process block 708, the wireless adapter can query the residential device 102 to request a parameter at the expiration of the 100 millisecond tick. In some embodiments, the wireless adapter 106 can request a single parameter value for every 100 millisecond tick. Further, the wireless adapter 106 can then cycle through multiple parameters, each being request individually at 100 millisecond intervals. After all parameters have been requested, the wireless adapter can start the cycle from the beginning, in perpetuity.

Returning now to process block 704, the wireless adapter can perform a system tick. The system tick can be a pre-set value designed into the wireless adapter. Alternatively, a user can set the system tick interval. After the system tick has completed, the wireless adapter can ready any data frames received from the wireless gateway 110 at process block 710. At process block 712, the wireless adapter 106 can store any received data responses from the residential device 102 in a master parameter table. At process block 714, the wireless adapter 106 can determine if there are any queued data frames to be transmitted to the wireless gateway 110. For example, if the wireless gateway 110 requests parameters from the residential device, the response can be queued within the wireless adapter 106 for later transmission. If the wireless adapter determines that there is a queued data frame to be transmitted to the wireless gateway 110 at process block 714, the wireless adapter 106 can enable the wireless gateway transmission interrupt, which can allow the wireless adapter 106 to transmit data to the wireless gateway 110 at process block 716.

At process block 718, the wireless adapter 106 can determine if data was received from the residential device 102. The data received from the residential device 102 can then be stored into a read buffer at process block 720. After the data is stored in the read buffer, the wireless adapter 106 can set a flag to indicate that data was received from the residential device 102 at process block 722.

At process block 724, the wireless adapter 106 can determine if data was received from the wireless gateway 110. The data received from the wireless gateway 110 can then be stored into a read buffer at process block 726. After the data is stored in the read buffer, the wireless adapter 106 can set a flag to indicate that the data was received from the wireless gateway 110 at process block 728.

At process block 730, the wireless gateway 110 can transmit a signal to the wireless adapter 106 to trigger a "Wake" input. In some examples, if there is no communication request from the wireless gateway 110 for a period of time, the wireless adapter 106 can enter a "sleep" mode with regards to wireless transmission. Accordingly, in some instances, the wireless gateway 110 can first transmit a signal to tell the wireless adapter 106 to exit the sleep mode and prepare to receive a transmission. Once the wake input has been triggered at process block 730, a flag can be set in the wireless adapter 106 indicating that the wake input has been triggered at process block 732. In some embodiments, the wireless adapter 106 can transmit that the flag has been set to the wireless gateway 110.

At process block 734, the wireless gateway 110 can be idle. In some embodiments, the wireless gateway 110 can transmit a signal to the wireless adapter 106 indicating that the wireless gateway 110 will be going idle. At process block 736, the wireless adapter 106 can determine if there is more information required to be transmitted to the wireless gateway 110. If the wireless adapter 106 determines that more information is required to be sent to the wireless gateway 110, the data to be transmitted can be loaded from a data buffer at process block 738, and the gateway transmit interrupt can be disabled at process block 740. If the wireless adapter 106 determines that there is no more data to be transmitted, the gateway transmit interrupt can be disabled at process block 740.

Figure 8:
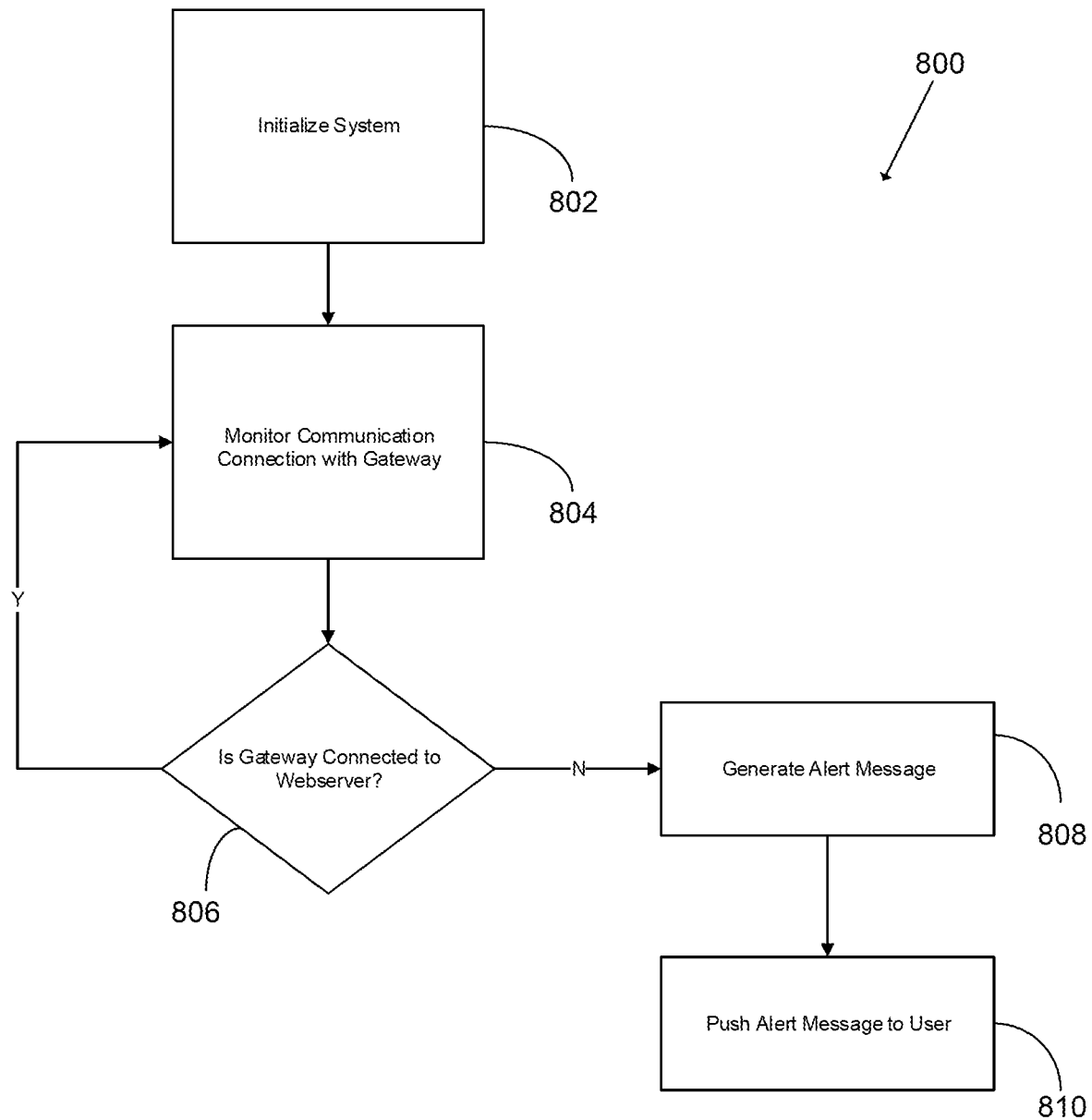
FIG. 8 is a flow chart of a process for alerting a user when there is a loss of communication.

FIG. 8 illustrates a loss of communication process 800. In a typical application, the wireless adapter 106 maintains communication between a cloud based server 112 and a residential device 102 via the wireless gateway 110. Verification of a communication link between the cloud based server 112 and the wireless adapter 106 can be required for certain applications. In process 800, the system is initialized at process block 802. Once the system is initialized, the cloud based server 112 can monitor the communication link with the wireless adapter 106 at process block 804. In one embodiment, the cloud based server can, at given intervals, transmit a heartbeat signal to wireless adapter 106 and wait for a corresponding response within a given period of time. Alternatively, the cloud based server 112 can monitor for a heartbeat signal from the wireless adapter 106 at given intervals. When either no response is received from the wireless adapter 106, or no heartbeat signal is received from the wireless adapter 106, after a given period of time, the cloud based server 112 can determine if the wireless adapter 106 is connected to the cloud based server 112 at process block 806. If the cloud based server 112 confirms that the wireless adapter 106 is still connected, the cloud based server 112 will continue to monitor the connection with the wireless adapter 106 at process block 804. Where the cloud based server 112 determines that communication has been lost to the wireless adapter 106, the cloud based server 112 can generate an alert message at process block 808. The alert message can then be pushed to a user at process block 810.

In one embodiment, an alert message is pushed to the user associated with a user account that is associated with the residential device 102 coupled to the wireless adapter 106. In one example, the alert message can be pushed to a user's portable internet connected device, such as a cell phone. For example, the message can be pushed to the user using a text message (e.g., SMS, MMS, iMessage, etc.). As another example, the alert message can be pushed to the user via e-mail. As yet another example, the alert message can be pushed to the user via a push notification associated with an application installed on one or more devices associated with the user (e.g., a smartphone, a tablet computer, etc.). Further methods of pushing the alert message to the user can include calling a user's cellular phone and providing the alert message to the user using an automated voice message, etc.

Sump Pump Control

The following paragraphs are directed to the use of a wireless adapter device to provide for wireless access to pump controllers, and specifically pump controllers directed to sump pumps and backup sump pump controllers. For example, the battery backup sump pump control system can be a Hydromatic® battery backup sump pump system from Pentair. However, any battery backup sump pump control system with a communication port capable of communicating with a wireless adapter as discussed above can be used.

Figure 9:
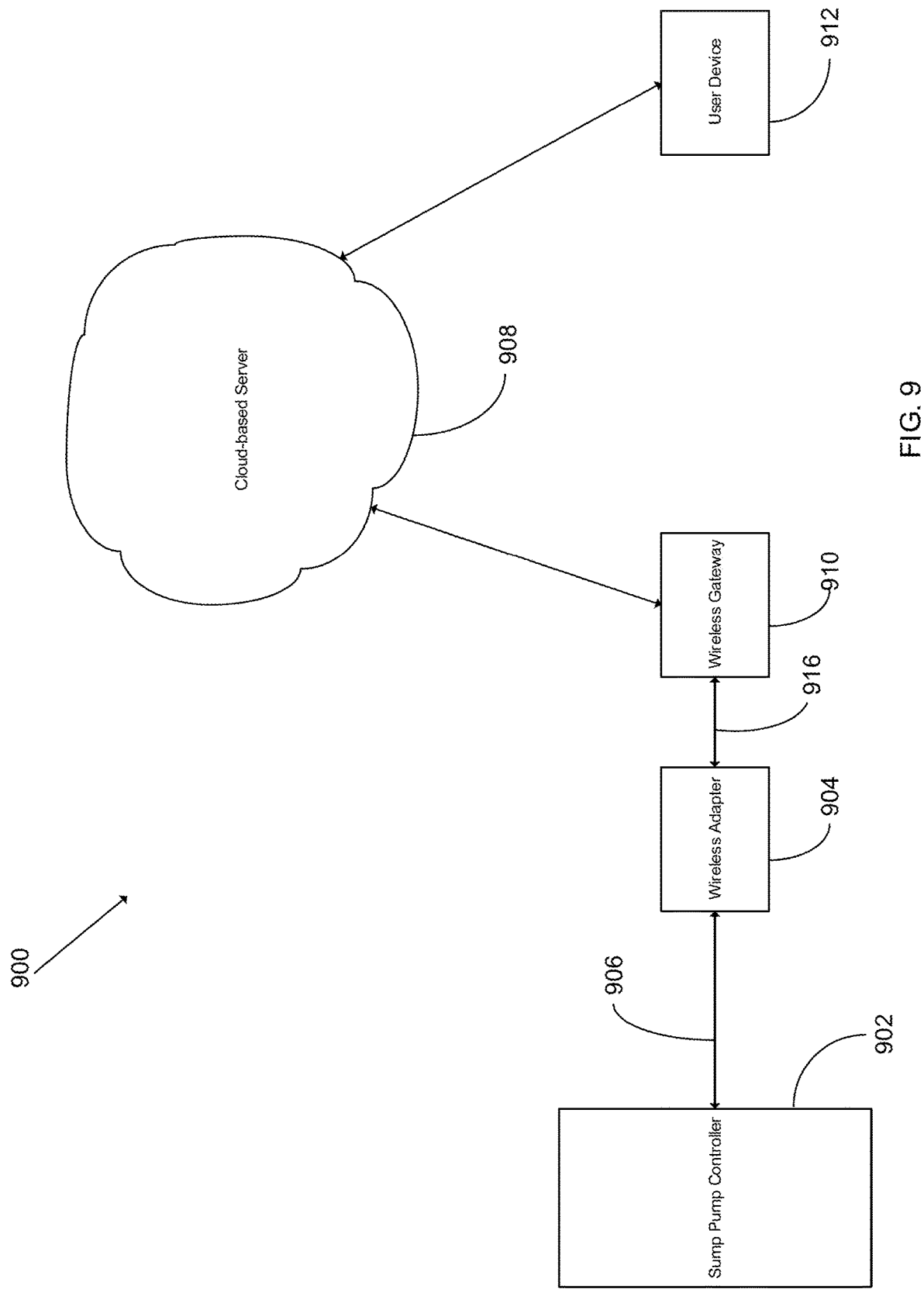
FIG. 9 is a block diagram of a battery backup sump pump communication system.

FIG. 9 illustrates a battery backup sump pump communication system 900. A battery backup sump pump controller 902, as discussed above, can be in communication with a wireless adapter 904 via communication line 906. In one embodiment, the wireless adapter 904 can be a wireless adapter as discussed above. The wireless adapter 904 can communicate with a cloud based server 908 via wireless gateway 910 using a wireless connection 916. In one embodiment, the wireless gateway 910 communicates with the cloud based server 908 via an internet connection. In some embodiments, the wireless gateway 910 can connect to the Internet via a router and/or modem. The cloud based server 908 can be in communication with one or more user devices 912.

Figure 10:
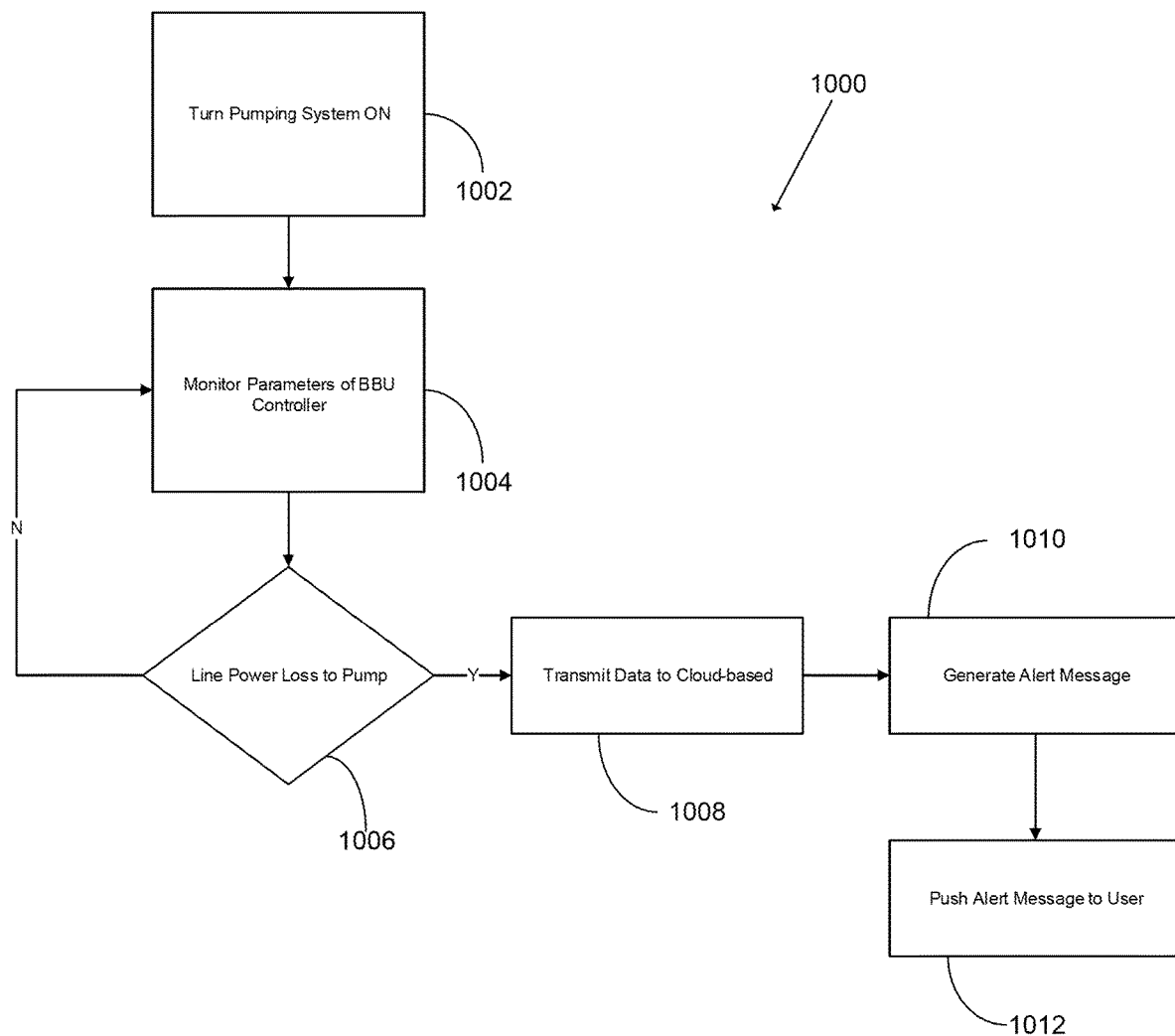
FIG. 10 is a flow chart for a battery backup sump pump activation alert process.

FIG. 10 illustrates a battery backup activation alert process 1000. At process block 1002, a battery backup sump pump control system 902 can be turned on. At process block 1004, the wireless adapter 904 can monitor parameters associated with the battery back up sump pump control system 902. At process block 1006, the wireless adapter 904 can determine if the line power has been lost to the backup sump pump control system 902. Alternatively, the wireless adapter 904 can determine if the battery backup sump pump control system 902 has activated a battery backup sump pump, indicating that line power has been lost. If line power has not been lost to the battery backup sump pump control system 902, the wireless adapter 904 continues to monitor the parameters of the battery backup sump pump control system 902 at process block 1004. If a loss of line power is detected at process block 1006, the wireless adapter 904 can transmit data to the cloud based server 908 indicating a loss of line power at process block 1008. The cloud based server 908 can then generate an alert message at process block 1010. The cloud based server 908 can push an alert message to a user device 912 at process block 1012. In one embodiment, the cloud based server 908 can push an alert message to a user's internet connected device 912 using methods discussed above. The alert message can inform the user that line power has been lost and that the battery back-up pump control system 902 is activated.

Figure 11:
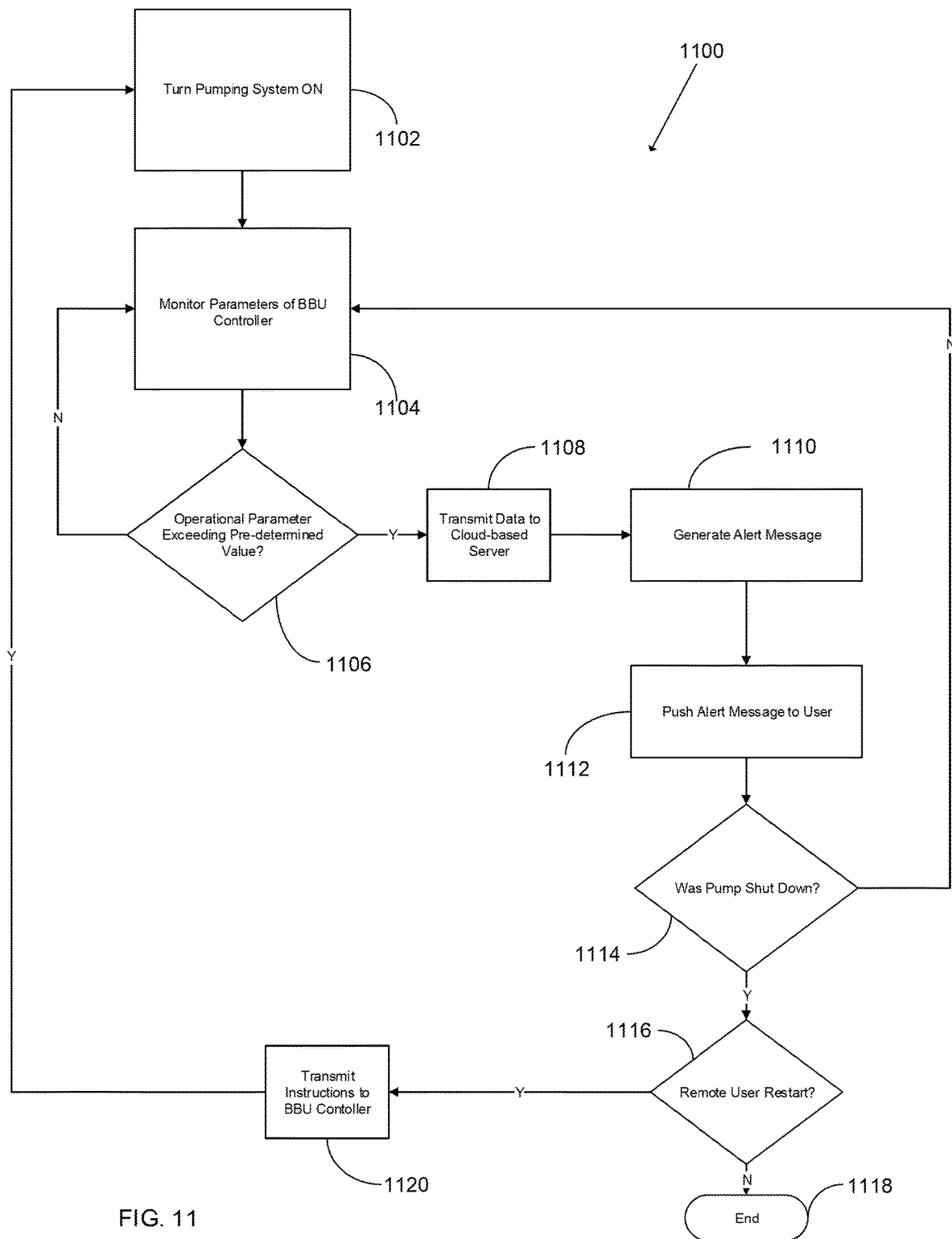
FIG. 11 is a flow chart for monitoring and control process for a battery backup sump pump control system.

FIG. 11 illustrates a monitoring and control process 1100 for a battery backup sump pump control system 902. At process block 1102, the battery backup sump pump control system 902 can be turned on. At process block 1104, the wireless adapter 904 can monitor parameters associated with the battery backup sump pump control system 902. Examples of parameters can include operational status (active, line power run, battery power run), battery level, battery level low, pump operating time, etc., as well as fault conditions or flags. At process block 1106, the wireless adapter 904 can determine if any of the parameters exceed predetermined values. In one embodiment, the predetermined values can be set by the user; alternatively, the predetermined values can be set within the battery backup sump pump controller 902 at the factory. In a further embodiment, the wireless adapter 904 can determine if any fault condition parameters have been generated by the battery backup sump pump control system 902 at process block 1106. If no parameters exceed the predetermined values at process block 1106, the process 1100 returns to process block 1104 and continues to monitor parameters associated with the battery backup sump pump controller 902. If a parameter is determined to exceed a predetermined value at process block 1106, the wireless adapter 904 can transmit data to the cloud based server 908 indicating that one or more parameters have exceeded a predetermined value at process block 1108. The cloud based server 908 can then generate an alert message at process block 1110. The cloud based server 908 can push the alert message to a user device 912 at process block 1112. In one embodiment, the cloud based server 908 can push an alert message to a user's internet connected device 912 using methods discussed above. Examples of alerts that can be pushed to the user device 912 can include low battery, critically low battery, loss of battery power, loss of communication, high-water alarm, etc.

At process block 1114, the wireless adapter 904 can determine if the battery backup sump pump was shut down. In one example, the battery backup sump pump can be shut down when certain parameters are exceeded, such as battery level, pump motor run time, control system temperature, etc. If the battery backup sump pump was not shut down, the wireless adapter 904 can continue to monitor the parameters associated with the battery backup controller 902. When the battery backup sump pump has been shut down, a further alert message can be relayed to the user device 912, indicating that the battery backup sump pump is not currently operating. At process block 1116, the wireless adapter can determine if a remote user restart has been initiated. If no remote user restart has been initiated, the process 1100 ends at process block 1118. If a remote user restart has been initiated, the wireless adapter 904 can transmit instructions to the battery backup sump pump control system 904 at process block 1120 to turn the battery backup sump pump on. The battery backup sump pump control system 902 can then turn on the battery backup sump pump at process block 1102.

In one embodiment, a user can be presented with an option to restart the battery backup sump pump on the user device 912. The user can be presented with an option to restart the battery backup sump pump anytime the battery backup sump pump is shut down. Alternatively, the wireless adapter 904 can only provide the option to the user device 912 to restart the battery backup sump pump based on the parameter that caused the shutdown. For example, the option to restart the battery backup sump pump may not be available when the parameter that exceeded the predetermined value indicates an electrical short or ground fault. In a further embodiment, the wireless adapter 904 can continuously monitor the parameters associated with the battery backup sump pump control system 902 and provide a user with an option to restart the battery backup sump pump when the parameter associated with the battery backup sump pump system no longer exceed the predetermined values. For example, if the battery backup sump pump was shut down due to a parameter associated with the temperature parameter exceeding a predetermined value, the wireless adapter 904 can provide the user with the option to restart the battery backup sump pump when the parameter associated with the temperature of the battery backup sump pump control system 902 falls below the predetermined value. In a further embodiment, the option to restart the battery backup sump pump can always be provided on the user device 912 when the battery backup sump pump has been shut down. When a user then attempts to restart the battery backup sump pump, the wireless adapter 904 can first determine if a restart is possible based on the reason for the shutdown. If it is not, the wireless adapter 904 can have an alert pushed to the user device 912 indicating that remote restart is not available. In some embodiments, the wireless adapter 904 can further push a message to the user device 912 explaining why a remote reset of the battery backup sump pump is not currently available.

Figure 12:
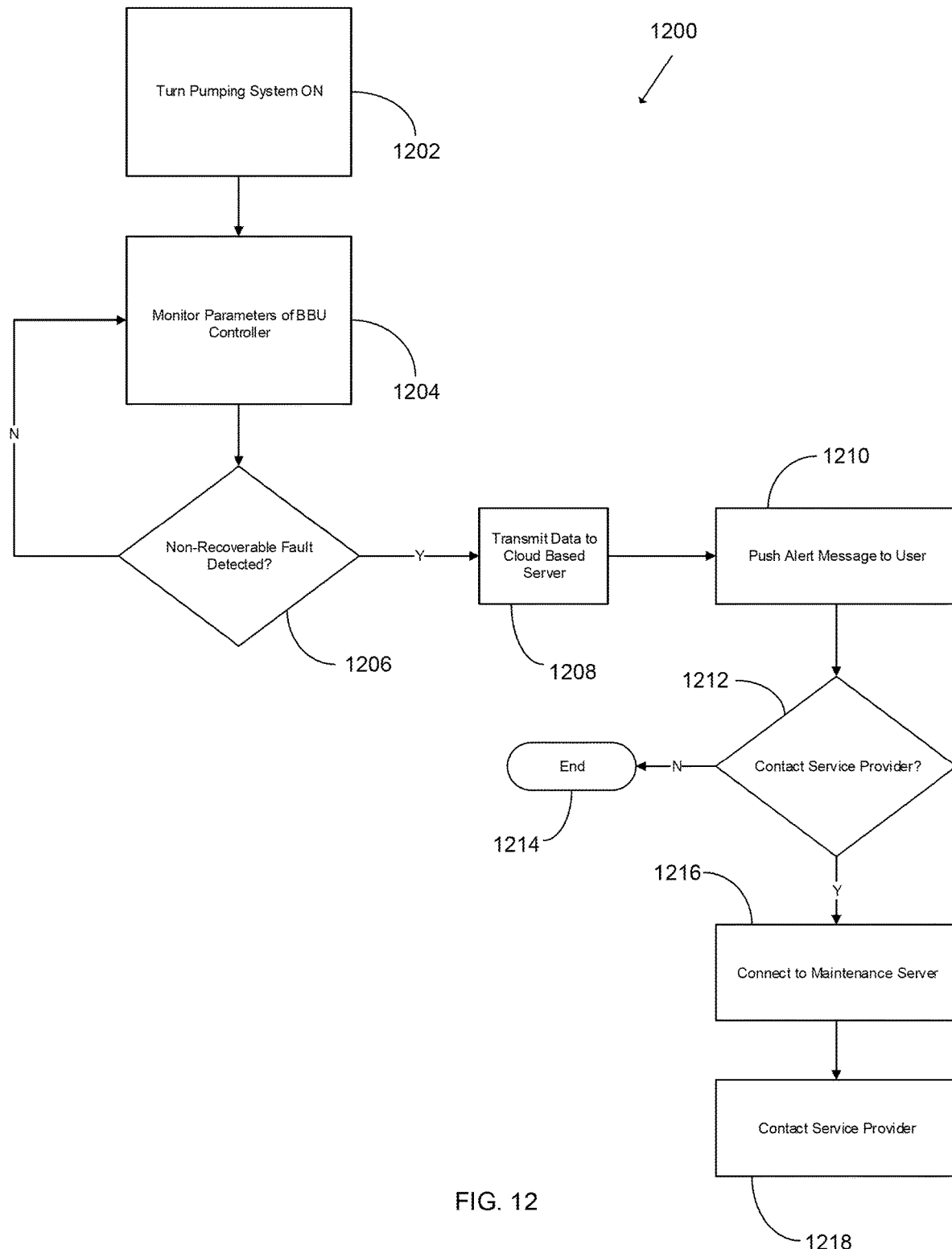
FIG. 12 is a flow chart for service provider alert process.

FIG. 12 illustrates a service provider alert process 1200. At process block 1202, the battery backup sump pump controller 902 can be turned on. At process block 1204, the wireless adapter 904 can monitor parameters associated with the battery backup sump pump controller 902. Examples of parameters can include operational status (active, line power run, battery power run), battery level, battery level low, pump operating time, etc., as well as fault conditions or flags. At process block 1206, the wireless adapter 904 can determine if a nonrecoverable fault condition has been detected. Examples of nonrecoverable fault conditions can include ground faults, over-voltage, over-current, short circuit, no-flow, loss of communication, etc. If a nonrecoverable fault condition is not detected, the wireless adapter 904 can continue to monitor the parameters associated with the battery backup pump control system at process block 1204. Where a nonrecoverable fault is detected, the wireless adapter 904 can transmit the fault data to the cloud based server 908 at process block 1208. The cloud based server 908 can then push an alert message to a user device 912 to inform the user of the nonrecoverable fault at process block 1210. In one embodiment, the alert message can inform a user that maintenance is required.

At process block 1212, the user device 912 can provide the user with an option to contact a service provider. In one embodiment, the user device 912 can receive a message from the cloud based server 908 to provide the user with the option to contact a service provider. Alternatively, the user device 912 can automatically provide the option to contact a service provider when the user device 912 receives the message from the cloud based server indicating the nonrecoverable fault has occurred. If the user does not choose to contact a service provider at process block 1212, the process can end at process block 1214. If the user does choose to contact a service provider, a connection can be made to a maintenance server at process block 1216. In one embodiment, the maintenance server can be located in the cloud based server 908. Alternatively, the maintenance server can be in a separate cloud based server. Further, the maintenance server can be the cloud based server 908. In one embodiment, the user device 912 can establish a connection with the maintenance server directly. Alternatively, the user device 912 can transmit a message to the cloud based server 908 indicating that the user has selected to contact the service provider. The cloud based server 908 can then access the maintenance server.

In one embodiment, the maintenance server can contain contact information for service providers authorized to provide maintenance to the battery backup sump pump controller 902. The maintenance server can have access to a user profile of the user and/or the product registration data provided by the user, such as discussed above. Alternatively, information from the user profile and/or product registration can be provided to the maintenance server via the cloud based server 908. Using the information contained in the user profile and/or product registration data, the maintenance server can filter the possible service providers based on product data (make, model, installation, years in service, etc.) as well as user data (geographic location, usual distributor, past maintenance, etc.). This can allow for the proper service provider to be contacted, which can allow for more efficient product repair.

In a further embodiment, parameters associated with the nonrecoverable fault can be analyzed in the cloud based server 908. The cloud based server 908 can analyze the parameters associated with the fault and provide the analysis to the maintenance server. Based on the analysis, the maintenance server can create a list of materials needed to perform the maintenance. Examples of potential replacement parts can include a new battery where the fault indicates a fault with the battery, a pump and/or motor where the fault indicates pump or motor failure, as well as sensors, valves (e.g., check valves), etc. Further, if there is sufficient data regarding the installation of the product, additional replacement parts can be automatically obtained. For example, certain repairs can require new plumbing fittings, such as pipes, elbows, couplers, reducers, etc. If a complete bill of material (BOM) is available to the cloud based server 908 regarding the initial installation of the battery backup sump pump system, the cloud based 908 server can analyze the BOM and determine which additional parts may be needed. Additionally, in some embodiments, the maintenance server can have access to stock levels of replacement parts on hand for the service providers. Once the proper service provider is determined, the maintenance server can evaluate the stock list of the relevant service provider to determine if there is sufficient stock to perform the needed repair. If not, the maintenance server can place an order for the replacement parts needed to perform the repair. For example, the maintenance server can order the replacement parts from other service providers. Further, the maintenance server can order the parts from a distributor or dealer. Finally, in some instances, the maintenance server can order the parts directly from the manufacturer. In some embodiment, the maintenance server can automatically order the replacement parts once the user chooses to contact a service provider. Alternatively, the cloud based server 908 can push a message to the user device 912 requiring the user to approve any orders. In some examples, the maintenance server can provide an actual or estimated cost of the required replacement parts that can be provided to the user. Further, the maintenance server can wait until authorization is provided from the service provider before any replacement parts are issued.

At process block 1218, the service provider can be contacted. In one embodiment, the maintenance and/or cloud based server 908 can contact the service provider. The maintenance and/or cloud based server 908 can contact the service provider in various ways. In one example, an electronic message can be transmitted to the service provider regarding the maintenance issue. Examples of electronic messages can include text messages (SMS, MMS, etc.), e-mail, instant message, etc. Further, the maintenance and/or cloud based server 908 can contact the service provider by using an automated voice message. The messages provided to the service provider can include information relating to the contact information and address of the user, the nature of the problem, the fault and associated parameters, historical data (previous service performed, faults received over time, etc.), and/or the list of expected replacement parts. Further, in some embodiments, the user can be presented with a questionnaire when the user chooses to contact the service provider. The questionnaire can allow the user to select best times and methods for contacting the user, and even best times for the service provider to schedule the appointment. In further embodiments, the maintenance and/or cloud based server 908 can have access to a scheduling/work order system of the service provider and can schedule an appointment automatically in the system.

Figure 13:
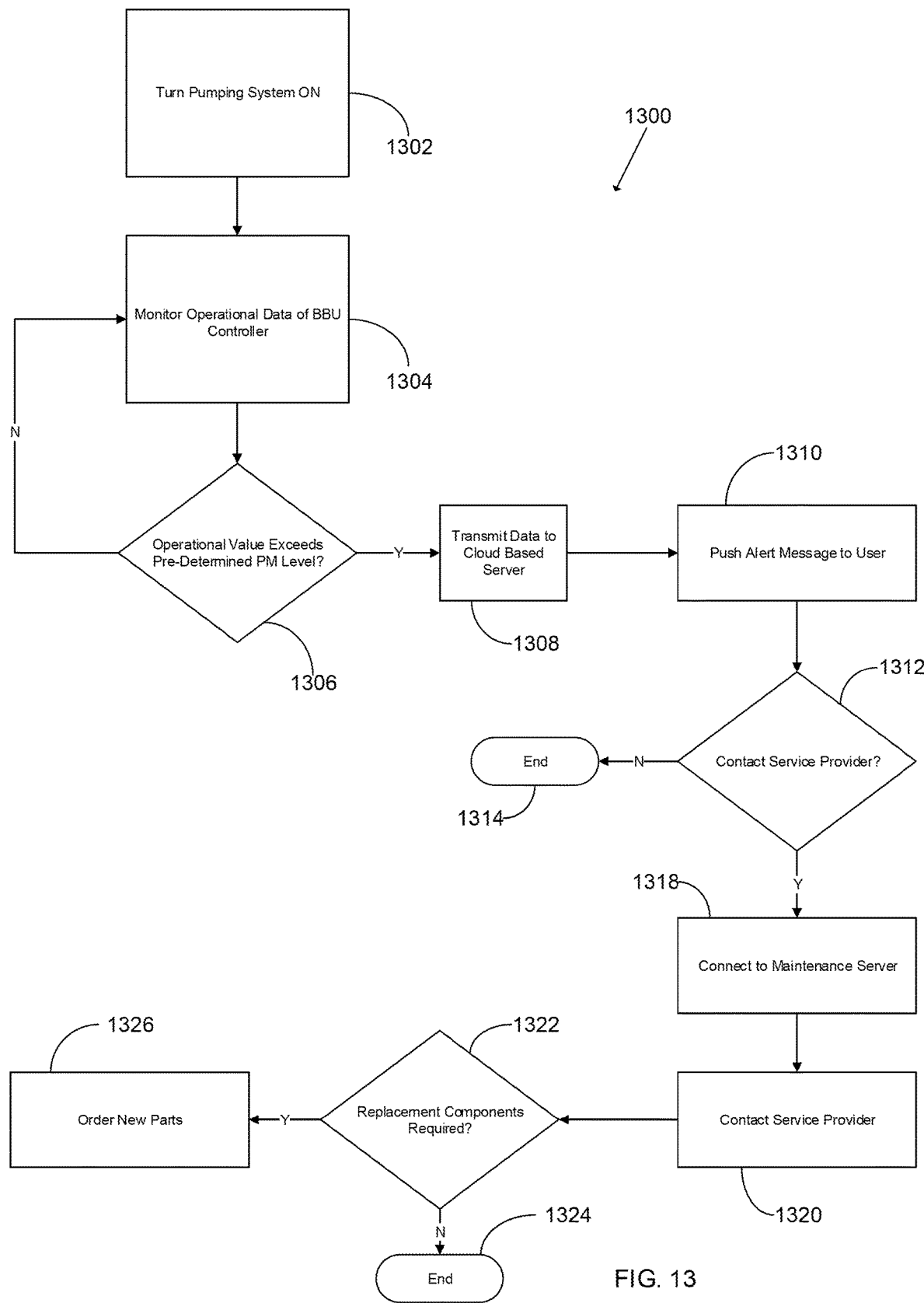
FIG. 13 is a flow chart for preventative maintenance process.

FIG. 13 illustrates a preventative maintenance process 1300. At process block 1302, the battery backup sump pump controller 902 can be turned on. At process block 1304, the wireless adapter 904 can monitor parameters associated with the operation of the battery backup sump pump control system 902. Examples of parameters can include operational status (active, line power operation, battery power operation, etc.), controller temperature, pump temperature, battery level, battery level low, pump operating time, etc., as well as fault conditions and/or flags and historical data relating to fault conditions. At process block 1306, the wireless adapter 904 can determine if any of the parameters exceed predetermined preventative maintenance values. In one embodiment, the predetermined preventative maintenance values can be set by the user; alternatively, the predetermined values can be set within the battery backup sump pump controller 902 at the factory. In a further embodiment, the wireless adapter 904 can determine if any fault condition parameters have been generated by the battery backup sump pump control system 902 at process block 1306 that would be related to the need for preventative maintenance. For example, over-temperature faults, over-voltage/current faults, and under-voltage faults can be indicative of the need for preventative maintenance. If no parameters exceed the predetermined preventative maintenance values at process block 1306, the process 1300 returns to process block 1304 and continues to monitor parameters associated with the battery backup sump pump control system 902. If a parameter is determined to exceed a predetermined preventative maintenance value at process block 1306, the wireless adapter 904 can transmit data to the cloud based server 908 indicating that one or more parameters have exceeded the predetermined preventative maintenance values at process block 1308. The cloud based server 908 can then generate and push an alert message to the user device 912 at process block 1310. In one embodiment, the cloud based server 908 can push an alert message to a user's internet connected device 912 using methods discussed above. In one embodiment, the alert message can inform the user that preventative maintenance is required for the battery backup sump pump controller 902.

At process block 1312, the user can be presented with an option to contact the service provider. In one embodiment, the user can be presented with the option to contact the service provider via the user device 912. In a further embodiment, the user device 912 can receive a message from the cloud based server 908 to provide the user with the option to contact a service provider. Alternatively, the user device 912 can automatically provide the option to contact a service provider when the user device 912 receives the message from the cloud based server indicating one or more of the parameters have exceeded the predetermined preventative maintenance level(s). If the user chooses to not to contact a service provider at process block 1312, the process can end at process block 1314. If the user does choose to contact a service provider, a connection can be made to a maintenance server at process block 1318. In one embodiment, the maintenance server can be located in the cloud based server 908. Alternatively, the maintenance server can be in a separate cloud based server. Further, the maintenance server can be the cloud based server 908. In one embodiment, the user device 912 can establish a connection with the maintenance server directly. Alternatively, the user device 912 can transmit a message to the cloud based server 908 indicating that the user has selected to contact the service provider. The cloud based server 908 can then access the maintenance server to contact the service provider.

At process block 1320 the service provider can be contacted. In one embodiment, the maintenance and/or cloud based server 908 can contact the service provider. The maintenance and/or cloud based server 908 can contact the service provider in various ways. In one example, an electronic message can be transmitted to the service provider regarding the maintenance issue. Examples of electronic messages can include text messages (SMS, MMS, etc.), e-mail, instant message, etc. Further, the maintenance and/or cloud based server 908 can contact the service provider by using an automated voice message. The messages provided to the service provider can include information relating to the contact information and address of the user, the nature of the problem, the fault and associated parameters, historical data (previous service performed, faults received over time, etc.), and/or the list of expected replacement parts. Further, in some embodiments, the user can be presented with a questionnaire when the user chooses to contact the service provider. The questionnaire can allow the user to select best times and methods for contacting the user and best times for the service provider to schedule the appointment. In further embodiments, the maintenance and/or cloud based server 908 can have access to a scheduling/work order system of the service provider, and can schedule an appointment automatically in the system.

At process block 1322, the maintenance and/or cloud based server 908 can analyze the parameters that exceeded the predetermined preventative maintenance values to determine what, if any, replacement components may be required. Based on the analysis, the maintenance server can create a list of materials needed to perform the preventative maintenance. Examples of potential replacement parts can include, a new battery where the fault indicates a fault with the battery, a pump and/or motor where the fault indicates pump or motor failure, as well as sensors, valves (e.g., check valves), where the fault indicates failure of those parts. Further, if there is sufficient data regarding the installation of the product, additional replacement parts can be automatically obtained. For example, certain repairs can require new plumbing fittings such as pipes, elbows, couplers, reducers, etc. If a complete bill of material (BOM) is available to the cloud based server regarding the initial installation of the battery backup sump pump system, the cloud based server can analyze the BOM to determine which additional parts may be needed.

If no replacement parts are needed, the process 1300 can end at process block 1324. However, if the analysis indicates that replacement parts will be needed, the maintenance and/or cloud based server 908 can order the replacement parts at process block 1326. In some embodiments, the maintenance server can have access to stock levels of replacement parts on hand for the service providers. Once the proper service provider is determined, the maintenance server can evaluate the stock list of the relevant service provider to determine if there is sufficient stock to perform the needed repair. If not, the maintenance server can place an order for the replacement parts needed to perform the repair. For example, the maintenance server can order the replacement parts from other service providers. Further, the maintenance server can order the parts from a distributor or dealer. Finally, in some instances, the maintenance server can order the parts directly from the manufacturer. In some embodiment, the maintenance server can automatically order the replacement parts once the user chooses to contact a service provider. Alternatively, the cloud based server 908 can push a message to the user device 912 requiring the user to approve any orders. In some examples, the maintenance server can provide an actual or estimated cost of the required replacement parts that can be provided to the user. Further, the maintenance server can wait until authorization is provided from the service provider before any replacement parts are ordered.

IntelliDrive Control

The following paragraphs are directed to the use of a wireless adapter device to provide wireless access to pump controllers, and specifically, variable speed pump controllers for residential water usage, such as residential properties which rely on well water for their water supply. For example, the variable speed pump controller can be a PENTEK INTELLIDRIVE® variable frequency pump controller from Pentair. However, any variable frequency pump controller with a communication port capable of communicating with a wireless adapter as discussed above can also be used.

Figure 14:
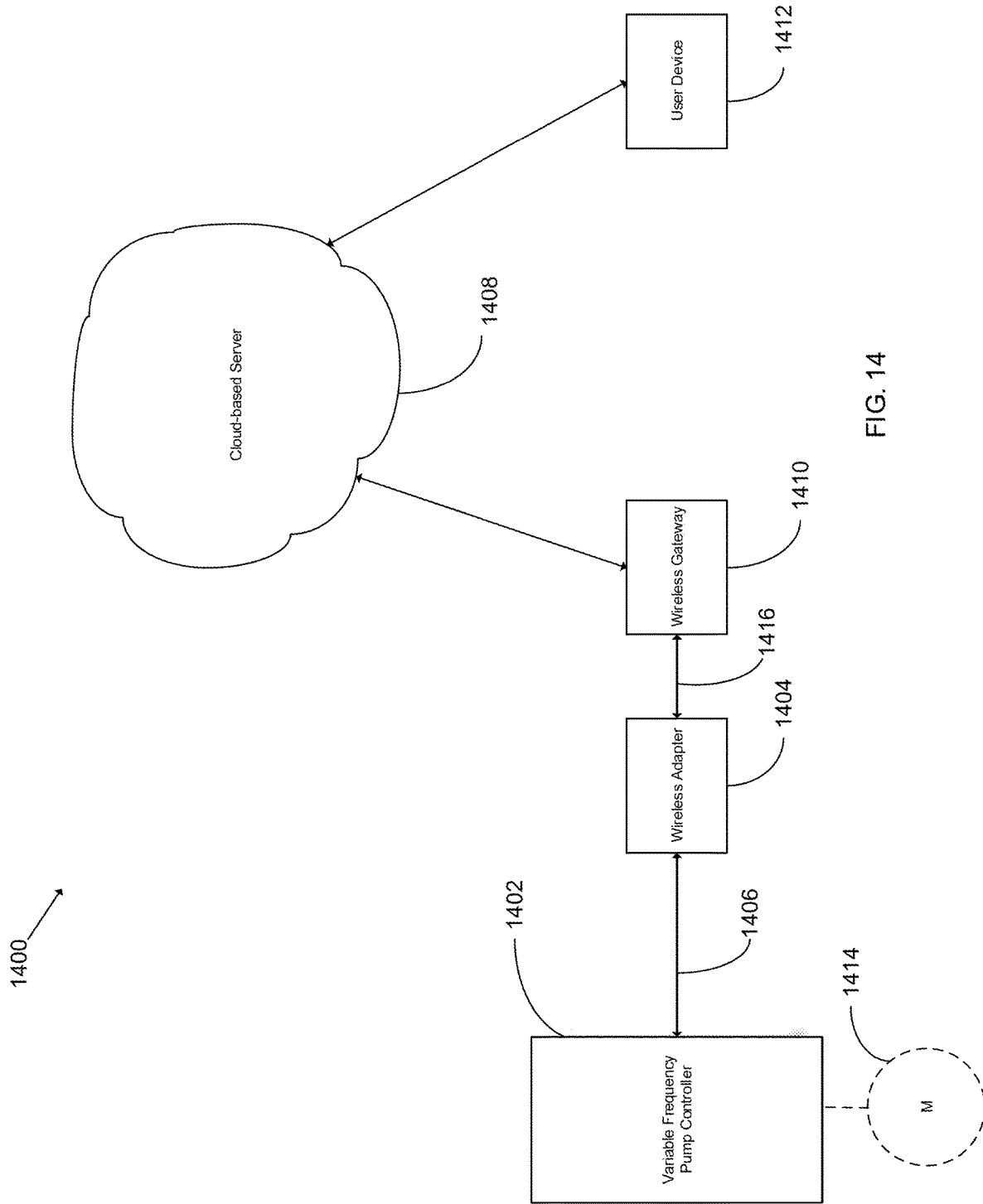
FIG. 14 is a block diagram of a variable frequency pump control system.

FIG. 14 illustrates a variable frequency pump control system 1400. A variable frequency pump controller 1402, as discussed above, can be in communication with a wireless adapter 1404 via communication line 1406. In one embodiment, the wireless adapter 1404 can be a wireless adapter as discussed above. The wireless adapter 1404 can communicate with a cloud based server 1408 via a wireless gateway 1410 using a wireless connection 1416. In one embodiment, the wireless gateway 1410 communicates with the cloud based server 1408 via an internet connection. In some embodiments, the wireless gateway 1410 can connect to the Internet via a router and/or modem. The cloud based server 1408 can be in communication with one or more user devices 1412. Further, the variable frequency pump controller 1402 can drive a pump motor 1414.

Figure 15:
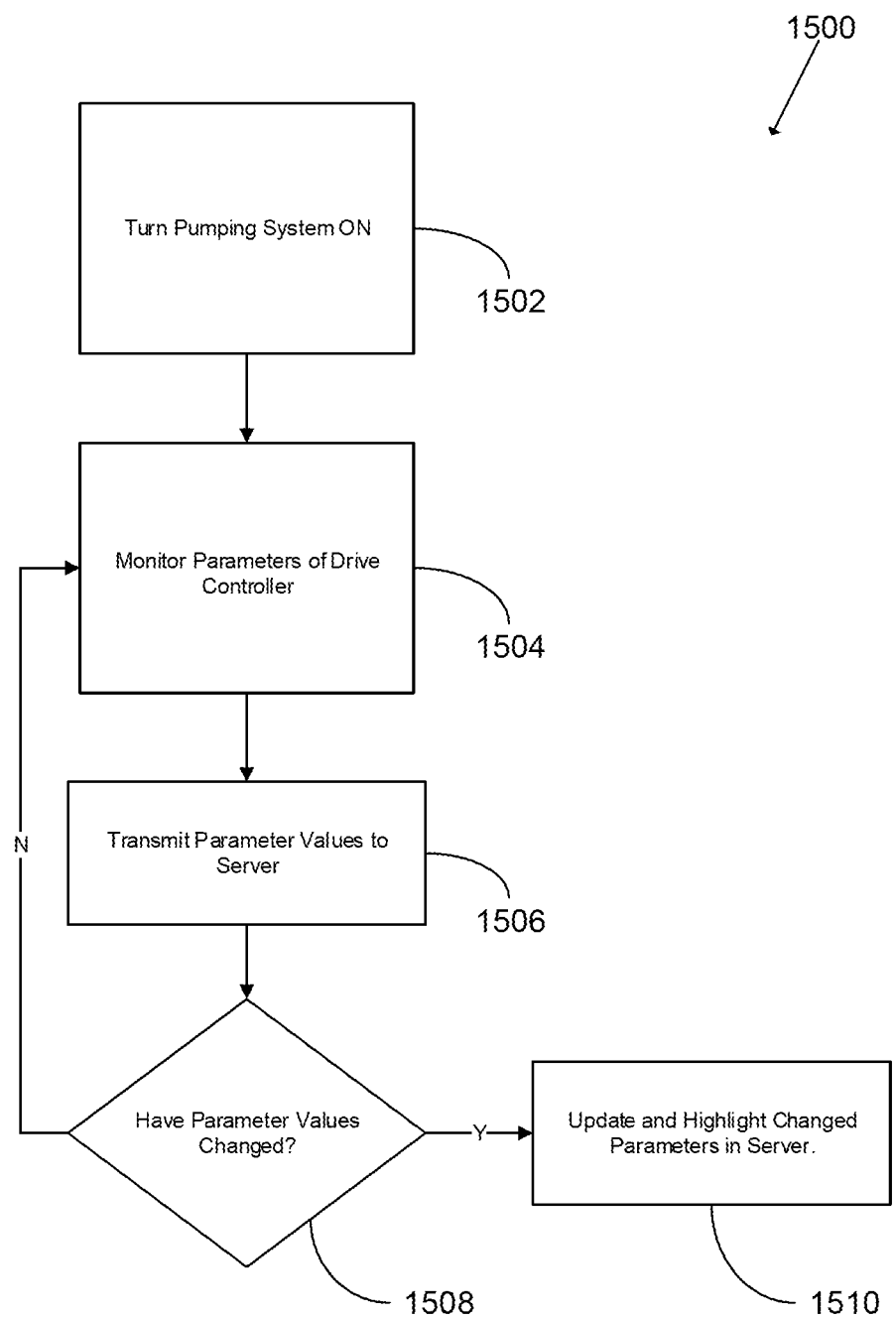
FIG. 15 is a flow chart of a parameter update process for a variable frequency pump control system.

FIG. 15 illustrates a parameter update process 1500. At process block 1502, a variable speed pump controller 1402 can be turned on. At process block 1504, the wireless adapter 1404 can monitor parameters associated with the variable frequency controller 1402. Example parameters for a variable frequency pump controller 1402 can be seen in Table 1 below.

TABLE 1

List of Parameters for a Variable Frequency Pump Controller

| Menu Setting | Parameter | Unit of Measure |
| --- | --- | --- |
| Time/Date | Hour Format | Hours |
| | Time | HH:MM |
| | Date | MM/DD/YYYY |
| PID Control | Proportional Gain | |
| | Integration Time | ms |
| | Derivation Time | ms |
| | Derivative Limit | |
| Sleep | Boost Differential | PSI |
| | Boost Delay | MM:SS |
| | Wake Up Differential | PSI |
| | Wake Delay | MM:SS |
| Password | Password Time Out | HH:MM |
| | Password | |
| Setpoints | Internal Setpoint | PSI |
| | Motor Power Consumption | W |
| | Motor Phase Current | A |
| | Supply Voltage | |
| | External Setpoint | PSI |
| Motor | Motor Phase Connection Type | |
| | Motor Type | |
| | Service Factor Amps | A |
| | Actual Speed | Hz |
| | Min Frequency | |
| | Max Frequency | Hz |
| Sensor | Max Sensor Value | PSI |
| Ex Runtime | Pipe Break Detection Enabled | |
| | Excessive Runtime Detection | |
| | Excessive Runtime Hours | |
| Dry Run | Auto Restart Delay | Minutes |
| | Number of Resets | |
| | Detection Time | M:SS |
| | Sensitivity | PSI |
| | Fill Time | M:SS |
| I/O | Digital Input 1 | |
| | Digital Input 2 | |
| | Relay Output | |
| Over Press | Over Pressure | PSI |
| No Ground | No Ground Detection | |
| Reset | Factory Reset | |
| SW Update | AOC Software Version | |
| | Software Address | |
| | Software Update | |

At process block 1506, the wireless adapter 1404 can transmit the parameter values to the cloud based server 1408. At process block 1508 the cloud based server 1408 can determine if the parameter values have changed. In an alternate embodiment, the wireless adapter 1404 can internally store the parameter values and can determine if the parameter values have changed before transmitting the parameter values to the cloud based server 1408. In one embodiment, tolerance windows can be selected to allow for some fluctuation in the parameter values that would not qualify as a change in parameter values. Thus, in some examples, the parameter values are not considered to have changed if the amount of change is within a tolerance window. In some embodiments, the tolerance window can be set by a user. Alternatively, the tolerance window can be predetermined in the variable speed pump controller 1402.

If the parameter values have not changed, the wireless adapter 1404 can continue to monitor the parameters at process block 1504. If the parameters have changed, the cloud based server 1408 can be updated to reflect the changed parameters at process block 1510. In some embodiments, the changed parameters can be highlighted so that when a user accesses the parameters on the cloud based server 1408, the user can quickly determine which parameters have changed. In some embodiments, the cloud based server 1408 can push an alert message to a user device 1412 when one or more of the parameters change. In one embodiment, the cloud based server 1408 can push an alert message to a user's internet connected device 1412 using methods discussed above. The alert message can inform the user that the parameter has changed and can, in some examples, display the changed parameter in the alert message.

Figure 16:
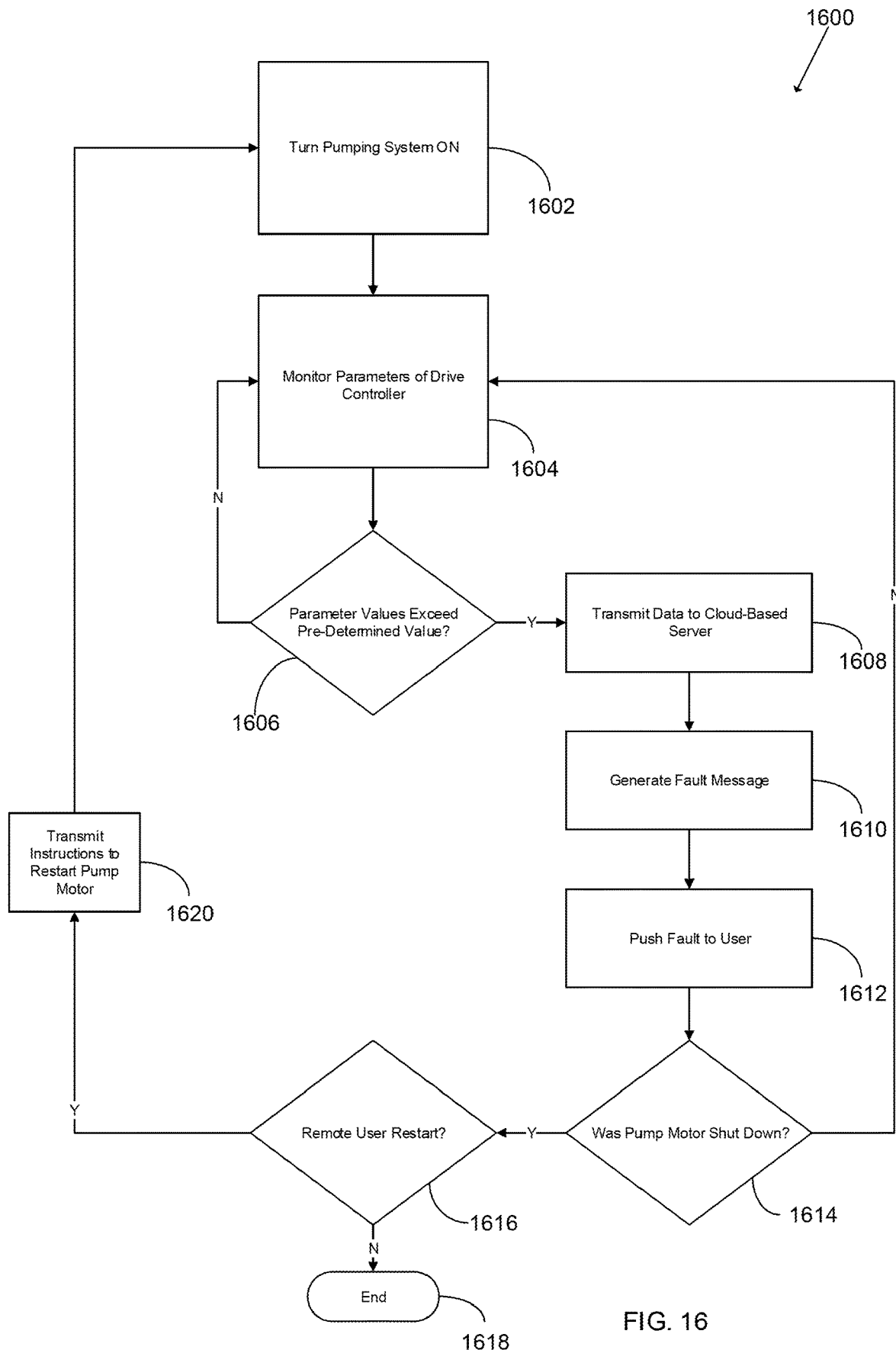
FIG. 16 is a flow chart of a monitoring and control process for a variable speed pump controller.

FIG. 16 illustrates a monitoring and control process 1600 for a variable speed pump controller 1402. At process block 1602, the variable speed pump controller 1402 can be turned on. At process block 1604, the wireless adapter 1404 can monitor parameters associated with the variable speed pump controller 1402. Parameters can include the parameters listed in Table 1 above. At process block 1606, the wireless adapter 1404 can determine if any of the parameters exceed predetermined values. In one embodiment, the predetermined values can be set by the user; alternatively, the predetermined values can be inherently set within the variable speed pump controller 1402. In a further embodiment, the wireless adapter 1404 can determine if any fault condition parameters have been generated by the variable speed pump controller 1402 at process block 1606. If no parameters exceed the predetermined values at process block 1606, the process 1600 returns to process block 1604 and continues to monitor parameters associated with the variable speed pump controller 1402. If a parameter is determined to exceed a predetermined value at process block 1606, the wireless adapter 1404 can transmit data to the cloud based server 1408 indicating that one or more parameters have exceeded a predetermined value at process block 1608. The cloud based server 1408 can then generate an alert message at process block 1610. The cloud based server 1408 can push the alert message to a user device 1412 at process block 1612. In one embodiment, the cloud based server 1408 can push an alert message to a user's internet connected device 1412 using the methods discussed above. Examples of alerts that can be pushed to the user device 1412 can include over current, over voltage, under voltage, cannot start motor, dry run, ground fault, system not grounded, open transducer, shorted transducer, over temperature, excessive runtime, internal fault, hardware fault, external fault, low amps, jam, over pressure, etc.

At process block 1614, the wireless adapter 1404 can determine if the variable speed pump controller 1402 shut down an associated pump motor 1414. In one example, the pump motor can be shut down when certain parameters are exceeded, such as those discussed above. If the pump motor 1414 was not shut down, the wireless adapter 1404 can continue to monitor the parameters associated with the variable speed pump controller 1402. When the pump motor 1414 is shut down, a further alert message can be relayed to the user device 1412, indicating that the pump motor 1414 is not currently operating. At process block 1616, the wireless adapter can determine if a remote user restart has been initiated. If no remote user restart has been initiated, the process 1600 ends at process block 1618. If a remote user restart has been initiated, the wireless adapter 1404 can transmit instructions to the variable speed pump controller 1402 at process block 1620 to turn the pump motor 1414 on. The variable frequency pump controller 1402 can then turn on the pump motor at process block 1602.

In one embodiment, a user can be presented with an option to restart the pump motor 1414 on the user device 1412. The user can be presented with an option to restart the pump motor 1414 anytime the pump motor 1414 is shut down. Alternatively, the wireless adapter 1404 can provide the option to the user device 1412 to restart the pump motor 1414 based on the parameter that caused the shutdown. For example, the option to restart the pump motor 1414 may not be available when the parameter that exceeded the predetermined value indicates an electrical short or ground fault. In a further embodiment, the wireless adapter 1404 can continuously monitor the parameters associated with the variable speed pump controller 1402 and provide a user with an option to restart the pump motor 1414 when the parameter associated with the variable speed pump controller 1402 no longer exceeds the predetermined value. For example, if the pump motor 1414 was shut down due to a parameter associated with the temperature exceeding a predetermined value, the wireless gateway 1404 can provide the user with the option to restart the pump motor 1414 when the parameter associated with a temperature of the variable speed pump controller 1402 falls below the predetermined value. In a further embodiment, the option to restart the pump motor 1414 can always be provided on the user device 1412 when the battery backup sump pump has been shut down. When a user then attempts to restart the pump motor 1414, the wireless gateway 1404 can first determine if a restart is possible based on the reason for the shutdown. If it is not, the wireless gateway 1404 can have an alert pushed to the user device 1412, indicating that a remote restart is not available. In some embodiments, the wireless gateway 1404 can further push a message to the user device 1412 explaining why a remote reset of the pump motor 1414 is not currently available.

Figure 17:
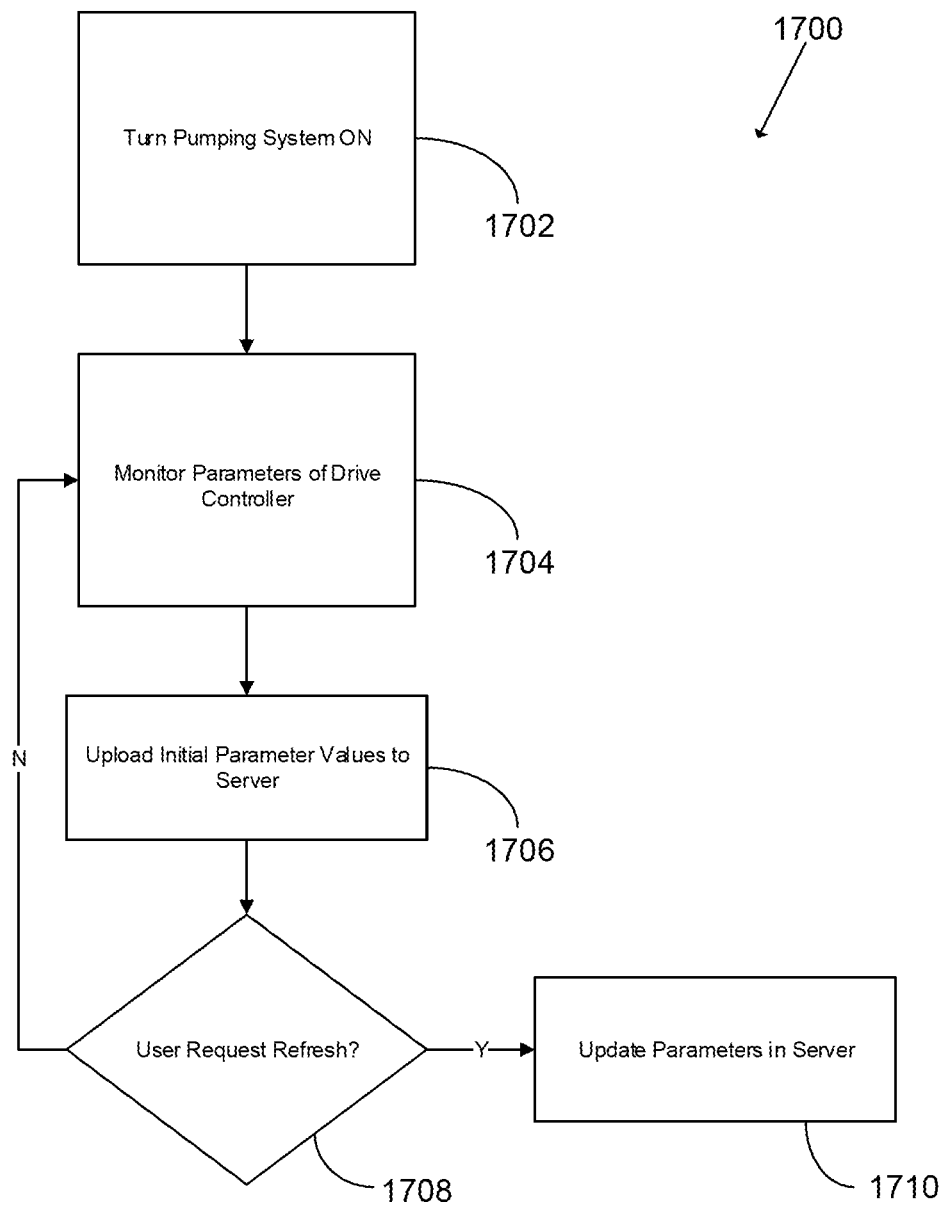
FIG. 17 is a flow chart of a user requested parameter update process for a variable speed pump controller.

FIG. 17 illustrates a user requested parameter update process 1700. At process block 1702, the variable speed pump controller 1402 can be turned on. At process block 1704, the wireless adapter 1404 can monitor parameters associated with the variable speed pump controller 1402. Parameters can include the parameters listed in Table 1 above. At process block 1706, the wireless adapter 1404 can upload an initial set of parameter values to the cloud based server 1408. In some embodiments, all the parameters associated with the variable speed pump controller 1402 can be uploaded to the cloud based server 1408. Alternatively, a select subset of the parameters associated with the variable speed pump controller 1402 can be uploaded to the cloud based server 1408. At process block 1708, the process 1700 can determine if a user has requested a parameter refresh. In one embodiment, the user can request a parameter refresh by performing a "refresh" operation on the user device 1412. A "refresh" operation can include selecting a refresh button, performing an action such as a gesture on the user device 1412, refreshing an internet browser, etc. The refresh operation can provide a message to the cloud based server 1408 that a refresh is requested. The cloud based server 1408 can then communicate to the wireless adapter 1404 to provide updated parameters. If no user requested refresh is detected at process block 1708, the wireless adapter 1404 can continue to monitor parameters at process block 1704. If a user refresh request is provided, the wireless adapter 1404 can transmit updated parameters to the cloud based server at process block 1710.

Figure 18:
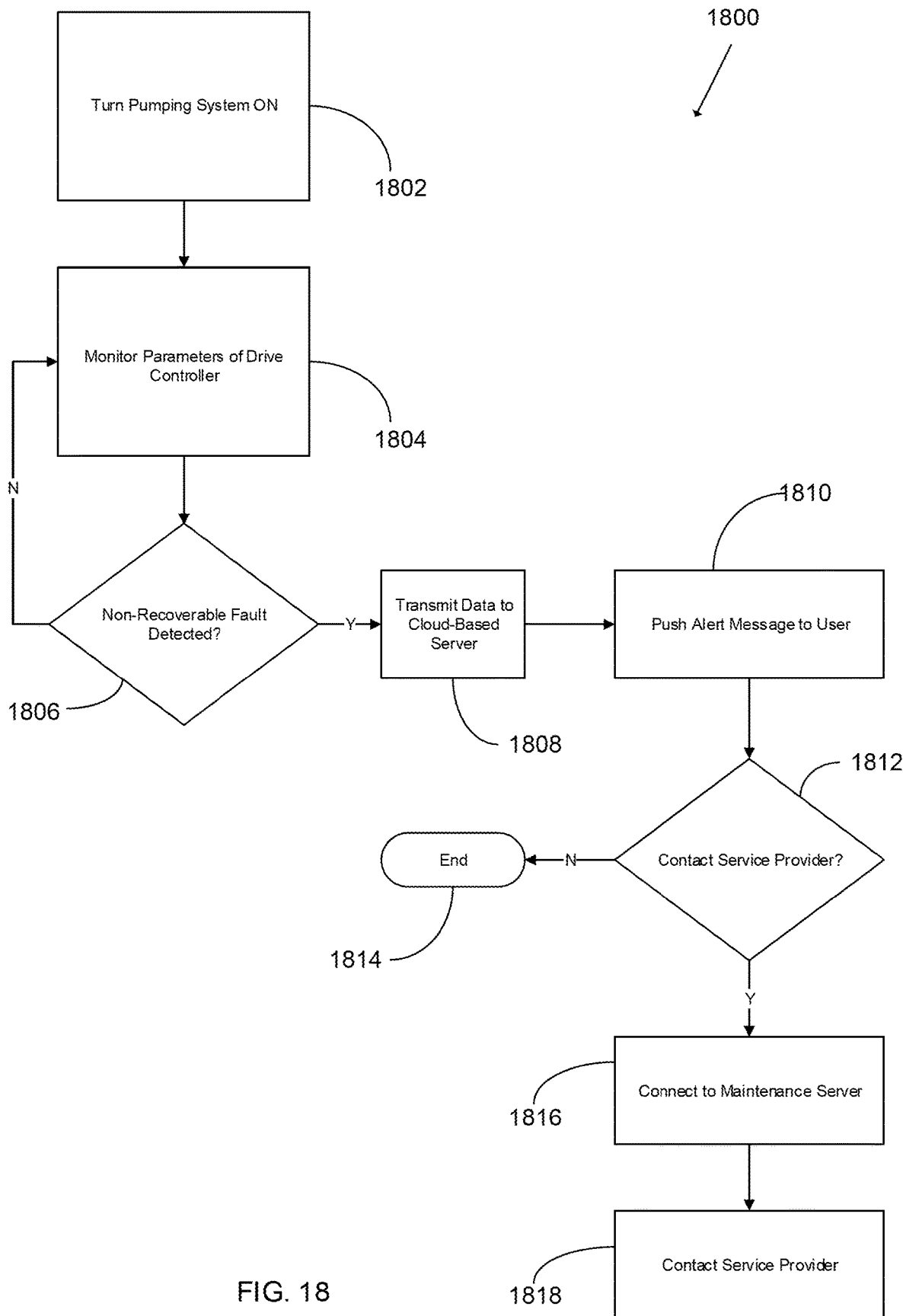
FIG. 18 is a flow chart of a service provider alert process for a variable speed pump controller.

FIG. 18 illustrates a service provider alert process 1800. At process block 1802, the variable speed pump controller 1402 can be turned on. At process block 1804, the wireless adapter 1404 can monitor parameters associated with the variable speed pump controller 1402. The monitored parameters can include the parameters shown above in Table 1. At process block 1806, the wireless adapter 1404 can determine if a nonrecoverable fault condition has been detected. Examples of nonrecoverable fault conditions can include ground faults, over-voltage, over-current, short circuit, no motor start, loss of communication, or other relevant faults. If a nonrecoverable fault condition is not detected, the wireless adapter 1404 can continue to monitor the parameters associated with the battery backup pump control system 1400 at process block 1804. Where a nonrecoverable fault is detected, the wireless adapter 1404 can transmit the fault data to the cloud based server 1408 at process block 1808. The cloud based server 1408 can then push an alert message to a user device 1412 to inform the user of the nonrecoverable fault at process block 1810. In one embodiment, the alert message can inform a user that maintenance is required.

At process block 1812, the user device 1412 can provide the user with an option to contact a service provider. In one embodiment, the user device 1412 can receive a message from the cloud based server 1408 to provide the user with the option to contact a service provider. Alternatively, the user device 1412 can automatically provide the option to contact a service provider when the user device 1412 receives the message from the cloud based server 1408 indicating the nonrecoverable fault has occurred. If the user selects not to contact a service provider at process block 1812, the process can end at process block 1814. If the user does choose to contact a service provider, a connection can be made to a maintenance server at process block 1816. In one embodiment, the maintenance server can be located in the cloud based server 1408. Alternatively, the maintenance server can be in a separate cloud based server. Further, the maintenance server can be the cloud based server 1408. In one embodiment, the user device 1412 can establish a connection with the maintenance server directly. Alternatively, the user device 1412 can transmit a message to the cloud based server 1408 indicating that the user has selected to contact the service provider. The cloud based server 1408 can then access the maintenance server.

In one embodiment, the maintenance server can contain contact information for service providers authorized to provide maintenance to the variable speed pump controller 1402. The maintenance server can have access to a user profile of the user and/or the product registration data provided by the user, such as discussed above. Alternatively, information from the user profile and/or product registration can be provided to the maintenance server via the cloud based server 1408. Using the information contained in the user profile and/or product registration data, the maintenance server can filter the possible service providers based on product data (make, model, installation, years in service, etc) as well as user data (geographic location, usual distributor, past maintenance, etc.). This can allow for the proper service provider to be contacted, which can allow for more efficient product repair.

In a further embodiment, parameters associated with the nonrecoverable fault can be analyzed in the cloud based server 1408. The cloud based server 1408 can analyze the parameters associated with the fault and provide the analysis to the maintenance server. Based on the analysis, the maintenance server can create a list of materials needed to perform the maintenance. Examples of potential replacement parts can include terminal blocks, control boards, inductors, sensors, capacitors, control panels, transducers, fans, inverter/converter modules, pump, motor, etc. Further, if there is sufficient data regarding the installation of the product, additional replacement parts can be automatically generated. For example, certain repairs can require new plumbing fittings such as pipes, elbows, couplers, reducers, valves, etc. If a complete bill of material (BOM) is available to the cloud based server 1408 regarding the initial installation of the variable speed control system 1400, the cloud based server 1408 can analyze the BOM to determine which additional parts may be needed. Additionally, in some embodiments, the maintenance server can have access to stock levels of replacement parts on hand for the service providers. Once the proper service provider is determined, the maintenance and/or cloud based server 1408 server can evaluate the stock list of the relevant service provider to determine if there is sufficient stock to perform the needed repair. If not, the maintenance and/or cloud based server 1408 can place an order for the replacement parts needed to perform the repair. For example, the maintenance and/or cloud based server 1408 can order the replacement parts from other service providers. Further, the maintenance and/or cloud based server 1408 can order the parts from a distributor or dealer. Finally, in some instances, the maintenance and/or cloud based server 1408 can order the parts directly from the manufacturer. In some embodiment, the maintenance and/or cloud based server 1408 server can automatically order the replacement parts once the user chooses to contact a service provider. Alternatively, the cloud based server 1408 can push a message to the user device 1412, requiring the user to approve any orders. In some examples, the maintenance and/or cloud based server 1408 server can provide an actual or estimated cost of the required replacement parts that can be provided to the user. Further, the maintenance server can wait until authorization is provided from the service provider before any replacement parts are issued.

At process block 1818, the service provider can be contacted. In one embodiment, the maintenance and/or cloud based server 1408 can contact the service provider. The maintenance and/or cloud based server 1408 can contact the service provider in various ways. In one example, an electronic message can be transmitted to the service provider regarding the maintenance issue. Examples of electronic messages can include text messages (SMS, MMS, etc.), e-mail, instant message, etc. Further, the maintenance and/or cloud based server 1408 can contact the service provider by using an automated voice message. The messages provided to the service provider can include information relating to the contact information and address of the user, the nature of the problem, the fault and associated parameters, historical data (previous service performed, faults received over time, etc), and/or the list of expected replacement parts. Further, in some embodiments, the user can be presented with a questionnaire when the user chooses to contact the service provider. The questionnaire can allow the user to select best times and methods for contacting the user and best times for the service provider to schedule the appointment. In further embodiments, the maintenance and/or cloud based server 1408 can have access to a scheduling/work order system of the service provider and can schedule an appointment automatically in the system.

Figure 19:
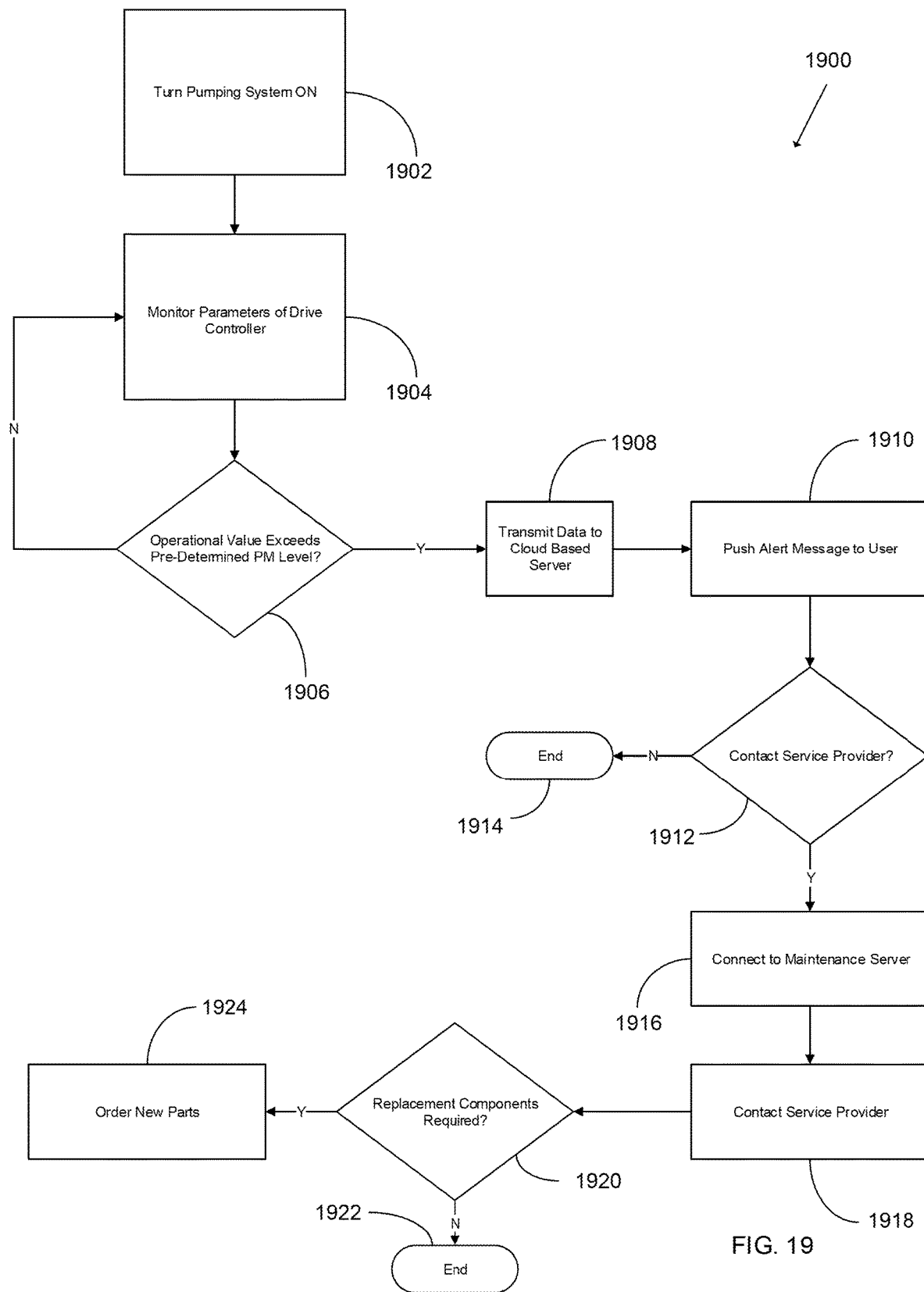
FIG. 19 is a flow chart of a preventative maintenance process for a variable speed pump controller.

FIG. 19 illustrates a preventative maintenance process 1900. At process block 1902, the variable speed pump controller 1402 can be turned on. At process block 1904, the wireless adapter 1404 can monitor parameters associated with the operation of the variable speed pump control system 1400. Examples of parameters can include those listed above in Table 1, as well as faults, including ground faults, over-voltage, over-current, short circuit, no motor start, loss of communication, or other relevant faults. At process block 1906, the wireless adapter 1404 can determine if any of the parameters exceed predetermined preventative maintenance values. In one embodiment, the predetermined preventative maintenance values can be set by the user; alternatively, the predetermined values can be set within the variable speed pump controller 1402 at the factory. In a further embodiment, the wireless adapter 1404 can determine if any fault condition parameters have been generated by the variable speed pump controller 1402 at process block 1906 that would be related to the need for preventative maintenance. For example, over-temperature faults, over-voltage/current faults, and under-voltage faults can be indicative of the need for preventative maintenance. If no parameters exceed the predetermined preventative maintenance values at process block 1906, the process 1900 can return to process block 1904 and continue to monitor parameters associated with the variable speed pump controller 1402. If a parameter is determined to exceed a predetermined preventative maintenance value at process block 1906, the wireless adapter 1404 can transmit data to the cloud based server 1408 indicating that one or more parameters have exceeded the predetermined preventative maintenance values at process block 1908. The cloud based server 1408 can then generate and push an alert message to the user device 1412 at process block 1910. In one embodiment, the cloud based server 1408 can push an alert message to a user's internet connected device 1412 using methods discussed above. In one embodiment, the alert message can inform the user that preventative maintenance is required for the variable speed pump controller 1402.

At process block 1912, the user can be presented with an option to contact a service provider. In one embodiment, the user can be presented with the option to contact the service provider via the user device 1412. In a further embodiment, the user device 1412 can receive a message from the cloud based server 1408 to provide the user with the option to contact a service provider. Alternatively, the user device 1412 can automatically provide the option to contact a service provider when the user device 1412 receives the message from the cloud based server indicating one or more of the parameters have exceeded the predetermined preventative maintenance level(s). If the user does not choose to contact a service provider at process block 1912, the process can end at process block 1914. If the user does choose to contact a service provider, a connection can be made to a maintenance server at process block 1916. In one embodiment, the maintenance server can be located in the cloud based server 1408, as discussed above. Alternatively, the maintenance server can be in a separate cloud based server. Further, the maintenance server can be the cloud based server 1408. In one embodiment, the user device 1412 can establish a connection with the maintenance server directly. Alternatively, the user device 1412 can transmit a message to the cloud based server 1408 indicating that the user has selected to contact the service provider. The cloud based server 1408 can then access the maintenance server to contact the service provider.

At process block 1918, the service provider can be contacted. In one embodiment, the maintenance and/or cloud based server 1408 can contact the service provider. The maintenance and/or cloud based server 1408 can contact the service provider in various ways. In one example, an electronic message can be transmitted to the service provider regarding the maintenance issue. Examples of electronic messages can include text messages (SMS, MMS, etc.), e-mail, instant message, etc. Further, the maintenance and/or cloud based server 1408 can contact the service provider by using an automated voice message. The messages provided to the service provider can include information relating to the contact information and address of the user, the nature of the problem, the fault and associated parameters, historical data (previous service performed, faults received over time, etc), and/or the list of expected replacement parts. Further, in some embodiments, the user can be presented with a questionnaire when the user chooses to contact the service provider. The questionnaire can allow the user to select best times and methods for contacting the user and best times for the service provider to schedule the appointment. In further embodiments, the maintenance and/or cloud based server 1408 can have access to a scheduling/work order system of the service provider and can schedule an appointment automatically in the system.

At process block 1920, the maintenance and/or cloud based server 1408 can analyze the parameters exceeded the predetermined preventative maintenance values to determine what, if any, replacement components may be required. Based on the analysis, the maintenance server and/or cloud based server 1408 can create a list of materials needed to perform the preventative maintenance. Examples of potential replacement parts can include terminal blocks, control boards, inductors, sensors, capacitors, control panels, transducers, fans, inverter/converter modules, pump, motor, etc. Further, if there is sufficient data regarding the installation of the product, additional replacement parts can be automatically obtained. For example, certain repairs can require new plumbing fittings such as pipes, elbows, couplers, reducers, valves, etc. If a complete bill of material (BOM) is available to the cloud based server 1408 regarding the initial installation of the variable speed pump controller 1402, the cloud based server 1408 can analyze the BOM to determine which additional parts may be needed.

If no replacement parts are needed, the process 1900 can end at process block 1922. However, if the analysis indicates that replacement parts will be needed, the maintenance and/or cloud based server 1408 can order the replacement parts at process block 1924. In some embodiments, the maintenance server can have access to stock levels of replacement parts on hand for the service providers. Once the proper service provider is determined, the maintenance server can evaluate the stock list of the relevant service provider to determine if there is sufficient stock to perform the needed repair. If not, the maintenance server can place an order for the replacement parts needed to perform the repair. For example, the maintenance server can order the replacement parts from other service providers. Further, the maintenance server can order the parts from a distributor or dealer. Finally, in some instances, the maintenance server can order the parts directly from the manufacturer. In some embodiments, the maintenance server can automatically order the replacement parts once the user chooses to contact a service provider. Alternatively, the cloud based server 1408 can push a message to the user device 1412 requiring the user to approve any orders. In some examples, the maintenance server can provide an actual or estimated cost of the required replacement parts that can be provided to the user. Further, the maintenance and/or cloud based server 1408 can wait until authorization is provided from the service provider before any replacement parts are ordered.

Figure 20:
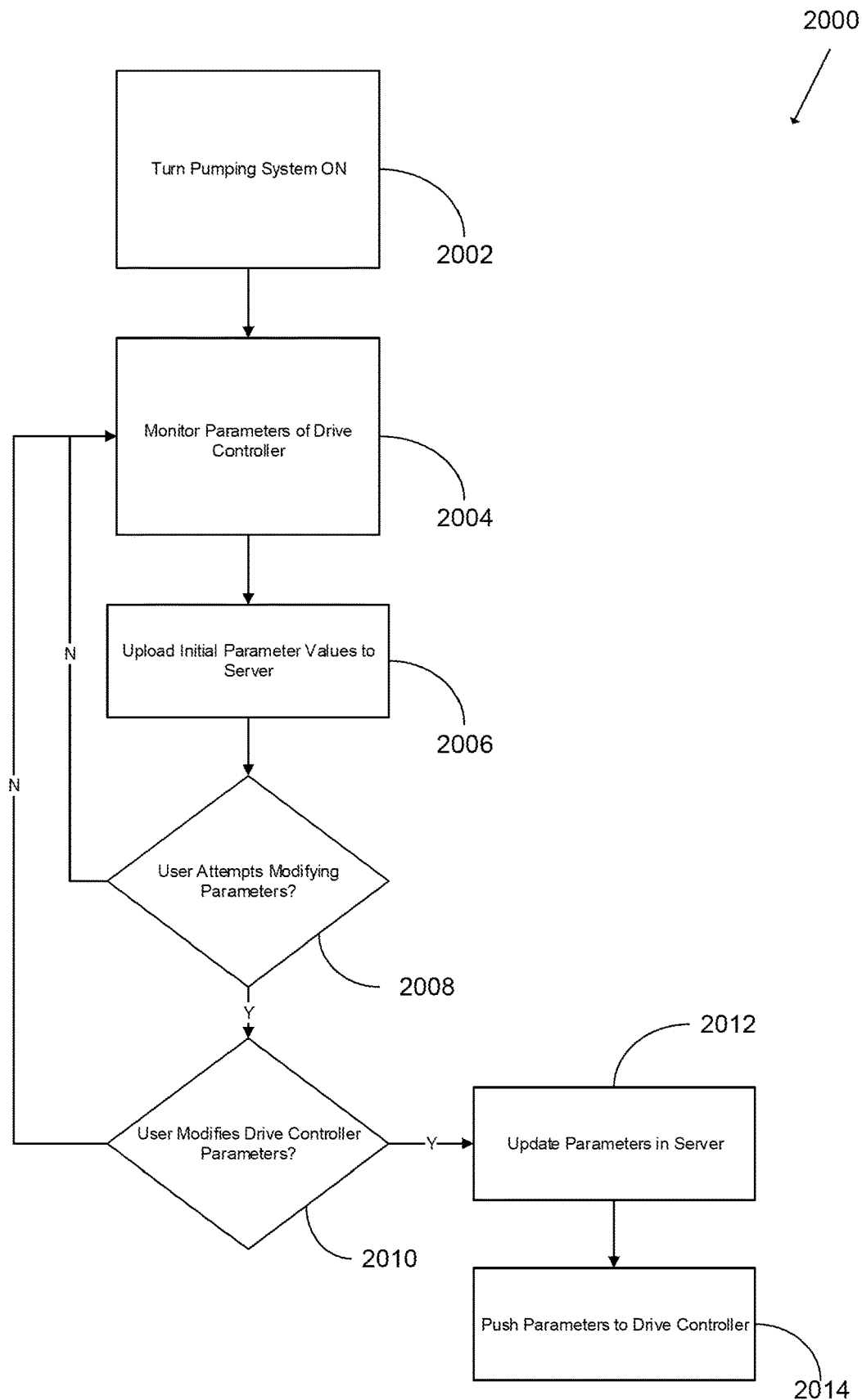
FIG. 20 is a flow chart of a remote parameter modification process for a variable speed pump controller.

FIG. 20 illustrates a remote parameter modification process 2000. At process block 2002, the variable speed pump controller 1402 can be turned on. At process block 2004, the wireless adapter 1404 can monitor parameters associated with the variable speed pump controller 1402. Parameters can include the parameters listed in Table 1 above. At process block 2006, the wireless adapter 1404 can upload an initial set of parameter values to the cloud based server 1408. In some embodiments, all parameters associated with the variable speed pump controller 1402 can be uploaded to the cloud based server 1408. Alternatively, a select subset of the parameters associated with the variable speed pump controller 1402 can be uploaded to the cloud based server 1408. At process block 2008, a user can attempt to modify the parameters. At process block 2010, the process 2000 can determine if a user, via a user account, has remote write access. In one embodiment, a user can select during the initial setup of the variable speed pump controller 1402 if write access will be allowed. In some examples, write access can be associated with a remote user device 1412. In some embodiments, a user can be required to enter a passcode before write access is enabled. In other embodiments, the write access can be limited to a specific user device 1412. For example, only a user device with a specific MAC address can be associated with write access.

If no user write access exists, the wireless adapter 1404 continues to monitor the parameters associated with the variable speed pump controller 1402 at process block 2004. If the user does have write access, the parameters can be updated in the cloud based server 1408 at process block 2012. In one embodiment, a user with write access can modify any parameter, such as those listed in Table 1 above. Alternatively, the parameters that can be modified remotely can be limited to a certain subset of the parameters associated with the variable speed pump controller 1402. Once the parameters have been updated in the cloud based server 1408, the cloud based server 1408 can push the modified parameters to the variable speed pump controller 1402 via the wireless adapter 1404 at process block 2014.

Figure 21:
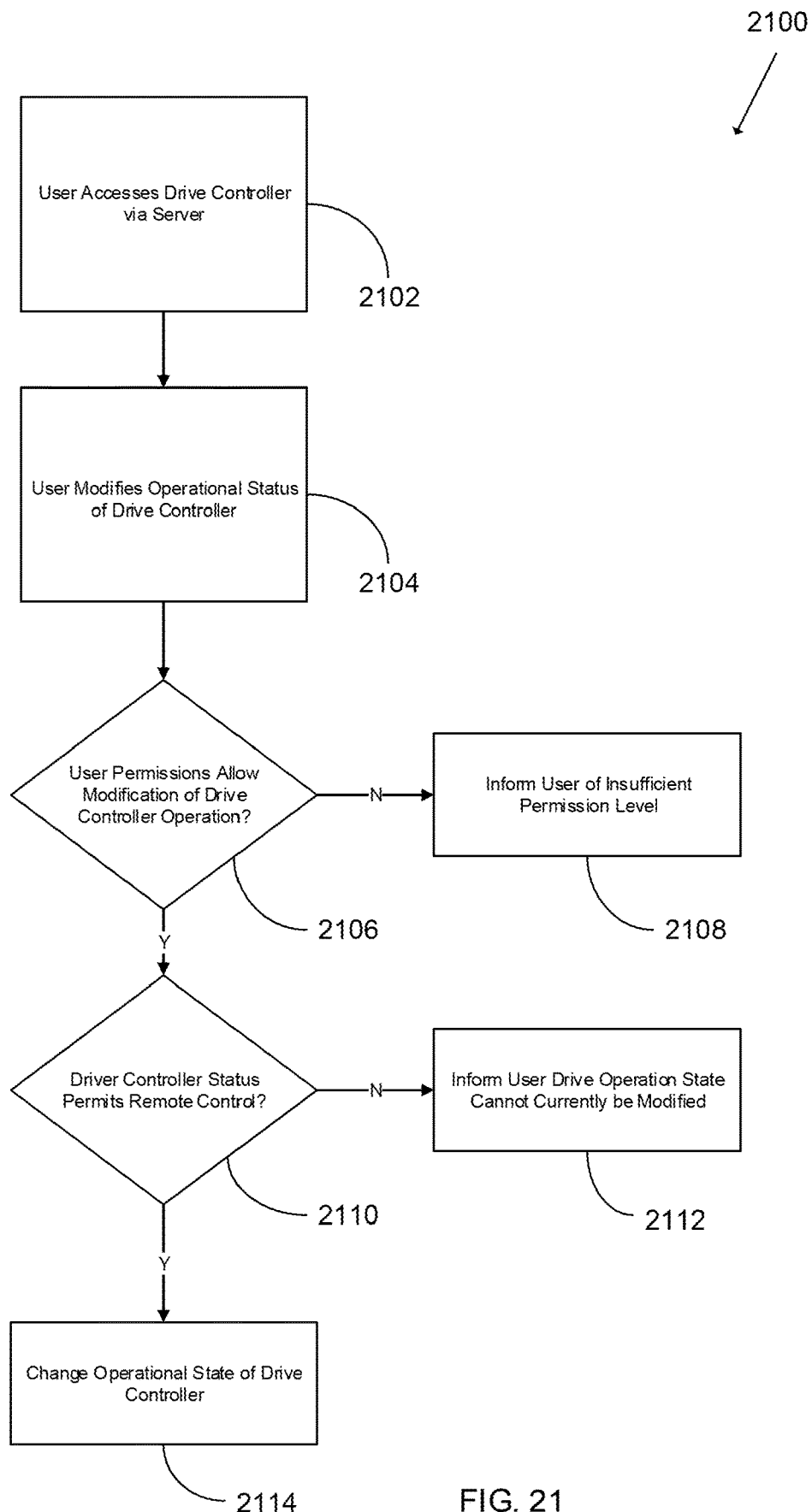
FIG. 21 is a flow chart of a remote control process for a variable speed pump controller.

FIG. 21 illustrates a remote control process 2100 for a variable speed pump controller 1402. At process block 2102, a user can access the variable frequency pump controller 1402 using a user device 1412. In one embodiment, the user can access the variable speed pump controller 1402 by transmitting a request to the cloud based server 1408. The cloud based server 1408 can then relay the request to the wireless adapter 1404 which can provide access to the variable speed pump controller 1402. At process block 2104, the user can attempt to modify an operational parameter of the variable speed drive controller 1402. Examples of operational parameters can include start, stop, reset, speed, pressure setting, etc. At process block 2106, a permission level associated with the user is evaluated to determine if the user has permission to modify operational parameters of the variable speed drive controller 1402. In one embodiment, a user can select during the initial setup of the variable speed pump controller 1402 permission levels. In some examples, the permission levels can be associated with the remote user device 1412. For example, only a user device with a specific MAC address can be associated with write access. Alternatively, a passcode can be associated with certain permission levels. For example, some operational parameters may be able to be accessed without any passcode, while others may require the user to enter a passcode to obtain the proper permission level. Thus, different operational parameters can be associated with different permission levels. Additionally, permission levels can depend on the specific user who is attempting to access the variable speed pump controller 1402. For example, one household user having a user account associated with the variable speed pump controller 1402 may have full permission to modify operational parameters, while other household users having user accounts associated with the same variable speed pump controller 1402 may have limited or no permission to modify operational parameters of the variable speed pump controller 1402. In some embodiments, one user associated with the variable speed pump controller can have "administrative" privileges, allowing full permission to all operational parameters. The user with administrative privileges can then assign permission levels to other users associated with the variable speed pump controller 1402.

If the user does not have a sufficient permission level to modify the selected operational parameter, an alert message can be pushed to the user device 1412 at process block 2108. The alert message can inform the user that they have insufficient permission to remotely modify the selected operational parameter. If the user is determined to have a sufficient permission level to modify the selected operational parameter, it can then be determined whether the variable speed pump controller 1402 allows remote control at process block 2110. In some embodiments, a user can disable the variable speed pump controller from accepting remote modifications. Alternatively, the variable speed pump controller 1402 can be set to only accept remote commands during certain time periods. Further, the variable speed pump controller 1402 can be set to only accept remote commands where other parameters are within a given range. For example, if the water pressure is determined to be low, the variable speed pump controller 1402 may prevent remote commands that could further lower the water pressure. If the variable speed pump controller 1402 does not allow remote operation, an alert message can be pushed to the user device 1412 at process block 2112. The alert message can inform the user that the operational parameters cannot currently be modified. If the variable speed pump controller 1402 does allow remote modification of operational parameters, the operational state of the variable speed pump controller 1402 can be modified at process block 2114.

IntelliFlo Control

The following paragraphs are directed to the use of a wireless adapter device to provide for wireless access to pump controllers, and specifically, variable speed pump controllers for use in aquatic applications, such as pools and spas. For example, the variable speed pool pump controller can be a INTELLIFLO® variable frequency pump drive from Pentair. However, any variable frequency pump controller with a communication port capable of communicating with a wireless adapter, as discussed above, can also be used. Further, while the pump controller in the following paragraphs is described as a "pool pump controller," it is understood that the following pump controllers can be used in a variety of aquatic applications such as in pools, spas, whirlpool tubs, and/or water features (fountains, decorative ponds, etc.) where there is generally a body of water or other fluids.

Figure 22:
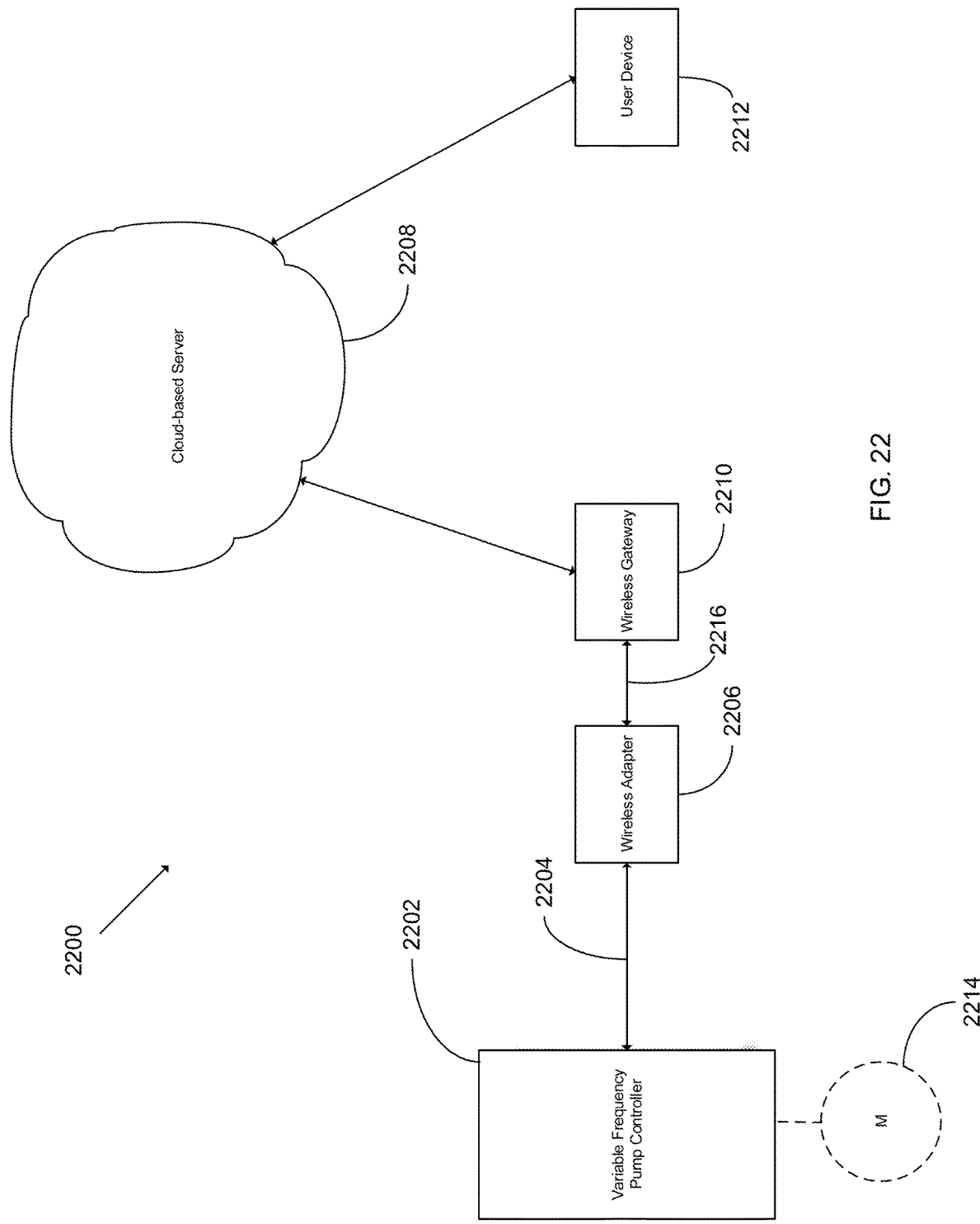
FIG. 22 is a block diagram of a variable frequency pool pump control system.

FIG. 22 illustrates a variable frequency pool pump control system 2200. A variable frequency pool pump controller 2202, as discussed above, can be in communication with a wireless adapter 2204 via communication line 2206. In one embodiment, the wireless adapter 2204 can be a wireless adapter as discussed above. The wireless adapter 2204 can communicate with a cloud based server 2208 via wireless gateway 2210 using a wireless connection 2216. In one embodiment, the wireless gateway 2210 communicates with the cloud based server 2208 via an internet connection. In some embodiments, the wireless gateway 2210 can connect to the Internet via a router and/or modem. The cloud based server 2208 can be in communication with one or more user devices 2212. Further, the variable frequency pool pump controller 2202 can drive a pump motor 2214.

Figure 23:
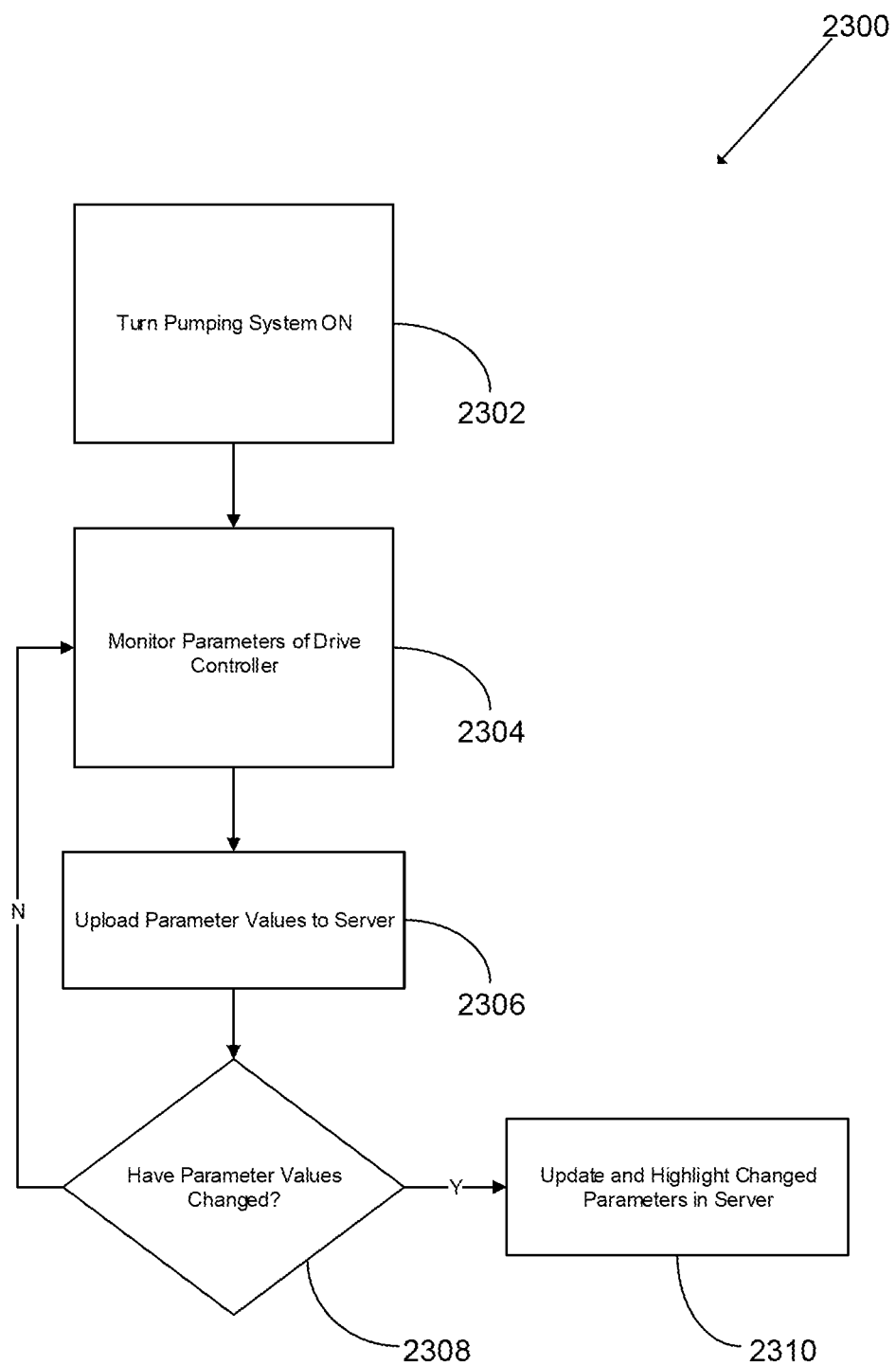
FIG. 23 is a flow chart of a parameter update process for a variable frequency pool pump control system.

FIG. 23 illustrates a parameter update process 2300. At process block 2302, a variable speed pool pump control system 2202 can be turned on. At process block 2304, the wireless adapter 2204 can monitor parameters associated with the variable speed pool pump controller 2202. Example parameters for a variable frequency pump controller can be seen in Table 2 below.

TABLE 2

List of Parameters for a Variable Speed Pool Pump Controller

| Menu Setting | Parameter | Unit of Measure |
|---|---|---|
| Pool Data | Language | |
| | Pump Address | |
| | Pool Volume | k gallon |
| | Water Temp | Degrees (C. or F.) |
| Units | Flow Unit | |
| | Time Unit | |
| | Temperature Unit | |
| Priming | Max Priming Flow | GPM |
| | Max Priming Time | Min |
| | System Priming Time | Min |
| Filter | Clean Filter Pressure | PSI |
| | Turnovers per Day | |
| | Cycles per Day | |
| | Cycle Start Time | |
| Time/Contrast | Set Time | hh:mm |
| | Contrast Level | |
| Features | Activation | |
| | Set Flow | GPM |
| | Set Start Time | hh:mm |
| | Set Stop Time | hh:mm |
| Backwash | Backwash Flow | GPM |
| | Backwash Duration | Min. |
| | Rinse Duration | Min. |
| Vacuum | Vacuum Flow | GPM |
| | Vacuum Duration | Min. |

At process block 2306, the wireless adapter 2204 can transmit the parameter values to the cloud based server 2208. At process block 2308, the cloud based server 2208 can determine if the parameter values have changed. In an alternate embodiment, the wireless adapter 2204 can internally store the parameter values and can determine if the parameter values have changed prior to transmitting the parameter values to the cloud based server 2208. In one embodiment, tolerance windows can be selected to allow for some fluctuation in the parameter values that would not qualify as a change in the parameter value. Thus, in some examples, the parameter values are not considered to have changed if the amount of change is within a tolerance window. In some embodiments, the tolerance window can be set by a user. Alternatively, the tolerance window can be predetermined in the variable speed pump controller 2204. If the parameter values have not changed, the wireless adapter 2204 can continue to monitor the parameters at process block 2304. If the parameters have changed, the cloud based server 2208 can be updated to reflect the changed parameters at process block 2310. In some embodiments, the changed parameters can be highlighted so that when a user accesses the parameters on the cloud based server 2208, the user can quickly determine which parameters have changed. In some embodiments, the cloud based server 2208 can push an alert message to a user device 2212 when one or more of the parameters change. In one embodiment, the cloud based server 2208 can push an alert message to a user's internet connected device 2212 using methods discussed above. The alert message can inform the user that the parameter has changed and can, in some examples, display the changed parameter in the alert message.

Figure 24:
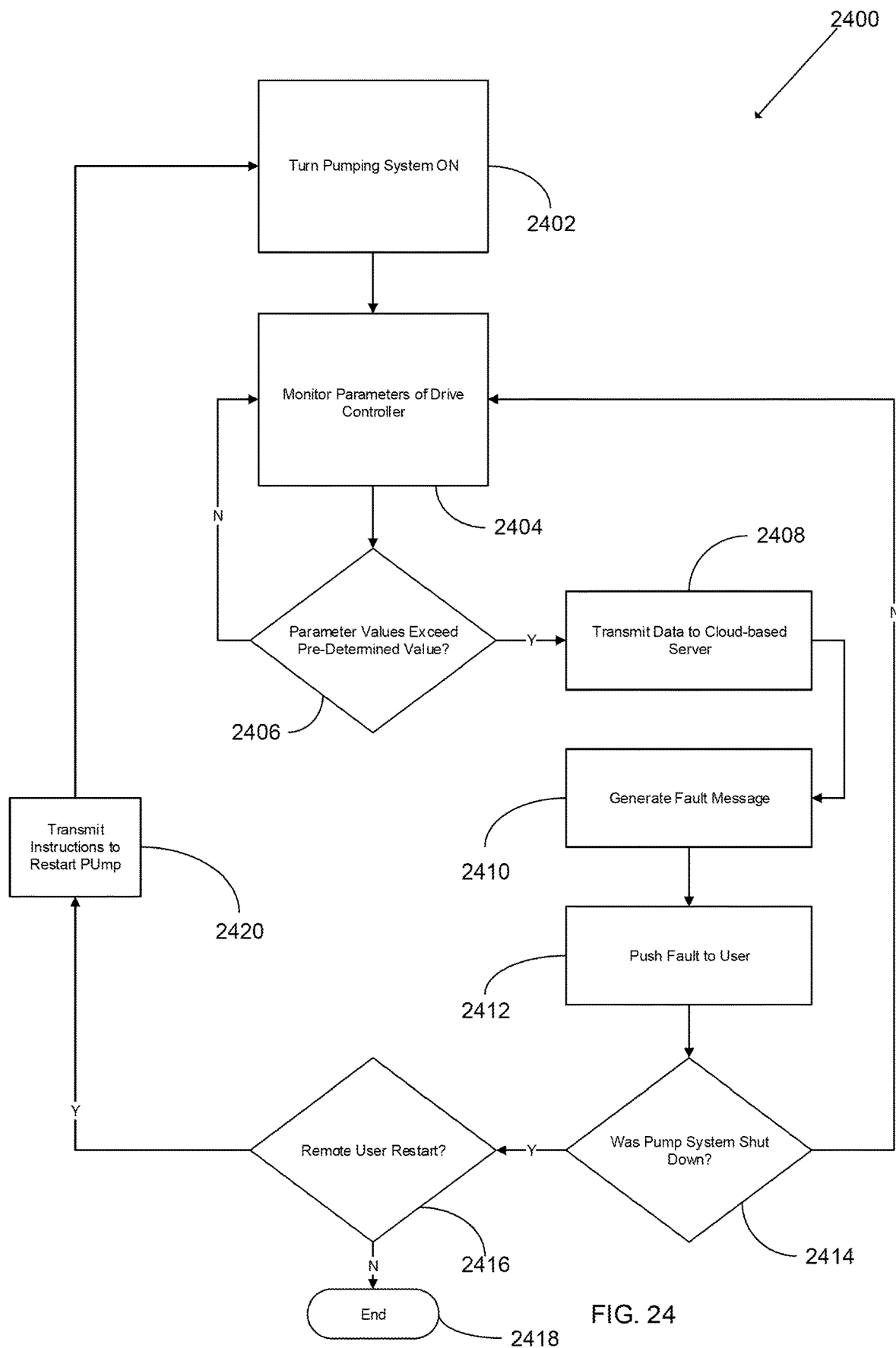
FIG. 24 is a flow chart of a monitoring and control process for a variable speed pool pump control system.

FIG. 24 illustrates a monitoring and control process 2400 for a variable speed pool pump controller 2202. At process block 2402, the variable speed pool pump controller 2202 can be turned on. At process block 2404, the wireless adapter 2204 can monitor parameters associated with the variable speed pool pump controller 2202. Parameters can include the parameters listed in Table 2 above. At process block 2406, the wireless adapter 2204 can determine if any of the parameters exceed predetermined values. In one embodiment, the predetermined values can be set by the user; alternatively, the predetermined values can be inherently set within the variable speed pool pump controller 2202. In a further embodiment, the wireless adapter 2204 can determine if any fault condition parameters have been generated by the variable speed pool pump controller 2202 at process block 2406. If no parameters exceed the predetermined values at process block 2406, the process 2400 returns to process block 2404 and continues to monitor parameters associated with the variable speed pool pump controller 2202. If a parameter is determined to exceed a predetermined value at process block 2406, the wireless adapter 2204 can transmit data to the cloud based server 2208 indicating that one or more parameters have exceeded a predetermined value at process block 2408. The cloud based server 2208 can then generate an alert message at process block 2410. The cloud based server 2208 can push the alert message to a user device 2212 at process block 2412. In one embodiment, the cloud based server 2208 can push an alert message to a user's internet connected device 2212 using methods discussed above. Examples of alerts that can be pushed to the user device 2212 can include over-current, over-voltage, under-voltage, cannot start motor, dry run, ground fault, system not grounded, open transducer, shorted transducer, over-temperature, excessive runtime, filter clog, internal fault, hardware fault, external fault, low amps, jam, over pressure, clogged impeller, leak in suction line, loss of prime, cavitation, etc.

At process block 2414, the wireless adapter 2204 can determine if the variable speed pump controller 2202 shut down an associated pump motor 2214 at process block 2414. In one example, the pump motor 2214 can be shut down when certain parameters are exceeded, such as those discussed above. If the pump motor 2214 was not shut down, the wireless adapter 2204 can continue to monitor the parameters associated with the variable speed pool pump controller 2202 at process block 2404. When the pump motor 2206 is shut down, a further alert message can be relayed to the user device 2212, indicating that the pump motor 2206 is not currently operating. At process block 2416, the wireless adapter 2204 can determine if a remote user restart has been initiated. If no remote user restart has been initiated, the process 2400 ends at process block 2418. If a remote user restart has been initiated, the cloud based server 1408 can instruct the variable frequency pool pump controller 2202 to restart the pump motor 2214 via wireless adapter 2204 at process block 2420. The variable frequency pool pump controller 2202 can then turn on the pump motor at process block 2402.

In one embodiment, a user can be presented with an option to restart the pump motor 2214 on the user device 2212. The user can be presented with an option to restart the pump motor 2214 anytime the pump motor 2214 is shut down. Alternatively, the option to restart the pump motor 2214 can be based on the parameter that caused the shutdown. For example, the option to restart the pump motor 2214 may not be available when the parameter that exceeded the predetermined value indicates an electrical short or ground fault. In a further embodiment, the wireless adapter 2204 can continuously monitor the parameters associated with the variable speed pool pump controller 2202 and provide a user with an option to restart the pump motor 2214 when the parameter associated with the variable speed pump controller 2202 no longer exceeds the predetermined value. For example, if the pump motor 2214 was shut down due to a parameter associated with the exceeding a predetermined value, the wireless gateway 2204 can provide the user with the option to restart the pump motor 2214 when the parameter associated with the temperature of the variable speed pool pump controller 2202 falls below the predetermined value. In a further embodiment, the option to restart the pump motor 2214 can be provided on the user device 2212 when the variable speed pool pump controller 2202 has been shut down. When a user then attempts to restart the pump motor 2214, the wireless gateway 2204 can first determine if a restart is possible, based on the reason for the shutdown. If it is not, the wireless gateway 2204 can have an alert pushed to the user device 2212 indicating that a remote restart is not available. In some embodiments, the wireless adapter 2204 can further push a message to the user device 2212 explaining why a remote reset of the pump motor 2214 is not currently available.

Figure 25:
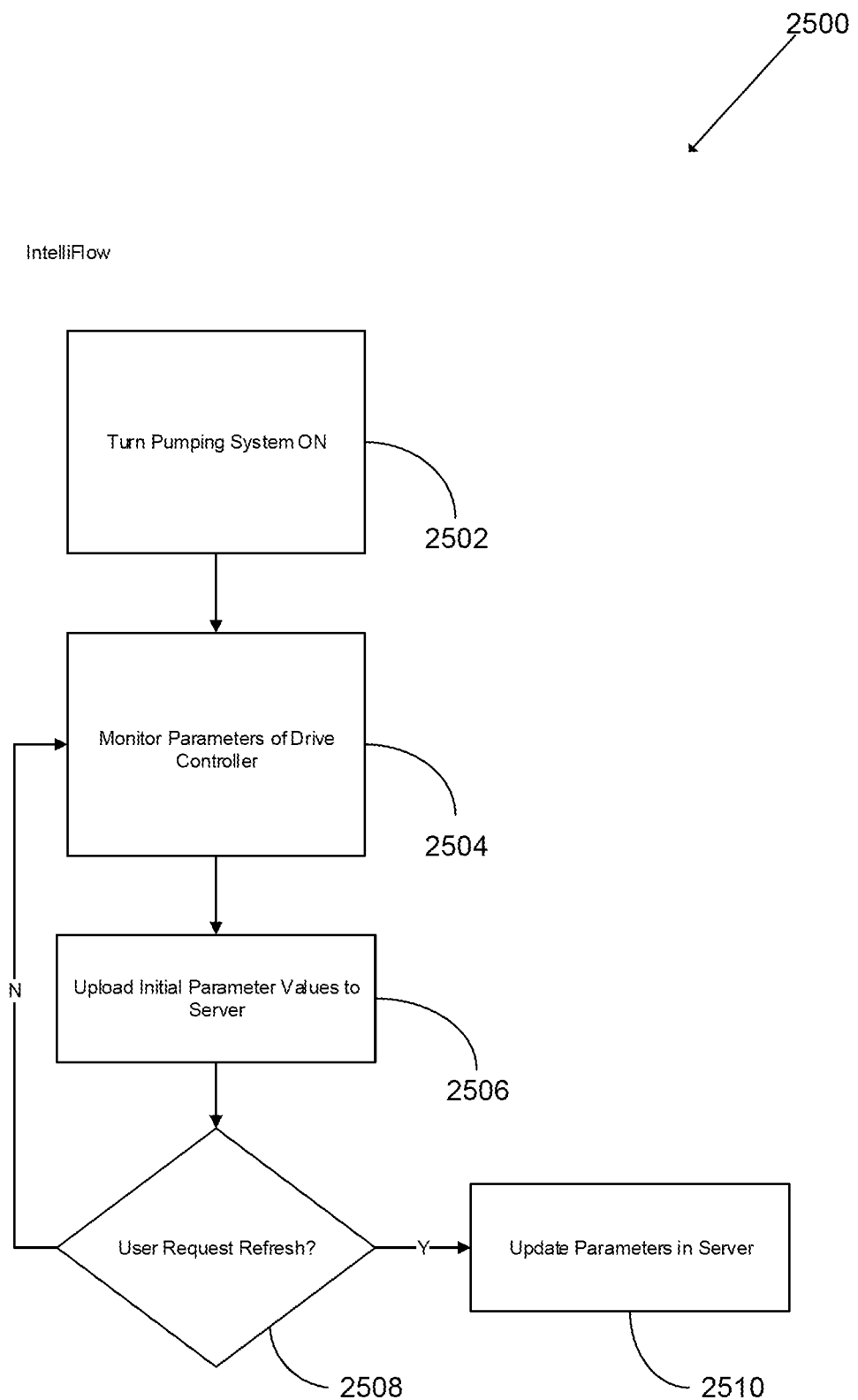
FIG. 25 is a flow chart of a user requested parameter update process for a variable speed pool pump control system.

FIG. 25 illustrates a user requested parameter update process 2500. At process block 2502, the variable speed pool pump controller 2202 can be turned on. At process block 2504, the wireless adapter 2204 can monitor parameters associated with the variable speed pool pump controller 2202. Parameters can include the parameters listed in Table 2 above. At process block 2506, the wireless adapter 2204 can upload an initial set of parameter values to the cloud based server 2208. In some embodiments, all parameters associated with the variable speed pool pump controller 2202 can be uploaded to the cloud based server 2208. Alternatively, a select subset of the parameters associated with the variable speed pool pump controller 2202 can be uploaded to the cloud based server 2208. At process block 2508, the process 2500 can determine if a user has requested a parameter refresh. In one embodiment, the user can request a parameter refresh by performing a "refresh" operation on the user device 2212. A "refresh" operation can include selecting a refresh button, performing an action such as a gesture on the user device 2212, and/or refreshing an internet browser. The refresh operation can provide a message to the cloud based server 2208 via the user device 2212 that a refresh is requested. The cloud based server 2208 can then communicate a request to the wireless adapter 2204 to provide updated parameters. If no user requested refresh is detected at process block 2508, the wireless adapter 2204 can continue to monitor parameters at process block 2504. If a user refresh request is provided, the wireless adapter 2204 can transmit updated parameters to the cloud based server 2208 at process block 2510.

Figure 26:
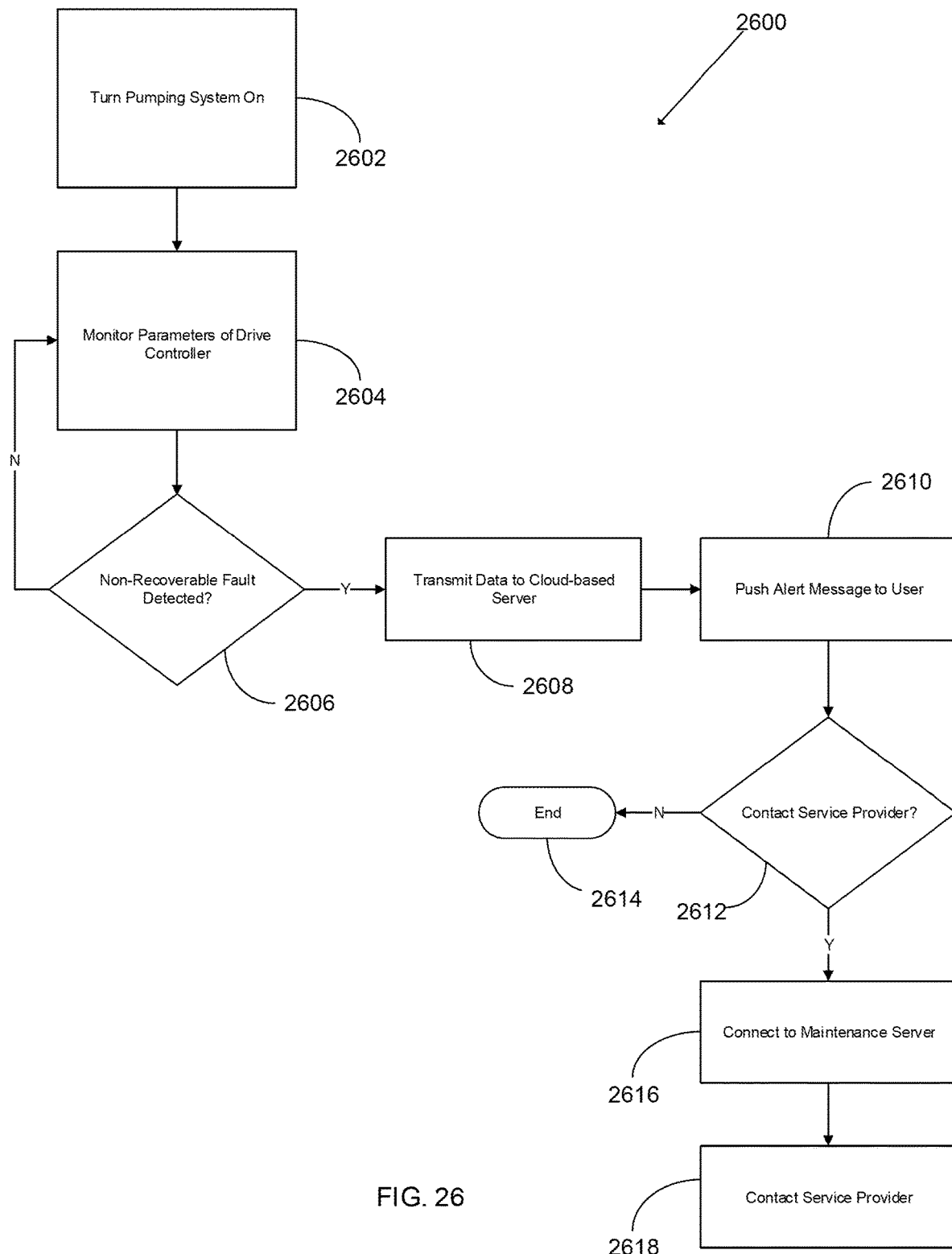
FIG. 26 is a flow chart of a service provider alert process for a variable speed pool pump control system.

FIG. 26 illustrates a service provider alert process 2600. At process block 2602, the variable speed pool pump controller 2202 can be turned on. At process block 2604, the wireless adapter 2204 can monitor parameters associated with the variable speed pool pump controller 2202. The monitored parameters can include the parameters shown above in Table 2. At process block 2606, the wireless adapter 2204 can determine if a nonrecoverable fault condition has been detected. Examples of nonrecoverable fault conditions can include ground faults, over-voltage, over-current, short circuit, no motor start, loss of communication, loss of prime, or other relevant faults. If a nonrecoverable fault condition is not detected, the wireless adapter 2204 can continue to monitor the parameters associated with the battery backup pump control system at process block 2604. Where a nonrecoverable fault is detected, the wireless adapter 2204 can transmit the fault data to the cloud based server 2208 at process block 2608. The cloud based server 2208 can then push an alert message to a user device 2212 to inform the user of the nonrecoverable fault at process block 2610. In one embodiment, the alert message can inform a user that maintenance is required.

At process block 2612, the user device 2212 can provide the user with an option to contact a service provider. In one embodiment, the user device 2212 can receive a message from the cloud based server 2208 to provide the user with the option to contact a service provider. Alternatively, the user device 2212 can automatically provide the option to contact a service provider when the user device 2212 receives the message from the cloud based server 2208 indicating the nonrecoverable fault has occurred. If the user does not choose to contact a service provider at process block 2612, the process can end at process block 2614. If the user does choose to contact a service provider, a connection can be made to a maintenance server at process block 2616. In one embodiment, the maintenance server can be located in the cloud based server 2208. Alternatively, the maintenance server can be in a separate cloud based server. Further, the maintenance server can be the cloud based server 2208. In one embodiment, the user device 2212 can establish a connection with the maintenance server directly. Alternatively, the user device 2212 can transmit a message to the cloud based server 2208 indicating that the user has selected to contact the service provider. The cloud based server 2208 can then access the maintenance server.

In one embodiment, the maintenance server can contain contact information for service providers authorized to provide maintenance to the variable speed pool pump controller 2202. The maintenance server can have access to a user profile of the user and/or the product registration data provided by the user, such as discussed above. Alternatively, information from the user profile and/or product registration can be provided to the maintenance server via the cloud based server 2208. Using the information contained in the user profile and/or product registration data, the maintenance server can filter the possible service providers based on product data (make, model, installation, years in service, etc) as well as user data (geographic location, usual distributor, past maintenance, etc.). This can allow for the proper service provider to be contacted, which can allow for more efficient product repair.

In a further embodiment, parameters associated with the nonrecoverable fault can be analyzed in the cloud based server 2208. The cloud based server 2208 can analyze the parameters associated with the fault and provide the analysis to the maintenance server. Based on the analysis, the maintenance server can create a list of materials needed to perform the maintenance. Examples of potential replacement parts can include terminal blocks, control boards, inductors, sensors, capacitors, control panels, transducers, fans, inverter/converter modules, pump, motor, filters, strainers, etc. Further, if there is sufficient data regarding the installation of the product, additional replacement parts can be automatically obtained. For example, certain repairs can require new plumbing fittings, such as pipes, elbows, couplers, reducers, valves, etc. If a complete bill of material (BOM) is available to the cloud based server 2208 regarding the initial installation of the variable speed control system ADA, the cloud based server 2208 can analyze the BOM to determine which additional parts may be needed. Additionally, in some embodiments the maintenance server can have access to stock levels of replacement parts on hand for the service providers. Once the proper service provider is determined, the maintenance and/or cloud based server 2208 server can evaluate the stock list of the relevant service provider to determine if there is sufficient stock to perform the needed repair. If not, the maintenance and/or cloud based server 2208 can place an order for the replacement parts needed to perform the repair. For example, the maintenance and/or cloud based server 2208 can order the replacement parts from other service providers. Further, the maintenance and/or cloud based server 2208 can order the parts from a distributor or dealer. Finally, in some instances, the maintenance and/or cloud based server 2208 can order the parts directly from the manufacturer. In some embodiment, the maintenance and/or cloud based server 2208 server can automatically order the replacement parts once the user chooses to contact a service provider. Alternatively, the cloud based server 2208 can push a message to the user device 2212 requiring the user to approve any orders. In some examples, the maintenance and/or cloud based server 2208 server can provide an actual or estimated cost of the required replacement parts that can be provided to the user. Further, the maintenance server can wait until authorization is provided from the service provider before any replacement parts are issued.

At process block 2618, the service provider can be contacted. In one embodiment, the maintenance and/or cloud based server 2208 can contact the service provider. The maintenance and/or cloud based server 2208 can contact the service provider in various ways. In one example, an electronic message can be transmitted to the service provider regarding the maintenance issue. Examples of electronic messages can include text messages (SMS, MMS, etc.), e-mail, instant message, etc. Further, the maintenance and/or cloud based server 1408 can contact the service provider by using an automated voice message. The messages provided to the service provider can include information relating to the contact information and address of the user, the nature of the problem, the fault and associated parameters, historical data (previous service performed, faults received over time, etc), and/or the list of expected replacement parts. Further, in some embodiments, the user can be presented with a questionnaire when the user chooses to contact the service provider. The questionnaire can allow the user to select best times and methods for contacting the user and best times for the service provider to schedule the appointment. In further embodiments, the maintenance and/or cloud based server 2208 can have access to a scheduling/work order system of the service provider and can schedule an appointment automatically in the system.

Figure 27:
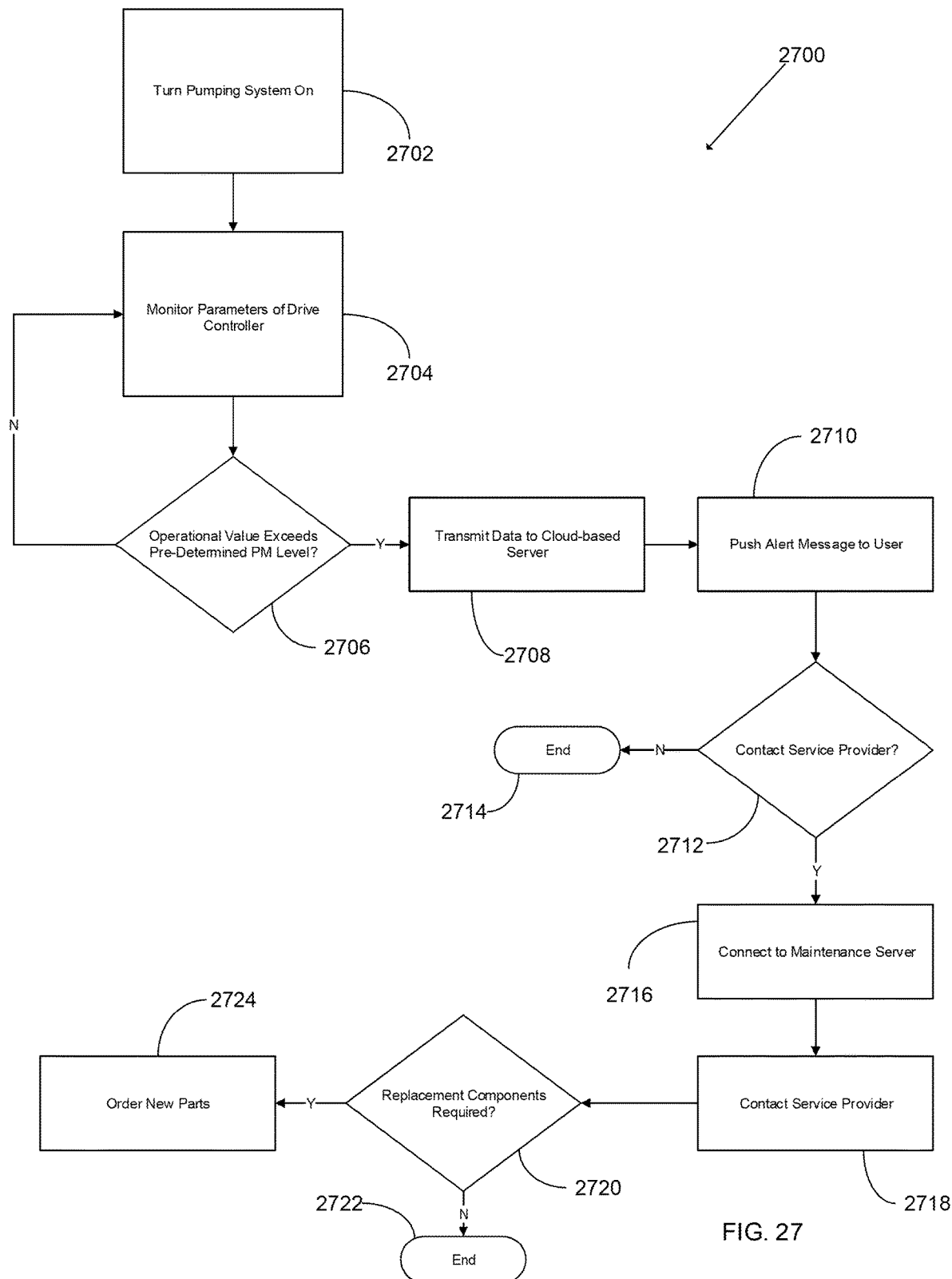
FIG. 27 is a flow chart of a preventative maintenance process for a variable speed pool pump control system.

FIG. 27 illustrates a preventative maintenance process 2700. At process block 2702, the variable speed pump controller 2202 can be turned on. At process block 2704, the wireless adapter 2204 can monitor parameters associated with the operation of the battery backup sump pool pump control system 2202. Examples of parameters can include those listed above in Table 2, as well as faults, including ground faults, over-voltage, over-current, short circuit, no motor start, loss of communication, or other relevant faults. At process block 2706, the wireless adapter 2204 can determine if any of the parameters exceed predetermined preventative maintenance values. In one embodiment, the predetermined preventative maintenance values can be set by the user; alternatively, the predetermined values can be inherently set within the variable speed pool pump controller 2202. In a further embodiment, the wireless adapter 2204 can determine if any fault condition parameters have been generated by the variable speed pool pump controller 2202 at process block 2706 that would be related to the need for preventative maintenance. For example, over-temperature faults, over-voltage/current faults, and under-voltage faults can be indicative of the need for preventative maintenance. If no parameters exceed the predetermined preventative maintenance values at process block 2706, the process 2700 can return to process block 2704 and continue to monitor parameters associated with the variable speed pool pump controller 2202. If a parameter is determined to exceed a predetermined preventative maintenance value at process block 2706, the wireless adapter 2204 can transmit data to the cloud based server 2208 indicating that one or more parameters have exceeded the predetermined preventative maintenance values at process block 2708. The cloud based server 2208 can then generate and push an alert message to the user device 2212 at process block 2710. In one embodiment, the cloud based server 2208 can push an alert message to a user's internet connected device 2212 using methods discussed above. In one embodiment, the alert message can inform the user that preventative maintenance is required for the variable speed pool pump controller 2202.

At process block 2712, the user can be presented with an option to contact a service provider. In one embodiment, the user can be presented with the option to contact the service provider via the user device 2212. In a further embodiment, the user device 2212 can receive a message from the cloud based server 2208 to provide the user with the option to contact a service provider. Alternatively, the user device 2212 can automatically provide the option to contact a service provider when the user device 2212 receives the message from the cloud based server 2208, indicating one or more of the parameters have exceeded the predetermined preventative maintenance level(s). If the user chooses to not to contact a service provider at process block 2712, the process can end at process block 2714. If the user does choose to contact a service provider, a connection can be made to a maintenance server at process block 2716. In one embodiment, the maintenance server can be located in the cloud based server 2208, as discussed above. Alternatively, the maintenance server can be in a separate cloud based server. Further, the maintenance server can be the cloud based server 2208. In one embodiment, the user device 2212 can establish a connection with the maintenance server directly. Alternatively, the user device 2212 can transmit a message to the cloud based server 2208, indicating that the user has selected to contact the service provider. The cloud based server 2208 can then access the maintenance server to contact the service provider.

At process block 2718, the service provider can be contacted. In one embodiment, the maintenance and/or cloud based server 2208 can contact the service provider. The maintenance and/or cloud based server 2208 can contact the service provider in various ways. In one example, an electronic message can be transmitted to the service provider regarding the maintenance issue. Examples of electronic messages can include text messages (SMS, MMS, etc.), e-mail, instant message, etc. Further, the maintenance and/or cloud based server 1408 can contact the service provider by using an automated voice message. The messages provided to the service provider can include information relating to the contact information and address of the user, the nature of the problem, the fault and associated parameters, historical data (previous service performed, faults received over time, etc), and/or the list of expected replacement parts. Further, in some embodiments, the user can be presented with a questionnaire when the user chooses to contact the service provider. The questionnaire can allow the user to select best times and methods for contacting the user and best times for the service provider to schedule the appointment. In further embodiments, the maintenance and/or cloud based server 2208 can have access to a scheduling/work order system of the service provider and can schedule an appointment automatically in the system.

At process block 2720, the maintenance and/or cloud based server 2208 can analyze the parameters exceeded the predetermined preventative maintenance values to determine what, if any, replacement components may be required. Based on the analysis, the maintenance server and/or cloud based server 2208 can create a list of materials needed to perform the preventative maintenance. Examples of potential replacement parts can include terminal blocks, control boards, inductors, sensors, capacitors, control panels, transducers, fans, inverter/converter modules, pump, motor, etc. Further, if there is sufficient data regarding the installation of the product, additional replacement parts can be automatically obtained. For example, certain repairs can require new plumbing fittings, such as pipes, elbows, couplers, reducers, valves, etc. If a complete bill of material (BOM) is available to the cloud based server 2208 regarding the initial installation of the variable speed pool pump controller 2202, the cloud based server 2208 can analyze the BOM to determine which additional parts may be needed.

If no replacement parts are needed, the process 2700 can end at process block 2722. However, if the analysis indicates that replacement parts will be needed, the maintenance and/or cloud based server 2208 can order the replacement parts at process block 2724. In some embodiments, the maintenance server can have access to stock levels of replacement parts on hand for the service providers. Once the proper service provider is determined, the maintenance server can evaluate the stock list of the relevant service provider to determine if there is sufficient stock to perform the needed repair. If not, the maintenance server can place an order for the replacement parts needed to perform the repair. For example, the maintenance server can order the replacement parts from other service providers Further, the maintenance server can order the parts from a distributor or dealer. Finally, in some instances, the maintenance server can order the parts directly from the manufacturer. In some embodiments, the maintenance server can automatically order the replacement parts once the user chooses to contact a service provider. Alternatively, the cloud based server 2208 can push a message to the user device 2212 requiring the user to approve any orders. In some examples, the maintenance server can provide an actual or estimated cost of the required replacement parts that can be provided to the user. Further, the maintenance and/or cloud based server 2208 can wait until authorization is provided from the service provider before any replacement parts are ordered.

Figure 28:
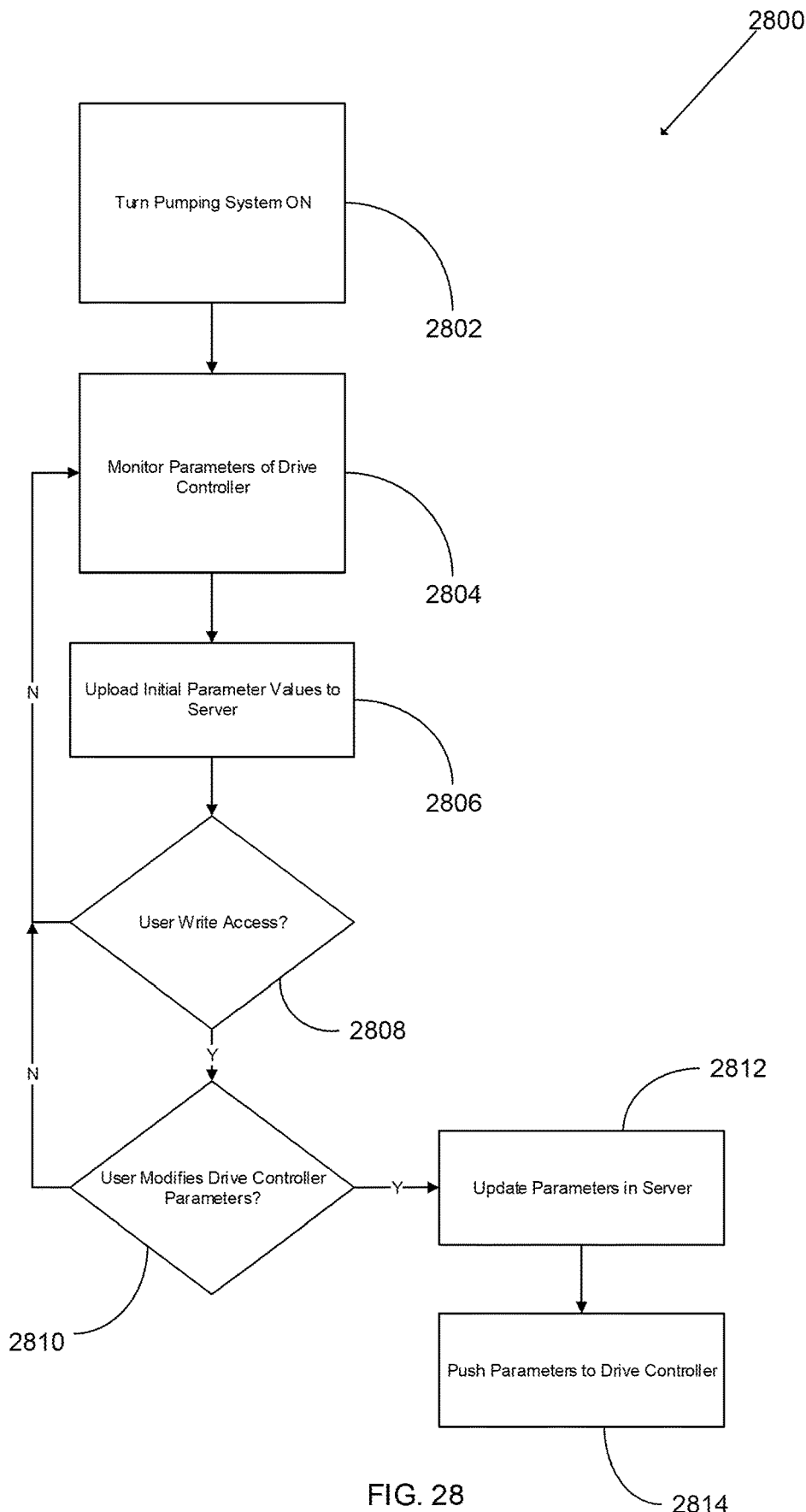
FIG. 28 is a flow chart of a remote parameter modification process for a variable speed pool pump control system.

FIG. 28 illustrates a remote parameter modification process 2800. At process block 2802, the variable speed pool pump controller 2202 can be turned on. At process block 2804, the wireless adapter 2204 can monitor parameters associated with the variable speed pool pump controller 2202. Parameters can include the parameters listed in Table 2 above. At process block 2806, the wireless adapter 2204 can upload an initial set of parameter values to the cloud based server 2208. In some embodiments, all parameters associated with the variable speed pool pump controller 2202 can be uploaded to the cloud based server 2208. Alternatively, a select subset of the parameters associated with the variable speed pump controller 2202 can be uploaded to the cloud based server 2208. At process block 2808, a user can attempt to modify the parameters in the cloud based server 2208 remotely using a user device 2212. If the user is not attempting to modify the parameters remotely, the wireless adapter 2204 can continue to monitor parameters associated with the variable speed pool pump controller 2202. At process block 2808, the process 2800 can determine if a user, via a user account, has remote write access. In one embodiment, a user can select during the initial setup of the variable speed pool pump controller 2202 if write access will be allowed. In some examples, write access can be associated with a remote user device 2212. In some embodiments, a user can be required to enter a passcode before write access is enabled. In other embodiments, the write access can be limited to a specific user device 2212. For example, only a user device with a specific MAC address can be associated with write access.

If no user write access exists, the wireless adapter 2204 continues to monitor the parameters associated with the variable speed pool pump controller 2202 at process block 2804. If the user does have write access, the parameters can be updated in the cloud based server 2208 at process block 2812. In one embodiment, a user with write access can modify any parameter, such as those listed in Table 2 above. Alternatively, the parameters that can be modified remotely can be limited to a certain subset of the parameters associated with the variable speed pump controller 2202. Once the parameters have been updated in the cloud based server 2208, the cloud based server 2208 can push the modified parameters to the variable speed pool pump controller 2202 via the wireless adapter 2204 at process block 2814.

Figure 29:
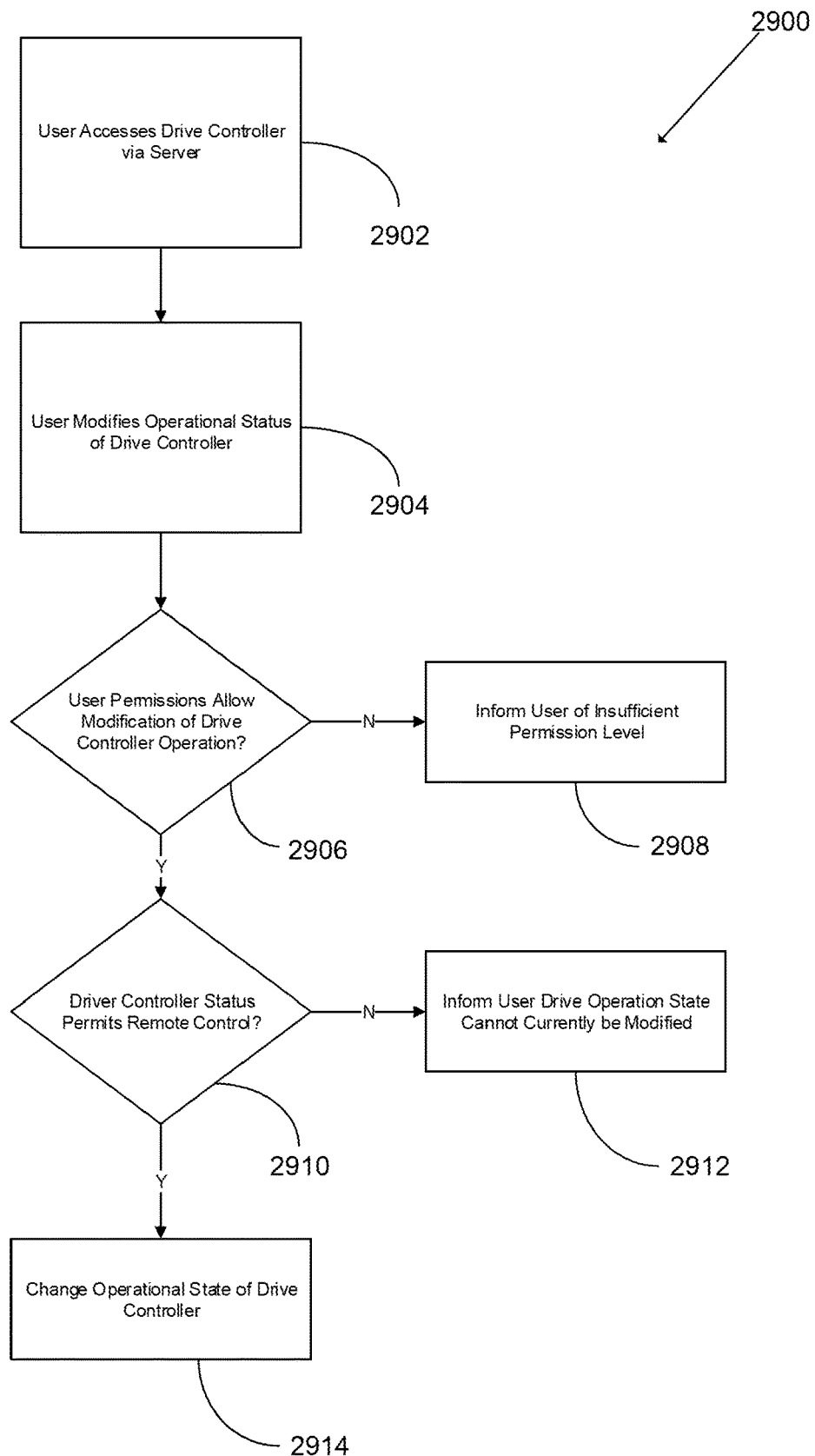
FIG. 29 is a flow chart of a remote control process for a variable speed pool pump control system.

FIG. 29 illustrates a remote control process 2900 for a variable speed pool pump controller 2202. At process block 2902, a user can access the variable speed pool pump controller 2202 using a user device 2212. In one embodiment, the user can access the variable speed pool pump controller 2202 by transmitting a request to the cloud based server 2208. The cloud based server 2208 can then relay the request to the wireless adapter 2204 which can provide access to the variable speed pump controller. At process block 2904, the user can attempt to modify an operational parameter of the variable speed drive controller 2202. Examples of operational parameters can include start, stop, reset, speed, pressure setting, etc. At process block 2906, a permission level associated with the user is evaluated to determine if the user has permission to modify operational parameters of the variable speed drive controller 2202. In one embodiment, a user can select during the initial setup of the variable speed pool pump controller 2202 permission levels. In some examples, the permission levels can be associated with the remote user device 2212. For example, only a user device with a specific MAC address can be associated with write access. Alternatively, a passcode can be associated with certain permission levels. For example, some operational parameters may be able to be accessed without any passcode, while others may require the user to enter a passcode to obtain the proper permission level. Thus, different operational parameters can be associated with different permission levels. Additionally, permission levels can depend on the specific user who is attempting to access the variable speed pool pump controller 2202. For example, one household user having a user account associated with the variable speed pool pump controller 2202 may have full permission to modify operational parameters, while other household users having user accounts associated with the same variable speed pool pump controller 2202 may have limited or no permission to modify operational parameters of the variable speed pump controller 2202. In some embodiments, one user associated with the variable speed pump controller can have "administrative" privileges, allowing full permission to all operational parameters. The user with administrative privileges can then assign permission levels to other users associated with the variable speed pool pump controller 2202.

If the user does not have a sufficient permission level to modify the selected operational parameter, an alert message can be pushed to the user device 2212 at process block 2908. The alert message can inform the user that they have insufficient permission to remotely modify the selected operational parameter. If the user is determined to have a sufficient permission level to modify the selected operational parameter, it can then be determined whether the variable speed pool pump controller 2202 allows remote control at process block 2910. In some embodiments, a user can disable the variable speed pump controller from accepting remote modifications. Alternatively, the variable speed pool pump controller 2202 can be set to only accept remote commands during certain time periods. Further, the variable speed pool pump controller 2202 can be set to only accept remote commands where other parameters are within a given range. For example, if the water pressure is determined to be low, the variable speed pool pump controller 2202 may prevent remote commands that could further lower the water pressure. If the variable speed pool pump controller 2202 does not allow remote operation, an alert message can be pushed to the user device 2212 at process block 2912. The alert message can inform the user that the operational parameters cannot currently be modified. If the variable speed pool pump controller 2202 does allow remote modification of operational parameters, the operational state of the variable speed pool pump controller 2202 can be modified at process block 2914.

Figure 30:
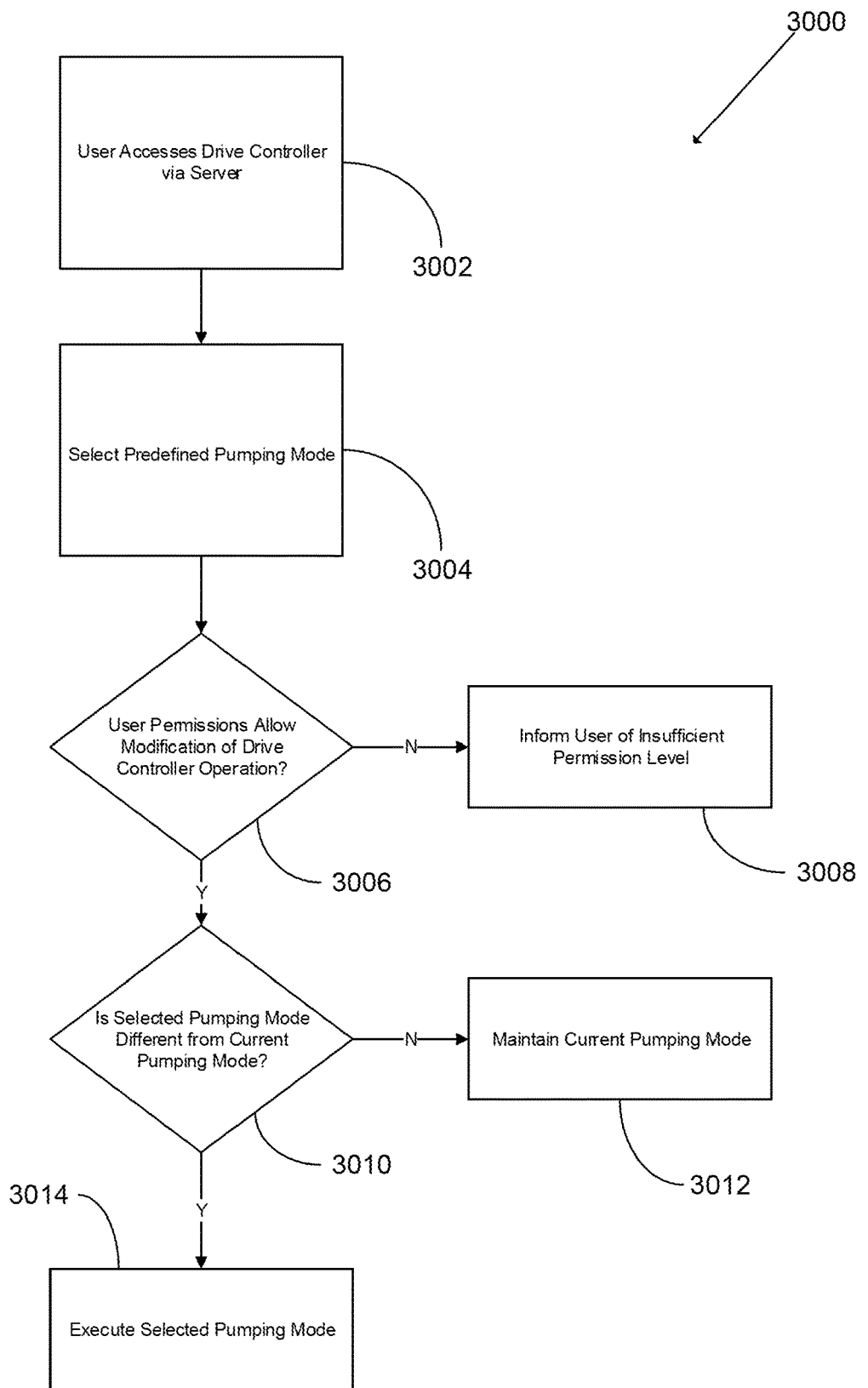
FIG. 30 is a flow chart of a remote mode control process for a variable speed pool pump control system.

FIG. 30 illustrates a remote mode control process 3000. At process block 3002, a user can attempt to remotely access the variable speed pool pump controller 2202. In one embodiment, the user can use a user device 2212 to access the variable speed pool pump controller 2202. Further, the user device 2212 can communicate with the variable speed pool pump controller 2202 by first communicating with the cloud based server 2208 which can then communicate with the variable speed pool pump controller 2202 via the wireless adapter 2204. Once the user has accessed the variable speed pool pump controller 2202, the user can then select a predetermined pumping mode from a plurality of defined pumping modes at process block 3004. Example pumping modes can include standard pump modes, backwash pump modes, extra-filter pump modes, vacuum pump modes, etc. In one example, the variable speed pool pump controller 2202 can include a plurality of user defined pumping modes, which can further be selected by the user. The user defined pumping modes can include specific pump speeds that operate for given amounts of time, along with other types of pumping modes.

At process block 3006, a permission level associated with the user is evaluated to determine if the user has permission to modify the pumping mode of the variable speed drive controller 2202. In one embodiment, a user can select permission levels during the initial setup of the variable speed pool pump controller 2202. In some examples, the permission levels can be associated with the remote user device 2212. For example, only a user device with a specific MAC address can be associated with a specific permission level. Alternatively, a passcode can be associated with certain permission levels. For example, some pumping modes may be able to be accessed without any passcode, while others may require the user to enter a passcode to obtain the proper permission level. Thus, different pumping modes can be associated with different permission levels. Additionally, permission levels can depend on the specific user who is attempting to access the variable speed pool pump controller 2202. For example, one household user having a user account associated with the variable speed pool pump controller 2202 may have full permission to modify pumping modes, while other household users having user accounts associated with the same variable speed pool pump controller 2202 may have limited or no permission to modify pumping modes of the variable speed pump controller 2202. In some embodiments, one user associated with the variable speed pump controller can have "administrative" privileges, allowing full permission to all operational parameters. The user with administrative privileges can then assign permission levels to other users associated with the variable speed pool pump controller 2202.

If the user does not have a sufficient permission level to remotely select the pumping mode, an alert message can be pushed to the user device 2212 at process block 3008. The alert message can inform the user that they have insufficient permission to remotely select the pumping mode. If the user is determined to have a sufficient permission level to select the pumping mode, it can then be determined whether the selected pumping mode is different than the current pumping mode at process block 3010. If the variable speed pool pump controller 2202 is currently operating in the selected pumping mode, the variable speed pool pump controller 2202 can continue to operate in the current mode at process block 3012. In some embodiments, an alert message can be pushed to the user device 2212 to inform the user that the pump is already operating in the selected mode. If the variable speed pool pump controller 2202 is currently operating in a different pumping mode, the pumping mode of the variable speed pool pump controller 2202 can be modified at process block 3014.

Automated Aquatic Device Controllers

The following paragraphs are directed to the use of a wireless adapter device to provide for wireless access and/or control of automated aquatic device controllers. Example automated aquatic device controllers can include products such as INTELLITOUCH® Systems, Compool®, Easy-Touch® Control Systems, PL4 and PSL4 Pool and Spa Control Systems, IntelliComm, ScreenLogic2, and Sun-Touch Control Systems from Pentair. However, other automated aquatic device controllers with a suitable communication port can be used. The automated aquatic device controllers described below can generally both monitor parameters and other characteristics of connected aquatic devices. Further, in some examples, the automated aquatic device controllers can also control connected aquatic devices. Aquatic devices can include pumps, pump controllers, variable speed pump controllers, chlorinators, water softeners, water features, filters, lights, pH balancers, etc. In some examples, a single automated aquatic device controller can monitor and control multiple aquatic devices.

Figure 31:
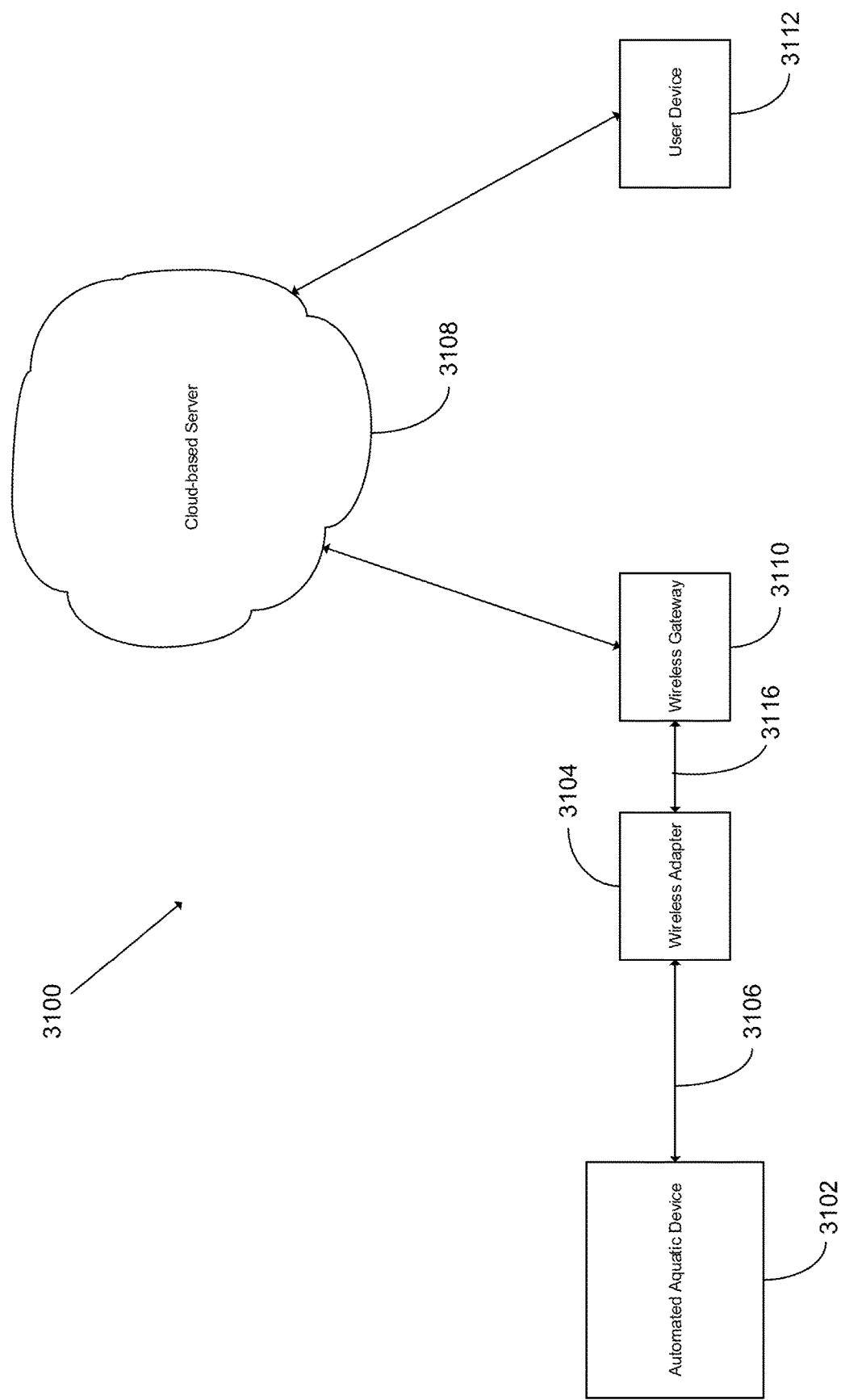
FIG. 31 is a block diagram of an exemplary automated aquatic device control system.

FIG. 31 illustrates an automated aquatic device control system 3100. An automated aquatic device controller 3102, as discussed above, can be in communication with a wireless adapter 3104 via communication line 3106. In one embodiment, the wireless adapter 3104 can be a wireless adapter as discussed above. The wireless adapter 3104 can communicate with a cloud based server 3108 via a wireless gateway 3110 using a wireless connection 3116. In one embodiment, the wireless gateway 3110 communicates with the cloud based server 3108 via an internet connection. In some embodiments, the wireless gateway 3110 can connect to the Internet via a router and/or modem. The cloud based server 3108 can be in communication with one or more user devices 3112. Further, the automated aquatic device controller 2202 can be coupled to one or more aquatic devices (not shown).

Figure 32:
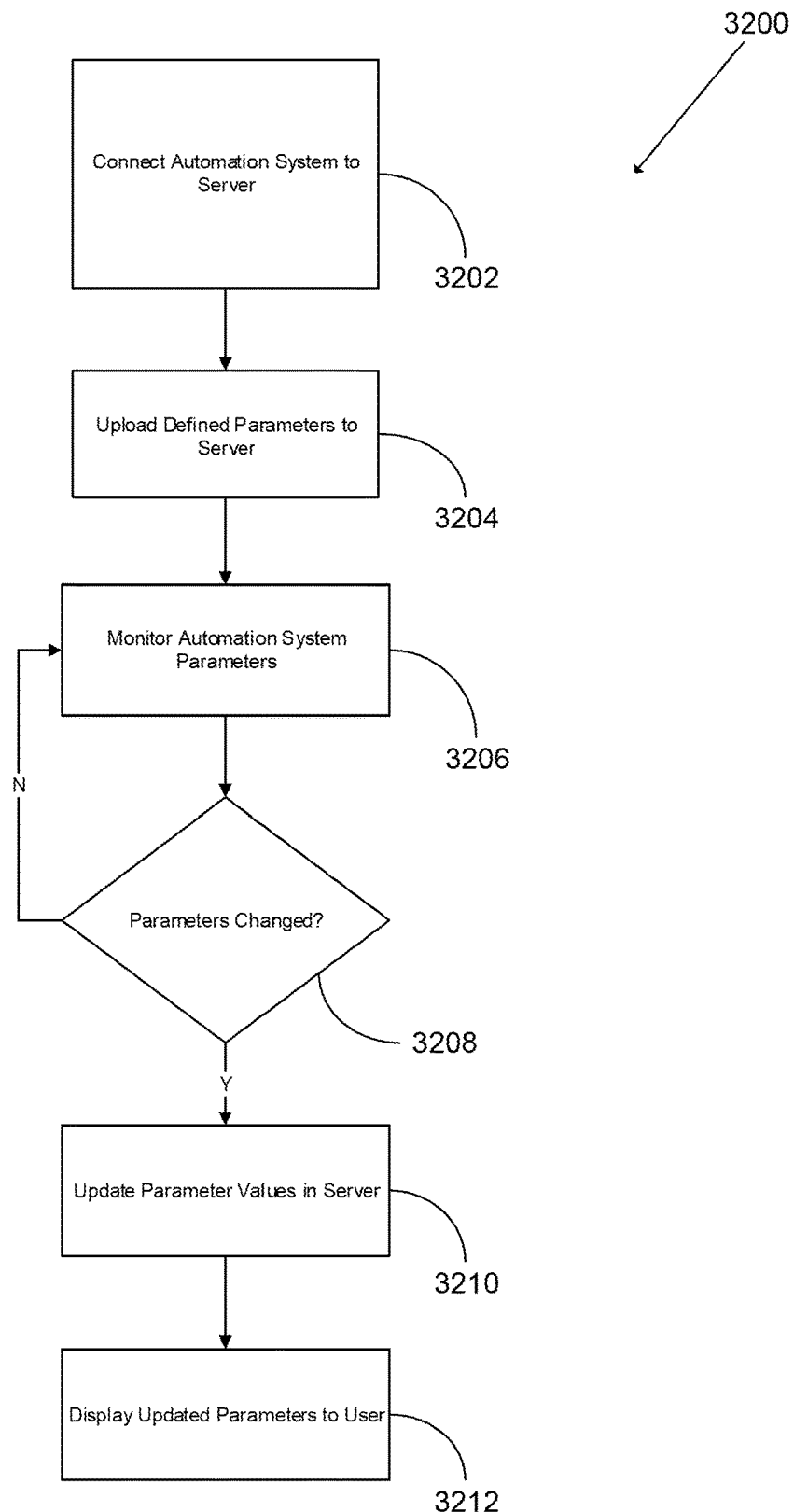
FIG. 32 is a flow chart of a remote parameter display process for an automated aquatic device control system.

FIG. 32 illustrates a remote parameter display process 3200. At process block 3202, the automated aquatic device controller 2202 can be connected to the cloud based server 3108 via the wireless adapter 3104. Once the automated aquatic device controller 3102 is connected to the cloud based server 3108, the automated aquatic device controller 3102 can upload defined parameters to the cloud based server 3108. In one embodiment, the parameters can be selected by a user when setting up the automated aquatic device controller 2202. Alternatively, the user can select which parameters specifically are to be uploaded to the cloud based server 3108. In one example, the automated aquatic device controller 3102 can have access to all of the parameters of the devices connected to the automated aquatic device controller 3102. Thus, in one example, the parameters listed above in Tables 1 and 2 could be uploaded to the cloud based server 3108 by the automated aquatic device controller 3102. Additionally, other parameters associated with additional aquatic devices can further be uploaded to the cloud based server 3108.

At process block 3206, the defined parameters can be monitored. In one embodiment, the wireless gateway 3104 can monitor the parameters. Alternatively, the automated aquatic device controller 3102 can be configured to monitor the defined parameters. Further, the defined parameters can be constantly uploaded to the cloud based server 3108. At process block 3208, the cloud based server 3108 can determine if the parameter values have changed. In an alternate embodiment, the wireless adapter 3104 can internally store the parameter values and can determine if the parameter values have changed before transmitting the parameter values to the cloud based server 3108. In a further embodiment, the automated aquatic device controller 2202 can be configured to determine when the defined parameters have changed. In one embodiment, tolerance windows can be selected to allow for some fluctuation in the parameter values that would not qualify as a change in parameter values. Thus, in some examples, the parameter values are not considered to have changed if the amount of change is within a tolerance window. In some embodiments, the tolerance window can be set by a user. Alternatively, the tolerance window can be predetermined in the automated aquatic device controller 2202. Further, the tolerance window can be defined in the cloud based server 3108. If the parameter values have not changed, the defined parameters can continue to be monitored at process block 3204. If the parameters have changed, the cloud based server 3108 can be updated to reflect the changed parameters at process block 3210. In some embodiments, the changed parameters can be highlighted so that when a user accesses the parameters on the cloud based server 3108, the user can quickly determine which parameters have changed. In some embodiments, the cloud based server 3108 can push an alert message to a user device 3112 when one or more of the parameters change. In one embodiment, the cloud based server 3108 can push an alert message to a user's internet connected device 3112 using methods discussed above. The alert message can inform the user that the parameter has changed and can, in some examples, display the changed parameter in the alert message at process block 3212.

Figure 33:
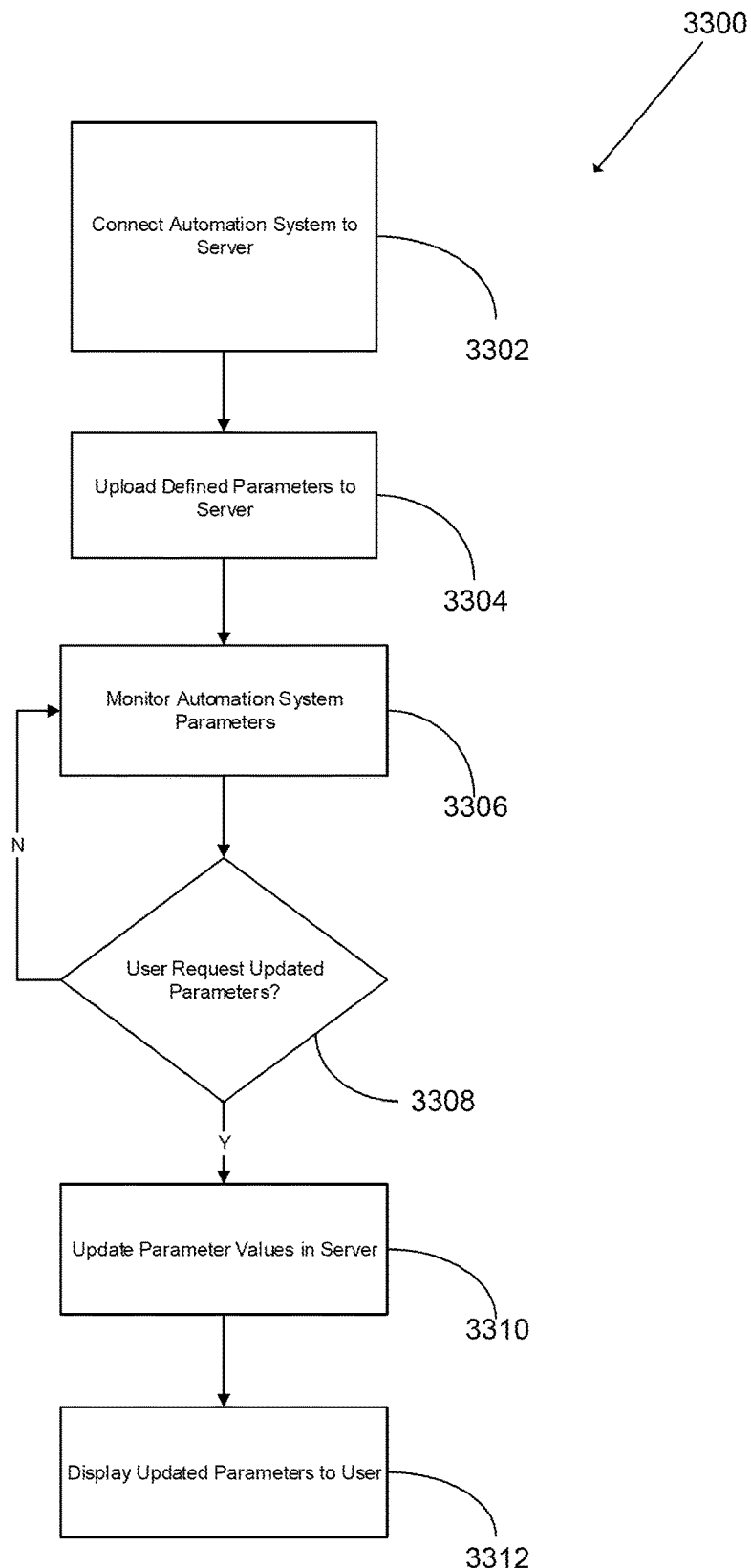
FIG. 33 is a flow chart of a user requested parameter update process for an automated aquatic device control system.

FIG. 33 illustrates a user requested parameter update process 3300. At process block 3302, the automated aquatic device controller 3102 can be connected to the cloud based server 3108 via the wireless adapter 3104. Once the automated aquatic device controller 3102 is connected to the cloud based server 3108, the automated aquatic device controller 3102 can upload defined parameters to the cloud based server 3108 at process block 3304 via the wireless adapter 3104. In one embodiment, the uploaded parameters can be the same as those discussed above.

At process block 3306, the defined parameters can be monitored. In one embodiment, the wireless adapter 3104 can monitor the parameters. Alternatively, the automated aquatic device controller 3102 can be configured to monitor the defined parameters. Further, the defined parameters can be constantly uploaded to the cloud based server 3108. At process block 3308, the process 3300 can determine if a user has requested a parameter refresh. In one embodiment, the user can request a parameter refresh by performing a "refresh" operation on the user device 3112. A "refresh" operation can include selecting a refresh button, performing an action such as a gesture on the user device 3112, or refreshing an internet browser. The refresh operation can provide a message to the cloud based server 3108 that a refresh is requested. The cloud based server 3108 can then communicate to the wireless adapter 3104 to provide updated parameters. If no user requested refresh is detected at process block 3308, the wireless adapter 3104 can continue to monitor parameters at process block 3306. If a user request is provided, the wireless adapter 3104 can transmit updated parameters to the cloud based server 3108 at process block 3310. The updated parameters can then be displayed to the user at process block 3312.

Figure 34:
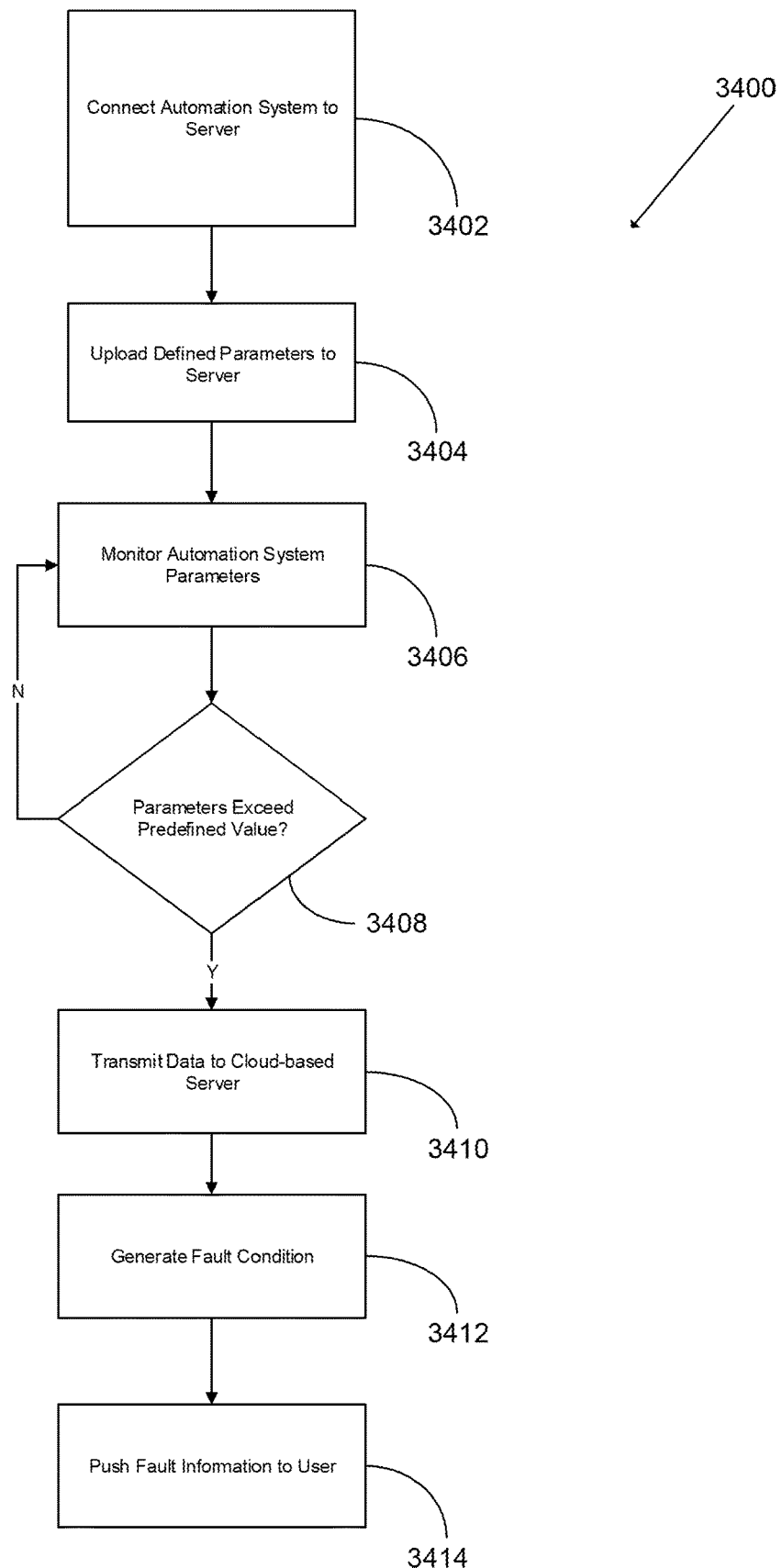
FIG. 34 is a flow chart of a remote fault warning process for an automated aquatic device control system.

FIG. 34 illustrates a remote fault warning process 3400. At process block 3402, the automated aquatic device controller 3102 can be connected to the cloud based server 3108, as discussed above. Once the automated aquatic device controller 3102 is connected to the cloud based server 3108, the automated aquatic device controller 3102 can upload defined parameters to the cloud based server 3108 at process block 3404. In one embodiment, the uploaded parameters can be the same as those discussed above. At process block 3406, the defined parameters can be monitored. In one embodiment, the wireless adapter 3104 can monitor the defined parameters. Alternatively, the automated aquatic device controller 3102 can be configured to monitor the defined parameters. Further, the defined parameters can be constantly uploaded to the cloud based server 3108. At process block 3408, the wireless adapter 3104 can determine if any of the parameters exceed predetermined values. In one embodiment, the predetermined values can be set by the user; alternatively, the predetermined values can be inherently set within the automated aquatic device controller 3102. In a further embodiment, the wireless adapter 3104 can determine if any fault condition parameters or messages have been generated by the automated aquatic device controller 3102. In some embodiments, the automated aquatic device controller 3102 can monitor coupled aquatic devices for any generated fault conditions. The automated aquatic device controller 3102 can subsequently communicate the generated fault conditions to the wireless adapter 3104. If no parameters exceed the predetermined values, or no fault messages have been generated at process block 3408, the process 3400 can return to process block 3406 and continue to monitor parameters associated with the automated aquatic device controller 3102. If a parameter is determined to exceed a predetermined value, or a fault condition is generated at process block 3408, the wireless adapter can transmit data to the cloud based server 3108 indicating that one or more parameters have exceeded a predetermined value (or a fault condition has been generated) at process block 3410. The cloud based server 3108 can then generate an alert message at process block 3412. The cloud based server 3108 can then push the alert message to a user device 3112 at process block 3414. In one embodiment, the cloud based server 3108 can push an alert message to a user's internet connected device 3112 using methods described above.

Figure 35:
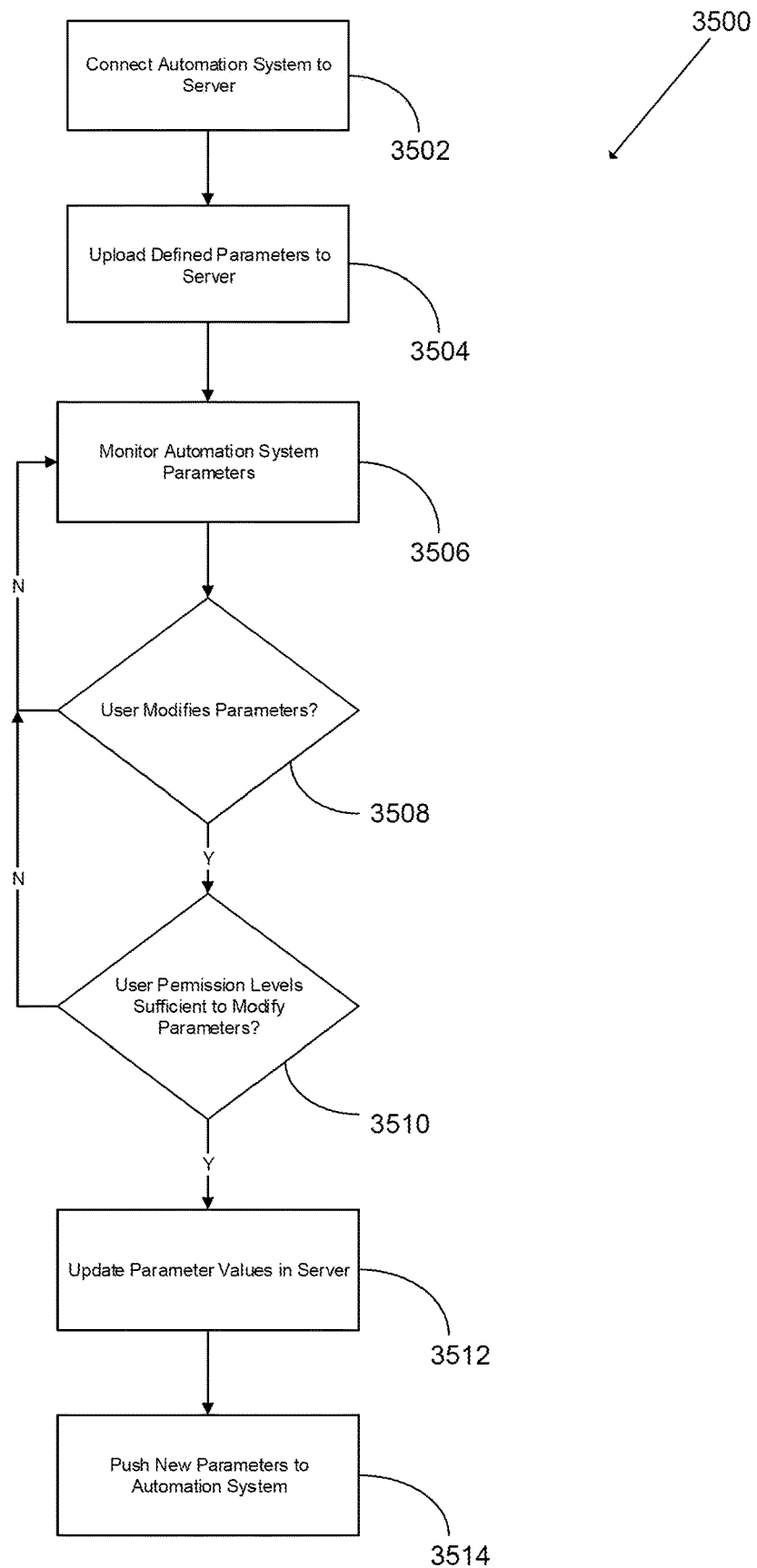
FIG. 35 is a flow chart of a remote parameter modification process for an automated aquatic device control system.

FIG. 35 illustrates a remote parameter modification process 3500. At process block 3502, the automated aquatic device controller 3102 can be connected to cloud based server 3108, as described above. Once the automated aquatic device controller 3102 is connected to the cloud based server 3108, the automated aquatic device controller 3102 can upload defined parameters to the cloud based server 3108 at process block 3504 via the wireless adapter 3104. At process block 3506, the defined parameters can be monitored. In one embodiment, the wireless adapter 3104 can monitor the defined parameters. Alternatively, the automated aquatic device controller 3102 can be configured to monitor the defined parameters. Further, the defined parameters can be constantly uploaded to the cloud based server 3108. At process block 3508, the process 3500 can monitor to see if a user attempts to modify a parameter. If a user does not attempt to modify a parameter, the process can continue to monitor the parameters at process block 3506. If a user does attempt to modify a parameter, the process 3500 can determine if a user, via a user account, has a sufficient permission level to modify the parameters at process block 3510. In one embodiment, a user can select, during the individual setup of the automated aquatic device controller 3102, the required permission level to modify parameters. Further, individual permission levels can be set for each aquatic device connected to the automated aquatic device controller 3102. In one embodiment, a user can set the required permission levels for each aquatic device on the automated aquatic device controller 3102. Alternatively, a user can set the required permission levels for each aquatic device on each individual aquatic device. In some embodiments, a user can be required to enter a passcode to provide a sufficient permission level to modify the parameters. Further, permission levels can be associated with specific users. Still further, permission levels can be associated with specific user devices 3112. For example, the cloud based server 3108 can determine a permission level associated with a specific MAC address associated with a user device 3112 to determine a permission level.

If the user does not have a sufficient permission level to modify the parameters, the process 3500 continues to monitor the parameters at process block 3506. If the user does have sufficient permission levels to modify parameters, the parameters can be updated in the cloud based server 3108 at process block 3512. The cloud based server 3108 can then push the new parameters to the automated aquatic device controller 3102 via the wireless adapter 3104 at process block 3514.

Figure 36:
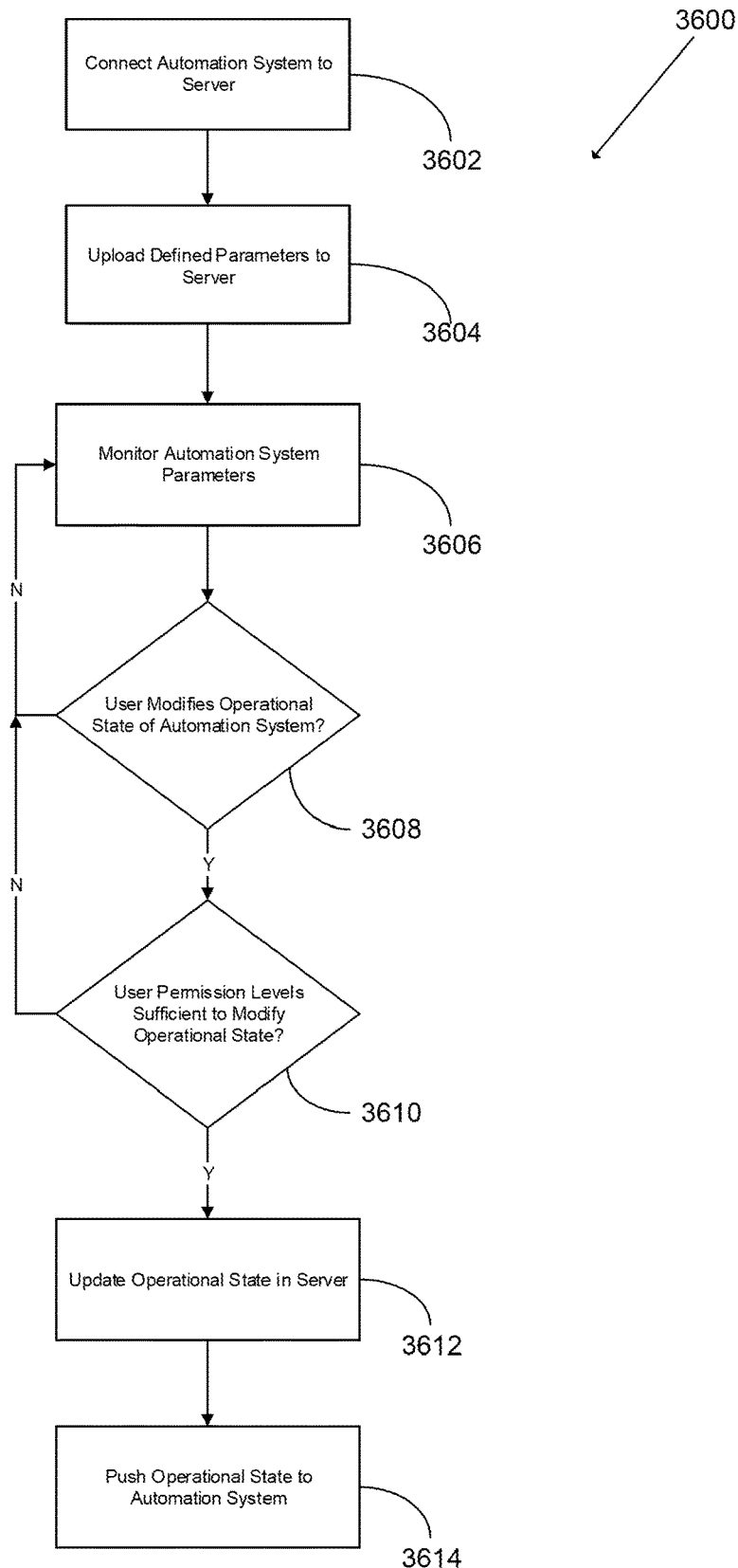
FIG. 36 is a flow chart of a remote control process for an automated aquatic device control system.

FIG. 36 illustrates a remote control process 3600 for the automated aquatic device controller 3102. At process block 3602, the automated aquatic device controller 3102 can be connected to cloud based server 3108, as described above. Once the automated aquatic device controller 3102 is connected to the cloud based server 3108, the automated aquatic device controller 3102 can upload defined parameters to the cloud based server 3108 at process block 3604. At process block 3606, the defined parameters can be monitored. In one embodiment, the wireless adapter 3104 can monitor the defined parameters. Alternatively, the automated aquatic device controller 3102 can be configured to monitor the defined parameters. Further, the defined parameters can be constantly uploaded to the cloud based server 3108. At process block 3608, the process 3600 can determine if a user attempts to modify an operational state of the automated aquatic control system 3100. An operational state of the automated aquatic control system 3100 can include operational states of the automated aquatic controller 3102, as well as operational states of the aquatic devices coupled to the automated aquatic controller 3102. Operational states can include those conditions associated with the general operation of the aquatic devices, such as on/off, speed, flow, power, intensity, and/or temperature, as well as defined modes such as filter modes, vacuum modes, backwash modes, light shows selection, prime, etc. If no attempt is made to modify the operational state of the automated aquatic control system 3100, the process 3600 can continue to monitor the parameters at process block 3606.

If a user does attempt to modify an operational state of the automated aquatic control system 3100, the process 3600 can determine if a user, via a user account, has a sufficient permission level to modify the parameters at process block 3610. In one embodiment, a user can select, during the individual setup of the automated aquatic device controller 3102, the required permission level to modify operational states. Further, individual permission levels can be set for each aquatic device connected to the automated aquatic device controller 3102. In one embodiment, a user can set the required permission levels for each aquatic device on the automated aquatic device controller 3102. Alternatively, a user can set the required permission levels for each aquatic device on each individual aquatic device. In some embodiments, a user can be required to enter a passsscode to provide a sufficient permission level to modify the operational state of a given aquatic device. Further, permission levels can be associated with specific users. Still further, permission levels can be associated with specific user devices 3112. For example, the cloud based server 3108 can determine a permission level associated with a specific MAC address associated with a user device 3112 to determine a permission level.

If the user does not have a sufficient permission level to modify operational states of the automated aquatic device control system 3100, the process 3600 continues to monitor the parameters at process block 3606. If the user does have sufficient permission levels to modify operational states, the parameters can be updated in the cloud based server 3108 at process block 3612. The cloud based server 3108 can then push the new parameters to the automated aquatic device controller 3102 via the wireless adapter 3104 at process block 3614.

Figure 37:
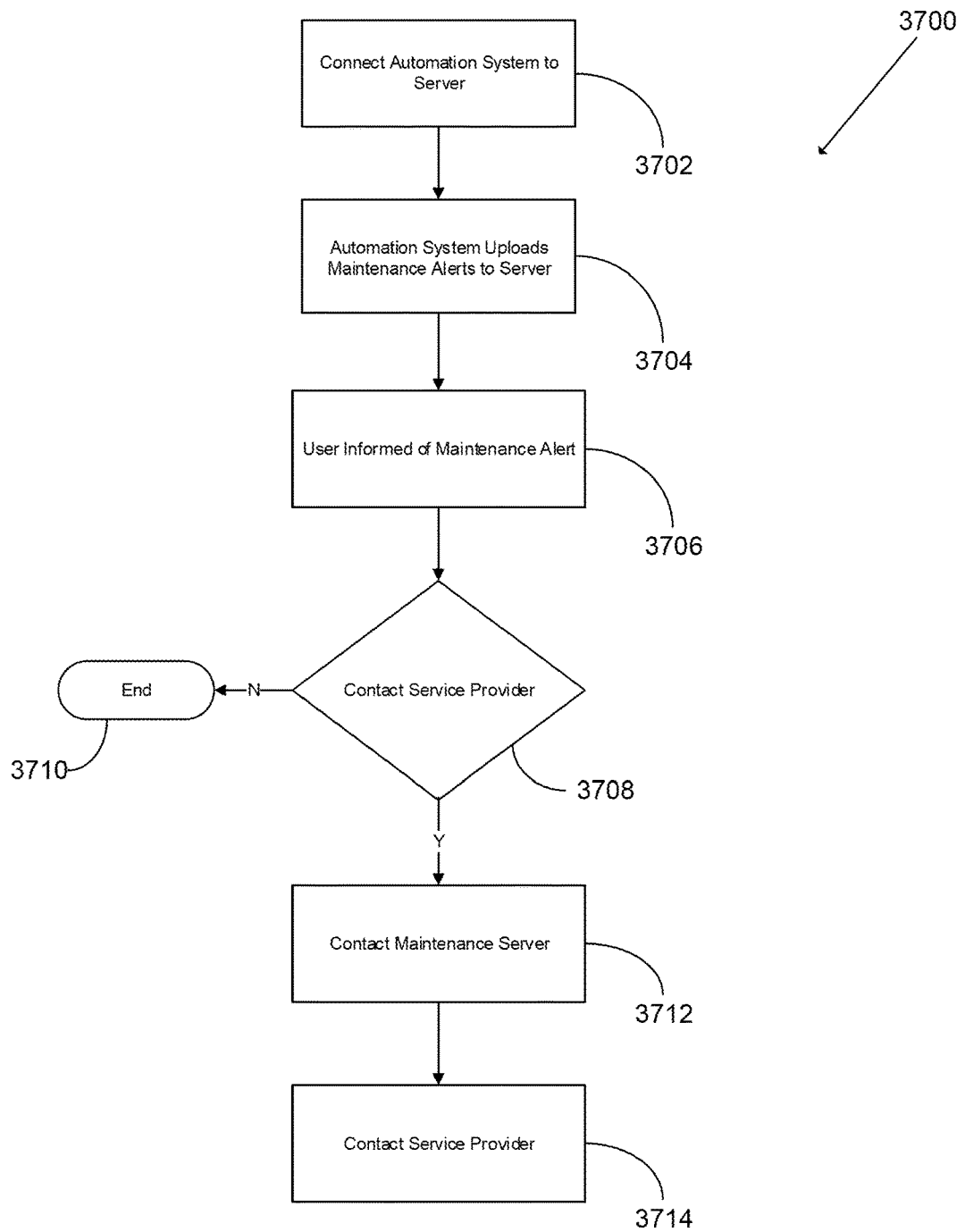
FIG. 37 is a flow chart of a service provider alert process for an automated aquatic device control system according to one embodiment of the invention.

FIG. 37 illustrates a service provider alert process 3700. At process block 3702, the automated aquatic device controller 3102 can be connected to cloud based server 3108, as described above. At process block 3704, the automated aquatic device controller 3102 can upload a maintenance alert to the cloud based server 3108 via the wireless adapter 3104. In one embodiment, the automated aquatic device controller 3102 can automatically determine that maintenance is required for one or more of the aquatic devices it is in communication with. Alternatively, the individual aquatic devices can provide messages to the automated aquatic device controller 3102 indicating that maintenance is needed. At process block 3706, the user can be presented with a maintenance alert. In one embodiment, the cloud based server 3108 can push the maintenance alert to a user device 3112 after receiving a notice of the maintenance alert from the automated aquatic device controller 3102 via the wireless adapter 3104. The maintenance alert can include an option to contact a service provider. At process block 3708, the process 3700 can determine if the user has selected to contact the service provider. If the user has selected to not contact the service provider, the process 3700 can end at process block 3710. If the user does choose to contact a service provider, a connection can be made to a maintenance server at process block 3712. In one embodiment, the maintenance server can be located in the cloud based server 3108. Alternatively, the maintenance server can be in a separate cloud based server. Further, the maintenance server can be the cloud based server 3108. In one embodiment, the user device 3112 can establish a connection with the maintenance server directly. Alternatively, the user device 3112 can transmit a message to the cloud based server 3108 indicating that the user has selected to contact the service provider. The cloud based server 3108 can then access the maintenance server.

In one embodiment, the maintenance server can contain contact information for service providers authorized to provide maintenance to the automated aquatic device controller 3102. The maintenance server can have access to a user profile of the user and/or the product registration data provided by the user, such as discussed above. Alternatively, information from the user profile and/or product registration can be provided to the maintenance server via the cloud based server 3108. Using the information contained in the user profile and/or product registration data, the maintenance server can filter the possible service providers based on product data (make, model, installation, years in service, etc) as well as user data (geographic location, usual distributor, past maintenance, etc.). This can allow for the proper service provider to be contacted, which can allow for more efficient product repair.

In a further embodiment, parameters associated with the maintenance alert can be analyzed in the cloud based server 3108. The cloud based server 3108 can analyze the parameters associated with the maintenance alert, and provide the analysis to the maintenance server. Based on the analysis, the maintenance server can create a list of materials needed to perform the maintenance. Examples of potential replacement parts can include, terminal blocks, control boards, inductors, sensors, capacitors, control panels, transducers, fans, inverter/converter modules, pump, motor, filters, strainers, solar panels, heating elements, etc. Further, if there is sufficient data regarding the installation of the product, additional replacement parts can be automatically generated. For example, certain repairs can require new plumbing fittings such as pipes, elbows, couplers, reducers, valves, etc. If a complete bill of material (BOM) is available to the cloud based server 3108 regarding the initial installation of the automated aquatic control system, the cloud based server 3108 can analyze the BOM to determine which additional parts may be needed. Additionally, in some embodiments the maintenance server can have access to stock levels of replacement parts on hand for the service providers. Once the proper service provider is determined, the maintenance and/or cloud based server 3108 can evaluate the stock list of the relevant service provider to determine if there is sufficient stock to perform the needed repair. If not, the maintenance and/or cloud based server 3108 can place an order for the replacement parts needed to perform the repair. For example, the maintenance and/or cloud based server 3108 can order the replacement parts from other service providers. Further, the maintenance and/or cloud based server 3108 can order the parts from a distributor or dealer. Finally, in some instances, the maintenance and/or cloud based server 3108 can order the parts directly from the manufacturer. In some embodiment, the maintenance and/or cloud based server 3108 server can automatically order the replacement parts once the user chooses to contact a service provider. Alternatively, the cloud based server 3108 can push a message to the user device 3112 requiring the user to approve any orders. In some examples, the maintenance and/or cloud based server 3108 server can provide an actual or estimated cost of the required replacement parts that can be provided to the user. Further, the maintenance server can wait until authorization is provided from the service provider before any replacement parts are issued.

At process block 3714, the service provider can be contacted. In one embodiment, the maintenance and/or cloud based server 3108 can contact the service provider. The maintenance and/or cloud based server 3108 can contact the service provider in various ways. In one example, an electronic message can be transmitted to the service provider regarding the maintenance issue. Examples of electronic messages can include text messages (SMS, MMS, etc.), e-mail, instant message, etc. Further, the maintenance and/or cloud based server 3108 can contact the service provider by using an automated voice message. The messages provided to the service provider can include information relating to the contact information and address of the user, the nature of the problem, the fault and associated parameters, historical data (previous service performed, faults received over time, etc), and/or the list of expected replacement parts. Further, in some embodiments, the user can be presented with a questionnaire when the user chooses to contact the service provider. The questionnaire can allow the user to select best times and methods for contacting the user and best times for the service provider to schedule the appointment. In further embodiments, the maintenance and/or cloud based server 3108 can have access to a scheduling/work order system of the service provider, and can schedule an appointment automatically in the system.

In addition to the features described above, the automated aquatic device controller 3102 can provide operating data to the cloud based server 3108 via the wireless adapter 3104. The operating data can be analyzed at the cloud based server 3108 to provide analytic data. The analytic data can then be analyzed to provide user specific data to interested parties. Interested parties can include the user, the manufacturer of the aquatic device and/or automated aquatic device controller 3102, utility companies, distributors, etc. Further, the analytic data can be used to optimize performance of the aquatic devices and/or automated aquatic device controller 3108. In one example, filter loading cycles can be monitored by the automated aquatic device controller 3102 and transmitted to the cloud based server 3108 for analysis. Using the analytic data, profiled user patterns from monitored backwash cycles can determined. These patterns can be evaluated to provide data to a user to suggest a backwashing pattern or schedule that would optimize the operation of the aquatic system. For example, the user can be presented with information suggesting that a longer period of time be taken between backwash cycles. This can reduce water and energy usage by requiring fewer backwash cycles. Alternatively, a user may be presented with information suggesting a shorter period of time between backwash cycles. By reducing filter loading, the additional backwash cycles can reduce wear on the pumping system, which can increase life and reduce energy usage.

In a further example, the monitored filter loading data can be combined with additional sensor data to allow the cloud based server 3108 to develop predictive filter backwashing cycles. These predictive backwashing cycles can optimize the backwashing of the system to ensure minimal water and energy waste, while protecting the pump, motor and filter system from excessive wear.

In further examples, the aquatic devices and/or additional sensors can collect additional information to be provided to the cloud based server 3108 for analysis. For example, environmental data can be collected. Environmental data can include air temperature, water temperature, rainfall levels, humidity data, wind speed, etc. This data can be used in the analysis conducted by the cloud based server 3108 for correlation against the collected system data associated with the automated aquatic device control system 3100.

Further, the cloud based server 3108 can be used to create an energy savings model based on the received operational data. In some embodiment, a cost of ownership can be developed by monitoring parameters such as power consumption and pressure profiles over time. Further, water consumption/waste can be monitored. Water consumption can be the results of evaporation, system leaks, overfill, etc. Accordingly, data can be provided to a user to provide directions on how to reduce water consumption and/or waste over time. Further, chemical usages can be monitored, in some embodiments. The chemical usage can subsequently be optimized based on water quality parameters. Additionally, residential pool parameters can further be optimized. For example, pool turn-over volume can be based on parameters such as filter loading, water loss, pump loading, etc. Additionally, water quality parameters such as pH, oxidation reduction potential, conductivity, and turbidity can be analyzed and optimized.

Further, the analytic data provided to the cloud based server 3108 can be used to provide detailed and directed marketing and sales by a manufacturer. For example, by evaluating a cost of ownership of a current device or component, a more optimized and/or efficient solution can be provided directly to a user showing objective data relating to future cost savings. For example, comparisons can be done between using a set speed pumping system with a variable speed pumping system (such as those discussed above) which can optimize water flow and energy usage based on a user's need. Usage data across large sample sizes can be aggregated to develop component and system characteristics based on parameters such as geographic, seasonal, and environmental conditions. Further, data can be collected for components from various manufacturers. This data can then be compiled and presented to a user to show the benefits associated with a specific application or manufacturer. Further, data associated with products associated with the automated aquatic device control system 3100 can be collected and analyzed to provided data for new product development efforts as well as competitive analysis of competitor products.

Further, the analytic data can be used to push product engagement with a consumer base. The analytic data can further be used to develop a potential consumables sales program. Further, as discussed above, the analytic data can be used to help develop preventative service and maintenance programs. In some embodiments, a regularly schedule preventative service and maintenance schedule can be generated based on the analytic data provided to the cloud based server 3108.

Further, the analytic data can be used to provide a predictive component failure information. In one example, predictive pump failure can be determined from parameters such as on/off cycling as well as other sensor data. In further examples, other components, such as valve, can be evaluated for their predictive failure time. In some embodiments, the predictive component failure can be used to develop maintenance and replacement plans for the components. In further examples, the predictive component failure and/or maintenance data can be provided to service providers. The service providers can use the data to aid in route planning and predictive maintenance scheduling. Further, the analytic data can be used to further optimize systems to lower energy consumption and/or cost.

While the above embodiments and examples are discussed in regards to an automated aquatic device control system, it should be known that the above embodiments and examples can be used with any of the disclosed embodiments herein, as well as other control systems and/or devices that can be connected to a wireless adapter, as discussed above.

Automated Aquatic Chemical Controllers

The following paragraphs are directed to the use of a wireless adapter device to provide for wireless access and/or control automated aquatic chemical controllers. Example automated aquatic chemical controllers can include products such as IntelliChem®, IntelliChlor®, and IntelliPH® Control Systems from Pentair. However, other automated aquatic chemical controllers with a suitable communication port can be used, such as chlorinators, salt-to-chlorine converters, water-softeners, etc. Automated aquatic chemical controllers can be used to monitor and/or control chemical levels in aquatic systems, particularly in pools and spa type systems. Further, aquatic chemical controllers can be coupled to one or more chemical dispersal or generation units (chlorinators, pH-balance chemical systems, salt-to-chlorine converters, etc.) (not shown).

Figure 38:
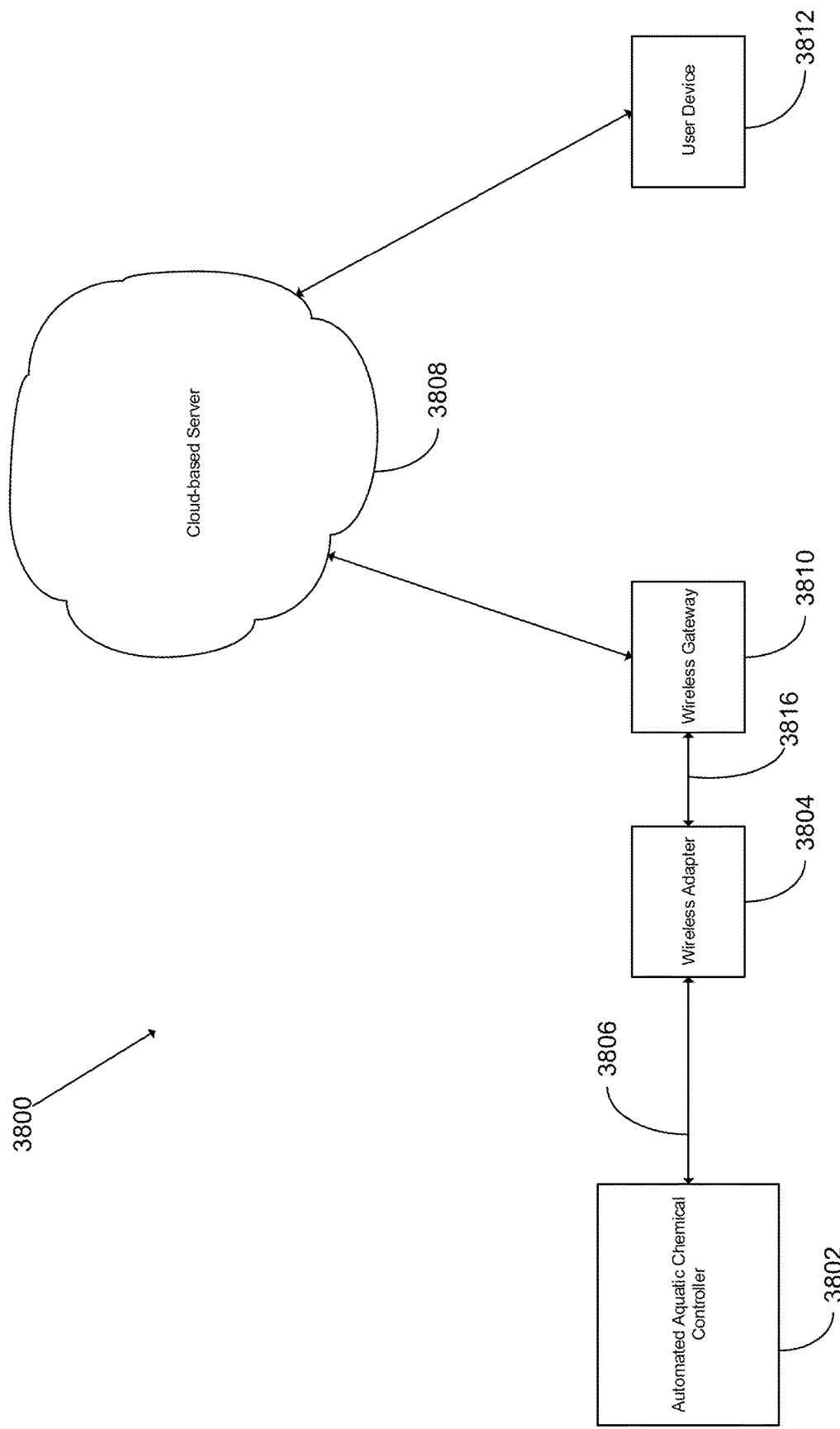
FIG. 38 is a block diagram of an automated chemical dispersal control system.

FIG. 38 illustrates an exemplary automated chemical dispersal control system 3800. An automated aquatic chemical controller 3802, as discussed above, can be in communication with a wireless adapter 3804 via communication line 3806. In one embodiment, the wireless adapter 3804 can be a wireless adapter as discussed above. The wireless adapter 3804 can communicate with a cloud based server 3808 via a wireless gateway 3810 using a wireless connection 3816. In one embodiment, the wireless gateway 3810 communicates with the cloud based server via an internet connection. In some embodiments, the wireless gateway 3810 can connected to the Internet via a router and/or modem. The cloud based server 3808 can be in communication with one or more user devices 3812. Further, the automated aquatic chemical controller 3802 can be coupled to one or more aquatic devices (not shown).

Figure 39:
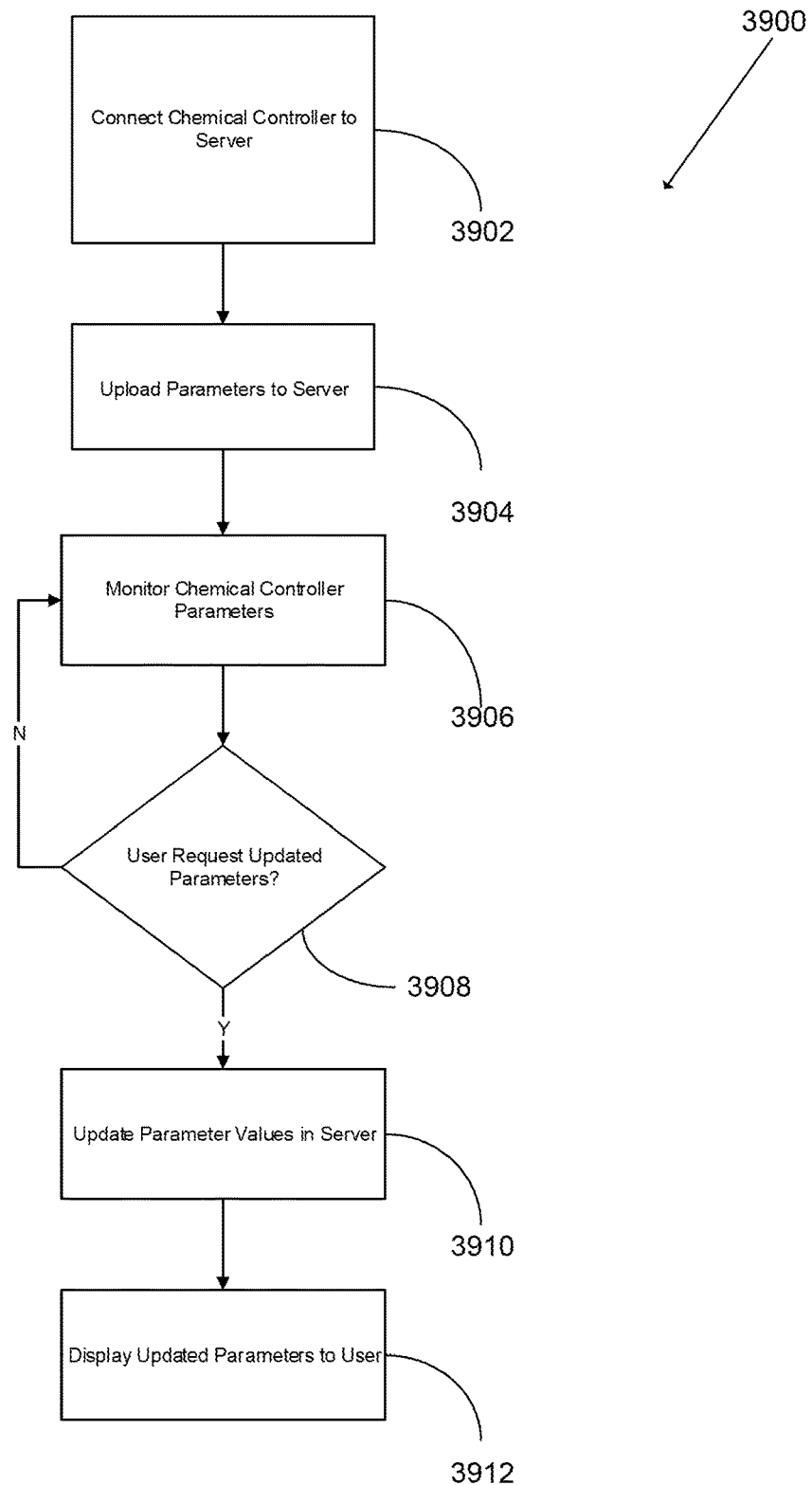
FIG. 39 is a flow chart of a user requested parameter update process for an automated chemical dispersal control system.

FIG. 39 illustrates a user requested parameter update process 3900. At process block 3902, the automated aquatic chemical controller 3802 can be connected to the cloud based server 3808 via the wireless adapter 3104. Once the automated aquatic chemical controller 3802 is connected to the cloud based server 3808, the automated aquatic chemical controller 3802 can upload defined parameters to the cloud based server 3808 at process block 3904 via the wireless adapter 3804. Parameters can include flow levels, chemical supply levels, water chemical levels (chlorine, salt, pH, etc.), temperature, time of day, chemical dosages, chemical addition times, water reservoir data, etc. Additionally, the parameters disclosed above can also be uploaded to the cloud based server 3808.

At process block 3906, the parameters can be monitored. In one embodiment, the wireless adapter 3804 can monitor the parameters. Alternatively, the automated aquatic chemical controller 3802 can be configured to monitor the defined parameters and communicate the parameters to the cloud based server 3808 via the wireless adapter 3804. Further, the parameters can be constantly uploaded to the cloud based server 3808. At process block 3908, the process 3900 can determine if a user has requested a parameter refresh. In one embodiment, the user can request a parameter refresh by performing a "refresh" operation on the user device 3812. A "refresh" operation can include selecting a refresh button, performing an action such as a gesture on the user device 3812 or refreshing an internet browser. The refresh operation can provide a message to the cloud based server 3808 that a refresh is requested. The cloud based server 3808 can then communicate to the wireless adapter 3804 to provide updated parameters. If no user requested refresh is detected at process block 3908, the wireless adapter 3804 can continue to monitor parameters at process block 3906. If a user request is provided, the wireless adapter 3804 can transmit updated parameters to the cloud based server 3808 at process block 3910. The updated parameters can then be displayed to the user at process block 3912.

Figure 40:
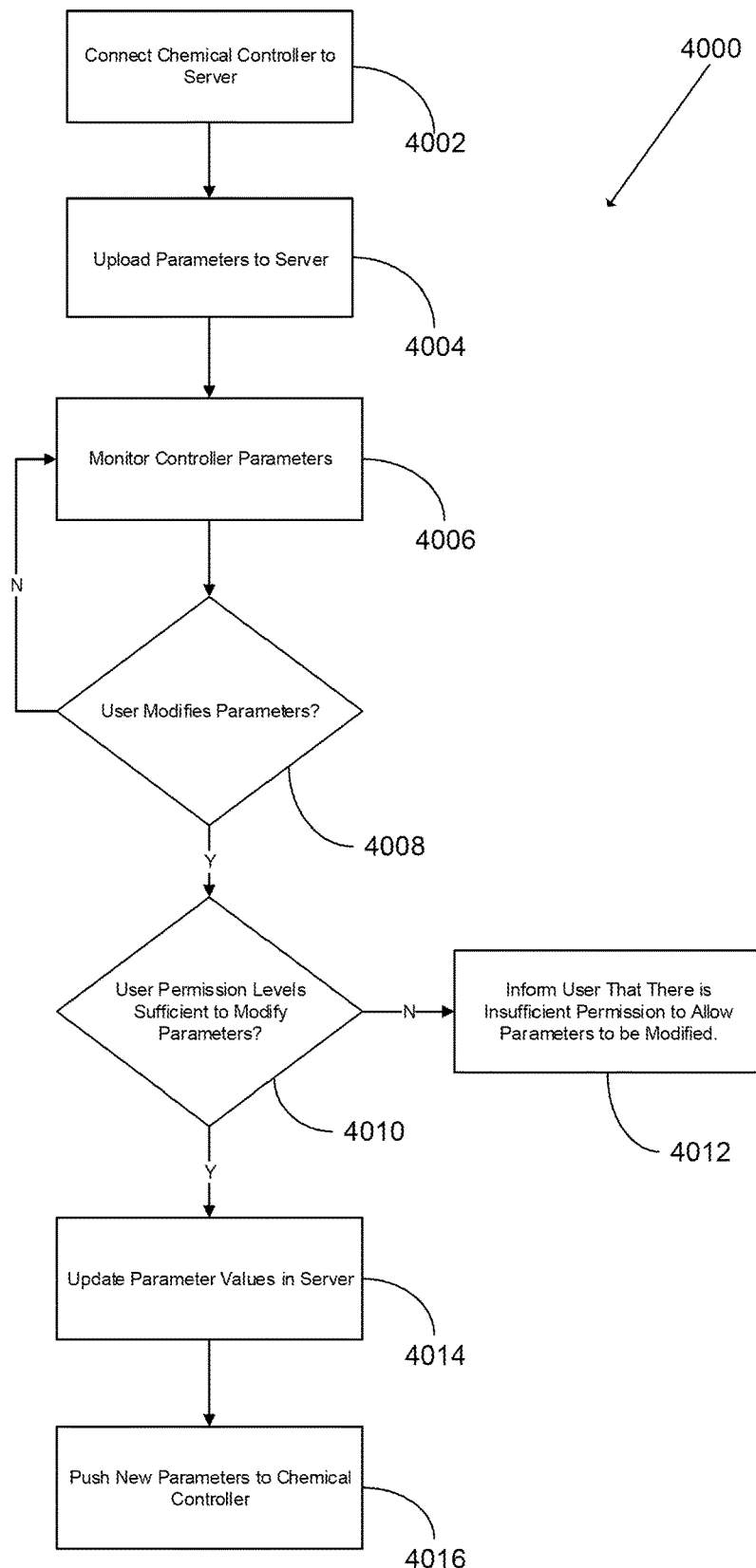
FIG. 40 is a flow chart of a remote parameter modification process for an automated chemical dispersal control system.

FIG. 40 illustrates a remote parameter modification process 4000. At process block 4002, the automated aquatic chemical controller 3802 can be connected to cloud based server 3808 as described above. Once the automated aquatic chemical controller 3802 is connected to the cloud based server 3808, the automated aquatic chemical controller 3802 can upload defined parameters to the cloud based server 3808 at process block 4004. At process block 4006, the defined parameters can be monitored. In one embodiment, the wireless adapter 3804 can monitor the defined parameters. Alternatively, the automated aquatic chemical controller 3802 can be configured to monitor the defined parameters. Further, the defined parameters can be constantly uploaded to the cloud based server 3808. At process block 4008, the process 4000 can monitor to see if a user attempts to modify a parameter. If a user does not attempt to modify a parameter, the process 4000 can continue to monitor the parameters at process block 4006. If a user does attempt to modify a parameter, the process 4000 can determine if a user, via a user account, has a sufficient permission level to modify the parameters at process block 4010. In one embodiment, a user can select, during the individual setup of the automated aquatic chemical controller 3802, the required permission level to modify parameters. In some embodiments, a user can be required to enter a passcode to provide a sufficient permission level to modify the parameters. Further, permission levels can be associated with specific users. Still further, permission levels can be associated with specific user devices 3812. For example, the cloud based server 3808 can determine a permission level associated with a specific MAC address associated with a user device 3812 to determine a permission level. In a further embodiment, permission levels can further be restricted based on the desired action. For example, if a user attempts to modify a parameter to increase a chlorine level in a pool or spa beyond safe levels, the request may be denied as the user can be restricted from having a permission level allowing for chemical levels to be raised to an unsafe level. Permission levels can also vary depend on the particular parameter to be modified, as stated above, certain parameters may not be allowed to be modified remotely. For example, certain increases or changes in pH or chlorine levels may not be allowed to be performed remotely in order to prevent harm to occupants in the pool or spa.

If the user does not have a sufficient permission level to modify the parameters, the cloud based server 3808 can push a notification to the user device 3812 informing the user that they do not have sufficient permission to modify the given parameter at process block 4012. If the user does have sufficient permission levels to modify parameters, the parameters can be updated in the cloud based server 3808 at process block 4014. The cloud based server 3808 can then push the new parameters to the automated aquatic chemical controller 3802 via the wireless adapter 3804 at process block 4016.

Figure 41:
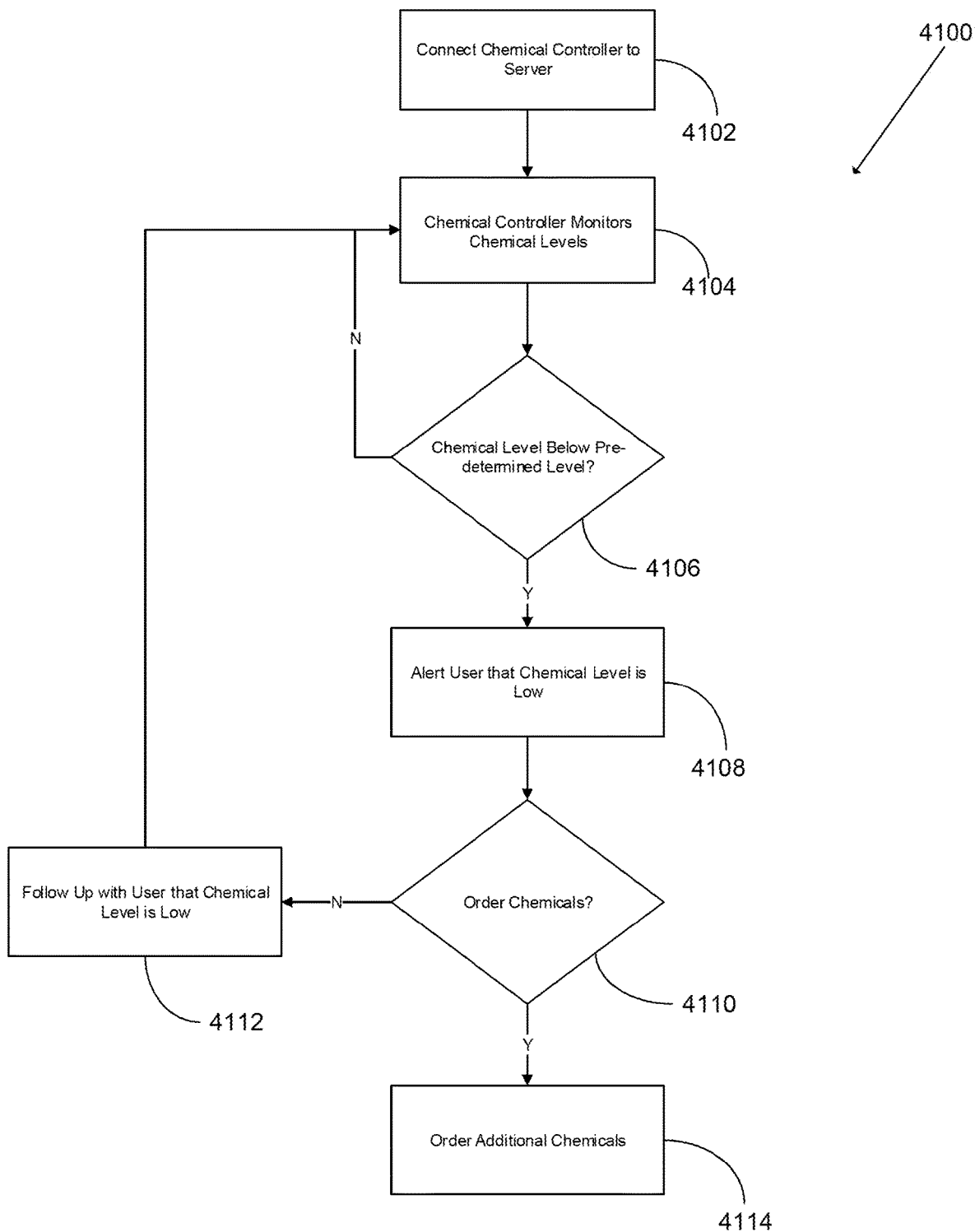
FIG. 41 is a flow chart of a remote chemical ordering process for an automated chemical dispersal control system.

FIG. 41 illustrates a remote chemical ordering process 4100. At process block 4102, the automated aquatic chemical controller 3802 can be connected to the cloud based server 3808 via the wireless adapter 3804. Once the automated aquatic chemical controller 3802 is connected to the cloud based server 3808, the automated aquatic chemical controller 3802 can monitor supply chemical levels in chemical dispersal/generation devices. At process block 4106, the automated aquatic chemical controller 3802 can determine if the supply chemical levels in the chemical dispersal/generation devices have fallen below predetermined levels. In one example, the predetermined level can be based on the estimated amount of time that the remaining supply chemical will last. Alternatively, the predetermined level can be based on a volume or quantity of the supply chemical. In one embodiment, the user can set the predetermined levels in the automated aquatic chemical controller 3802. If the supply chemical levels have not fallen below a predetermined level, the automated aquatic chemical controller 3802 can continue to monitor the supply chemical levels at process block 4104. If the supply chemical levels are determined to have fallen below the predetermined value, an alert can be sent to the user at process block 4108 informing the user that the supply chemical level is low. In one embodiment, the wireless adapter 3804 can receive a message via communication line 3806 from the automated aquatic chemical controller 3802 that the chemical level is low. The wireless adapter 3804 can subsequently transmit low chemical messages to the cloud based server 3808 via the wireless adapter 3804, which can then push an alert message to a user device 3812. Alternatively, the supply chemical levels can be consistently sent to the cloud based server 3808. When the cloud based server 3808 determines that the supply chemical levels have fallen below the predetermined level, the cloud based server 3808 can generate the alert message and subsequently push an alert message to the user device 3812.

In some examples, the alert message can inform the user that the supply chemical level is low. Moreover, the alert message can further include information about the current level of the supply chemical, remaining time until supply chemical is exhausted, etc. Additionally, in some embodiments, the alert message can provide the user with a prompt to order additional supply chemicals. In one example, the user can preselect vendors for ordering additional supply chemicals. The preselected vendors can be stored in the cloud based server 3808 and associated with a user account. Further, the user can pre-select other features of the supply chemicals, such as brand, concentration, quantity, packaging, etc. These parameters can be stored in the cloud based server 3808 and associated with a user account. In further embodiments, the cloud based server 3808 can perform a search of the required supply chemical and present the user with various options for ordering. For example, the cloud based server 3808 can provide multiple vendors (Amazon, brick and motor stores, etc), costs, shipping times and rates, brands, etc. In some embodiments, the cloud based server 3808 can provide reviews for the user to analyze as well. For example, the cloud based server 3808 can provide access to reviews on a major retailer website, such as Amazon. Alternatively, the cloud based server 3808 can act as an aggregator, compiling various reviews from across the World Wide Web. The user can then be provided with an option on the user device 3812 to select an option for ordering the replacement supply chemical. If the user has preselected the product, vendor, etc., in the cloud based server 3808, the user can simply be prompted to order the supply chemical with no additional selection necessary. Additionally, the user can be provided with the cost and allowed to confirm the purchase before ordering. Alternatively, the user can be provided with a list of options, as described above. Additionally, the user can select one of the vendor options and then will be directed to the specific website for the selected vendor and can make the purchase directly through the vendor's website.

At process block 4110, the process 4100 can determine if the user has selected to order the supply chemicals. In some embodiments, the user can select to order the supply chemicals, as discussed above. In some alternative examples, the user can select to have the supply chemicals automatically ordered when the supply chemical level falls below the predetermined level. If the user does not select to order the supply chemicals at process block 4110, a follow-up alert can be provided to the user at process block 4112. The chemical levels can then continue to be monitored at process block 4104. If the user chooses to order the supply chemicals (or if the user has chosen to automatically order replacement supply chemicals when the supply chemical level falls below the predetermined values), the cloud based server 3808 can order the supply chemical at process block 4114. In some embodiments, the user can provide payment to the cloud based server 3808 that can be stored in the associated user account. For example, the user can provide credit card info, PayPal® account info, checking account information, etc. to the cloud based server 3808. This can allow for the cloud based server 3808 to automatically order the supply chemicals. Alternatively, the cloud based server 3808 can present the user with a prompt to enter payment info. This can include entering payment information such as credit card information, PayPal® information, etc. Further, the user can select to pay using the user device 3812, such as with ApplePay or Google Wallet.

Automated Residential Heating Device Controllers

The following paragraphs are directed to the use of a wireless adapter device to provide for wireless access and/or control automated residential heating device controllers. Example automated residential heating device controllers can include products such as the Raychem ACS-30 Commercial Control System and Nuheat® heated floor controllers (Signature, Home, Harmony, element, and Solo) from Pentair. However, other automated residential heating device controllers with a suitable communication port can be used, such as thermostats, furnace controls, heating cable controllers, etc. Automated residential heating device controllers can be used to monitor and control residential heating devices, such as heating cables, resistive heaters, floor heaters, de-icing devices, etc.

Figure 42:
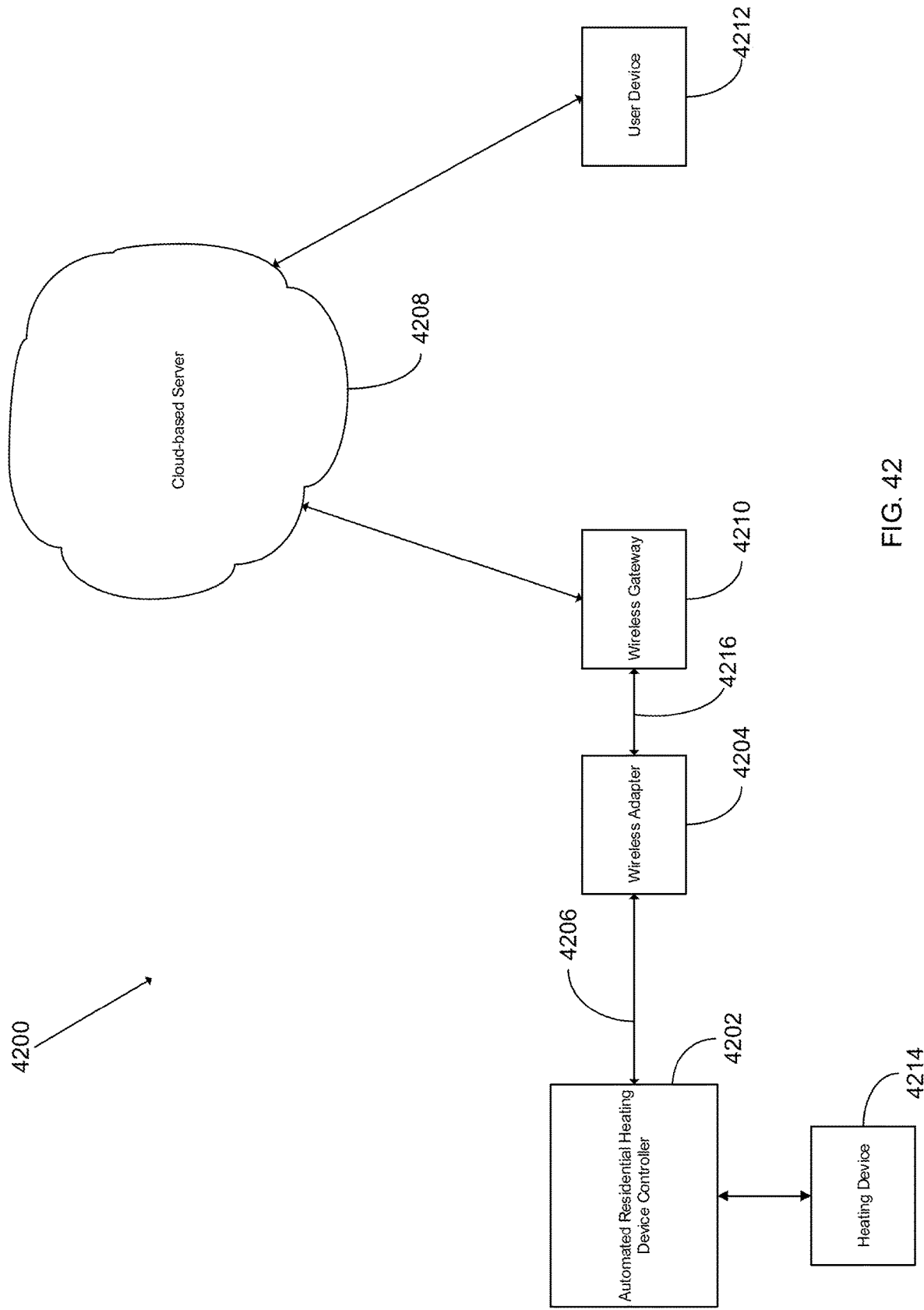
FIG. 42 is a block diagram of a residential heating device control system.

FIG. 42 illustrates an exemplary residential heating device control system 4200. An automated residential heating device controller 4202, as discussed above, can be in communication with a wireless adapter 4204 via communication line 4206. In one embodiment, the wireless adapter 4204 can be a wireless adapter as discussed above. The wireless adapter 4204 can communicate with a cloud based server 4208 via a wireless gateway 4210 using a wireless connection 4216. In one embodiment, the wireless gateway 4210 communicates with the cloud based server via an internet connection. In some embodiments, the wireless gateway 4210 can connected to the Internet via a router and/or modem. The cloud based server 4208 can be in communication with one or more user devices 4212. Further, the automated residential heating device controller 4202 can be coupled to one or more heating devices 4214.

Figure 43:
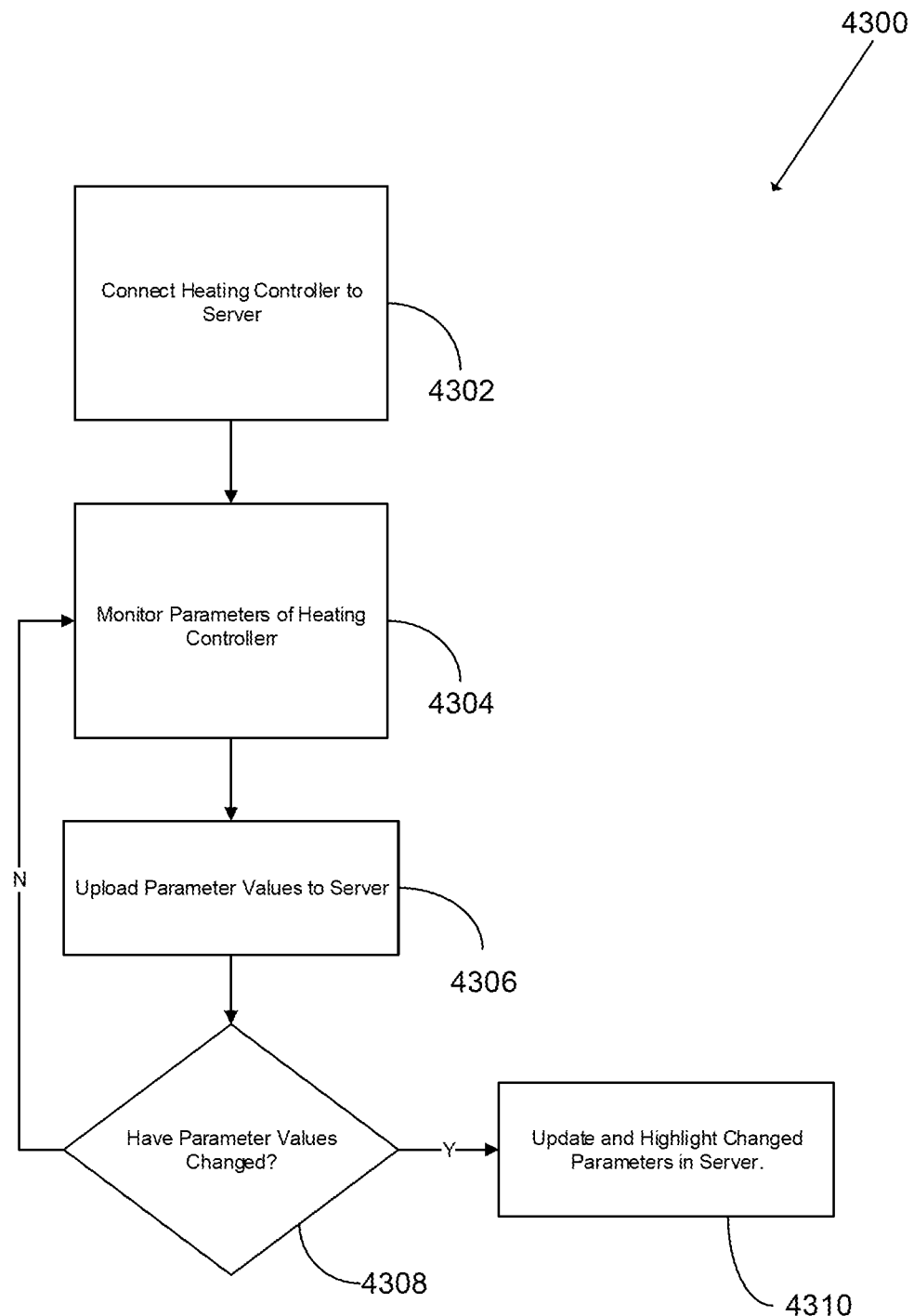
FIG. 43 is a flow chart of a parameter update process for a residential heating device control system.

FIG. 43 illustrates a parameter update process 4300. At process block 4302, the automated residential heating device controller 4202 can connected to the cloud based server 4208 via the wireless adapter 4204. At process block 4304, the wireless adapter 4204 can monitor parameters associated with the automated residential heating device controller 4202. Examples of parameters for an automated residential heating device controller 4202 can include heating modes (hot water maintenance, frost heave, floor heating, pipe freeze, fuel oil, greasy waste, roof and/or gutter de-icing; snow melting, temperature monitoring), temperature, current draw, ground fault, operational status, etc.

At process block 4306, the wireless adapter 4204 can upload the parameter values to the cloud based server 4208. At process block 4308, the cloud based server 4208 can determine if any parameter value has changed. In an alternate embodiment, the wireless adapter 4204 can internally store the parameter values and can determine if the parameter values have changed prior to transmitting the parameter values to the cloud based server 4208. In one embodiment, tolerance windows can be selected to allow for some fluctuation in the parameter values that would not qualify as a change in the parameter value. Thus, in some examples, the parameter values are not considered to have changed if the amount of change is within a tolerance window. In some embodiments, the tolerance window can be set by a user. Alternatively, the tolerance window can be predetermined in the automated residential heating device controller 4202. If the parameter values have not changed, the wireless adapter 4204 can continue to monitor the parameters at process block 4304. If the parameters have changed, the cloud based server 4208 can be updated to reflect the changed parameters at process block 4310. In some embodiments, the changed parameters can be highlighted such that when a user accesses the parameters on the cloud based server 4208, the user can quickly determine which parameters have changed. In some embodiments, the cloud based server 4208 can push an alert message to a user device 4212 when one or more of the parameters change. In one embodiment, the cloud based server 4208 can push an alert message to a user's internet connected device 4212 using methods discussed above. The alert message can inform the user that the parameter has changed and can, in some examples, display the changed parameter in the alert message.

Figure 44:
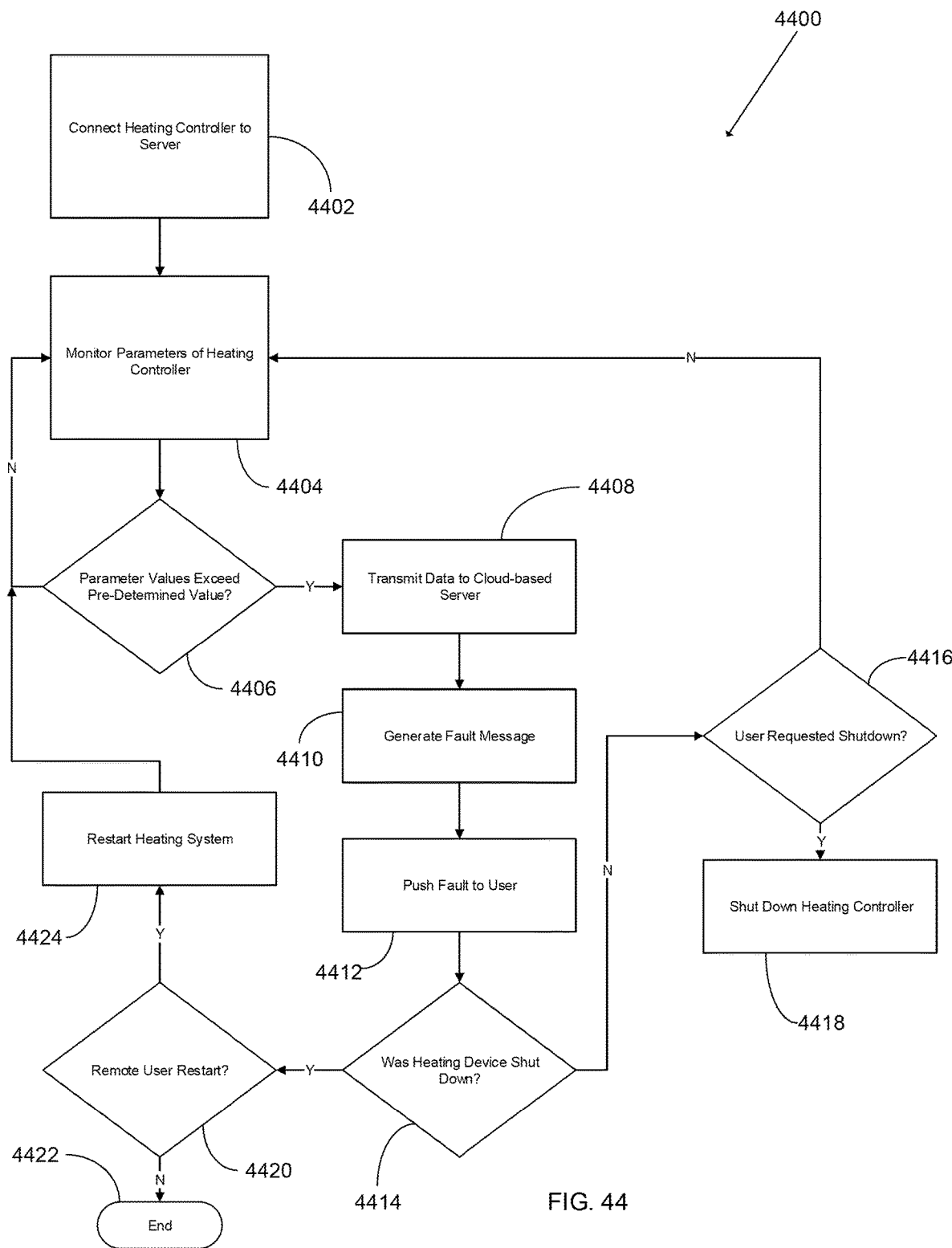
FIG. 44 is a flow chart of a monitoring and control process for an automated residential heating device control system.

FIG. 44 illustrates a monitoring and control process 4400 for an automated residential heating device controller 4202. At process block 4402, the automated residential heating device controller 4202 can be connected to the cloud based server 4208 via the wireless adapter 4204. At process block 4404, the wireless adapter 4204 can monitor parameters associated with the automated residential heating device controller 4202. Parameters can include those discussed above. At process block 4406, the wireless adapter 4204 can determine if any of the parameters exceed predetermined values. In one embodiment, the predetermined values can be set by the user; alternatively, the predetermined values can be set within the automated residential heating device controller 4202 at the factory. In a further embodiment, the wireless adapter 4204 can determine if any fault condition parameters have been generated by the automated residential heating device controller 4202 at process block 4406. If no parameters exceed the predetermined valued at process block 4406, the process 4400 returns to process block 4404 and continues to monitor parameters associated with the automated residential heating device controller 4202. If a parameter is determined to exceed a predetermined value at process block 4406, the wireless adapter 4204 can transmit data to the cloud based server 4208 indicating that one or more parameters have exceeded a predetermined value at process block 4408. The cloud based server 4208 can then generate an alert message at process block 4410. The cloud based server 4208 can then push an alert message to a user's internet connected device 4212 using methods discussed above. Examples of alerts that can be pushed to the user device 4212 can include over-current, over/under-voltage, ground fault, over-temp, under-temp, etc., at process block 4412.

At process block 4414, the wireless adapter 4204 can determine if the automated residential heating device controller 4202 shut down an associated heating device 4214. In one example, the heating device 4214 can be shut down when certain parameters are exceeded, such as those discussed above. If the heating device 4214 was not shut down, a prompt can be sent to the user to allow the user to shut down the heating device at process block 4416. In one embodiment a user can be presented with an option to shut down the heating device 4214 on the user device 4212. In some embodiments, the prompt to shutdown the heating device 4214 can be presented to the user selectively based on the parameter that exceeded the predetermined value. Alternatively, the user can be presented with the option to shutdown the heating device 4214 any time an alert message is sent to the user. If the user chooses not to shutdown the heating device 4214, the process 4400 can continue to monitor the parameters of the automated residential heating device controller 4202 at process block 4404. If the user chooses to shutdown the heating device 4214, the cloud based server 4208 can instruct the automated residential heating device controller 4202 to shutdown the heating device 4214 via the wireless adapter 4204 at process block 4418.

Returning to process block 4414, if the process 4400 determines that the heating device 4214 was shut down, a further alert message can be provided to the user indicating that the heating device 4214 is currently not operating. At process block 4420, the process 4400 can determine if a remote user restart has been initiated. If no remote user restart has been initiated, the process 4400 ends at process block 4422. If a remote user restart has been initiated, the cloud based server 4208 can instruct the automated residential heating device controller 4202 to restart the heating device 4214 via the wireless adapter 4204 at process block 4424. The process 4400 can then return to monitoring the parameters of the automated residential heating device controller 4202 at process block 4404.

In one embodiment, a user can be presented with an option to restart the heating device 4214 on the user device 4212. The user can be presented with an option to restart the heating device 4214 anytime the heating device 4214 is shut down. Alternatively, the option to restart the heating device 4214 can be based on the parameter that caused the shutdown. For example, the option to restart the heating device 4214 may not be available when the parameter that exceeded the predetermined value indicates an electrical short or ground fault. In a further embodiment, the parameters associated with the automated residential heating device controller 4202 can be continuously monitored, and the user can be presented with an option to restart the heating device 4214 when the parameter associated with the automated residential heating device controller 4202 no longer exceeds the predetermined value. For example, if the heating device 4214 was shut down due to a parameter associated with a temperature of the heating device 4214, the option to restart the heating device 4214 can be presented to the user when the temperature falls below the predetermined value. In a further embodiment, the option to restart the heating device 4214 can be provided on the user device 4212 when the automated residential heating device controller 4202 has been shut down. When the user then attempts to restart the heating device 4214, the wireless gateway 4204 can first determine if a restart is possible based on the reason for the shutdown. If a restart is not possible, an alert can be pushed to the user device 4212 indicating that a remote restart is not available. In some embodiments, an alert can be pushed to the user device 4212 explaining why a remote reset is not possible at the current time.

Figure 45:
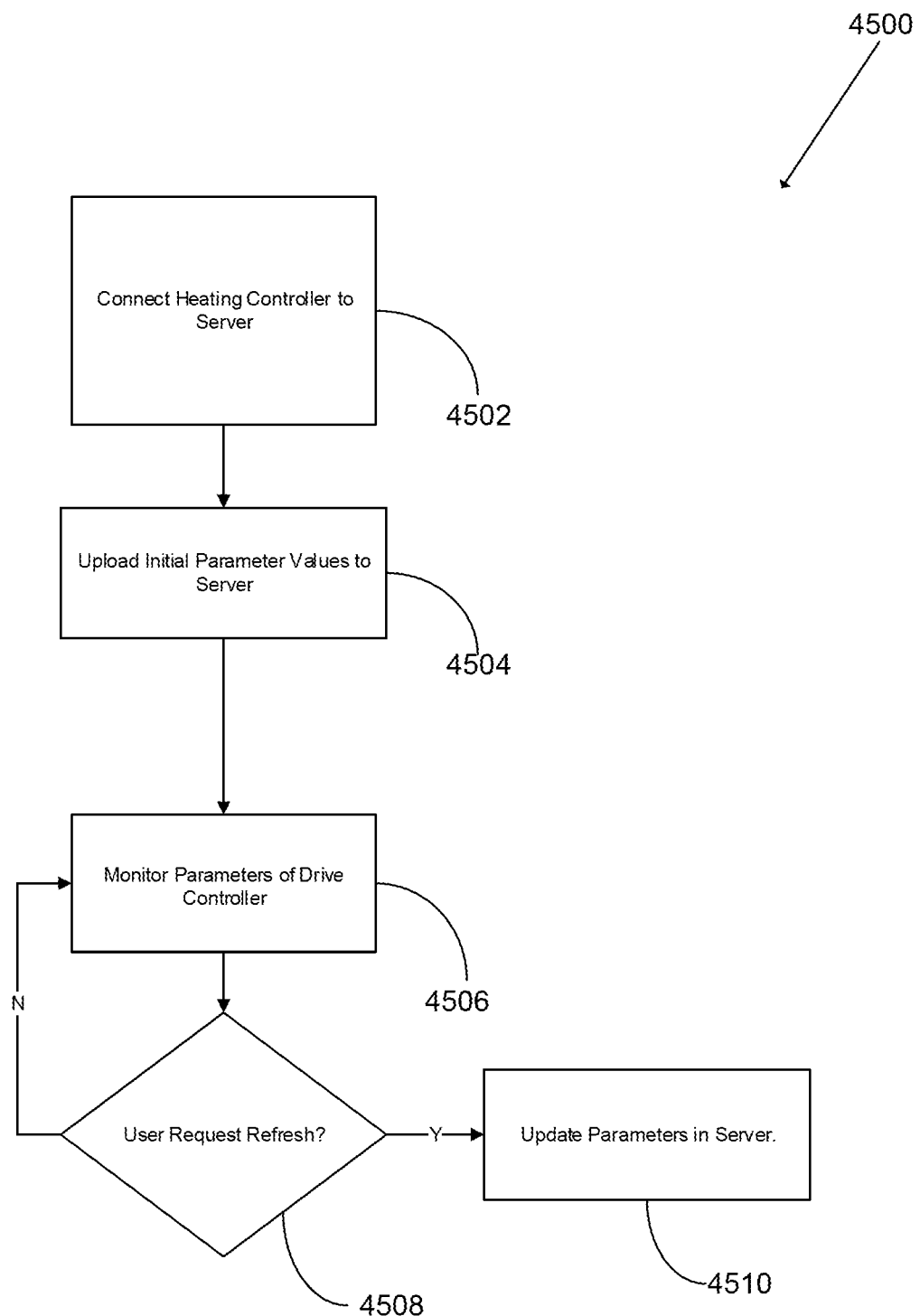
FIG. 45 is a flow chart of a user requested parameter update process for an automated residential heating device control system.

FIG. 45 illustrates a user requested parameter update process 4500. At process block 4502, the automated residential heating device controller 4202 can be connected to the cloud based server 4208 via the wireless adapter 4204. At process block 4504, the wireless adapter 4204 can upload an initial set of parameter values associated with the automated residential heating device controller 4202 to the cloud based server 4204. In some embodiments, all parameters associated with the automated residential heating device controller 4202 can be uploaded to the cloud based server 4208 via the wireless adapter 4204. Alternatively, a select subset of the parameters associated with the automated residential heating device controller 4202 can be uploaded to the cloud based server 4208. At process block 4506, the parameters associated with the automated residential heating device controller 4202 can be monitored. In some embodiments, the wireless gateway 4204 can monitor the parameters associated with the automated residential heating device controller 4202. Alternatively, the cloud based server 4208 can monitor the parameters associated with the automated residential heating device controller 4202. Parameters can include those discussed above. At process block 4508, the process 4500 can determine if a user has requested a parameter refresh. In one embodiment, the user can request a parameter refresh by performing a "refresh" operation on the user device 4212. A "refresh" operation can include selecting a refresh button, performing an action, such as a gesture on the user device 4212 and/or refreshing an internet browser. The refresh operation can provide a message to the cloud based server 4208 via the user device 4212 that a refresh is requested. The cloud based server 4208 can then communicate a request to the wireless adapter 4204 to provide updated parameters. If no user requested refresh is detected at process block 4508, the parameters associated with the automated residential heating device controller 4202 continue to be monitored at process block 4506. If a user refresh request is provided, the wireless adapter 4204 can transmit updated parameters to the cloud based server 4208 at process block 4510, which can then be viewable on the user device 4212.

Figure 46:
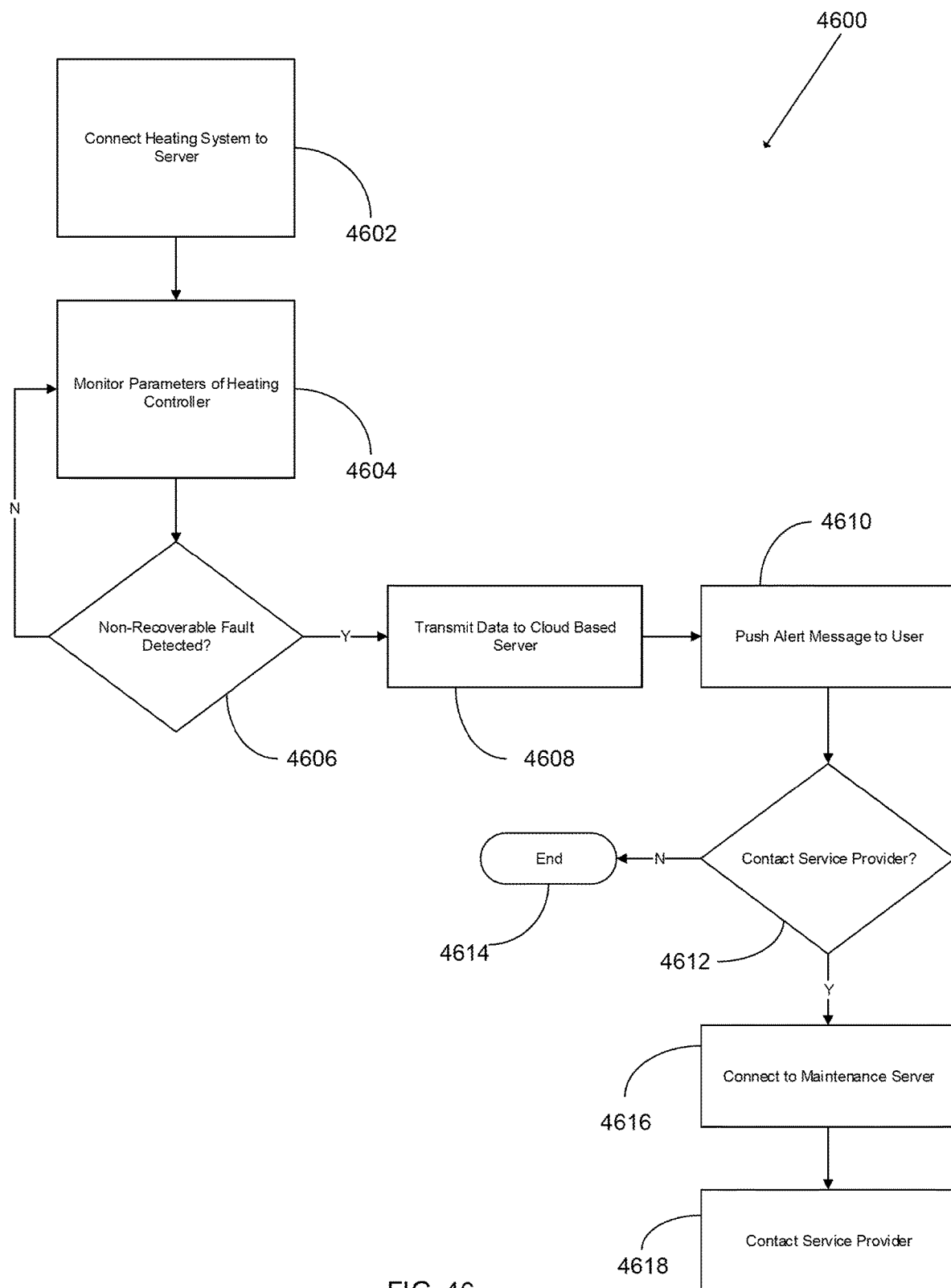
FIG. 46 is a flow chart of a service provider alert process for an automated residential heating device control system.

FIG. 46 illustrates a service provider alert process 4600. At process block 4602, the automated residential heating device controller 4202 can be connected to the cloud based server 4208 via the wireless adapter 4204. At process block 4604, parameters associated with the automated residential heating device controller 4202 can be monitored. In one embodiment, the wireless adapter 4204 can monitor the parameters. Alternatively, the parameters can be monitored by the cloud based server 4208. The monitored parameters can include the parameters discussed above. At process block 4606, the process 4600 can determine if a nonrecoverable fault condition has been detected. Examples of nonrecoverable fault conditions can include ground faults, over-voltage, over-current, short-circuit, open circuit, etc. In one embodiment, the automated residential heating device controller 4202 can transmit the fault condition to the cloud based server 4208 via the wireless adapter 4204. If a nonrecoverable fault condition is not detected, the parameters associated with the automated residential heating device controller 4202 can continue to be monitored at process block 4604. Where a nonrecoverable fault is detected, the wireless gateway 4204 can transmit the fault data to the cloud based server 4208 at process block 4608. The cloud based server 4208 can then push an alert message to a user device 4212 to inform the user of the nonrecoverable fault at process block 4610 via the wireless adapter 4204. In one embodiment, the alert message can inform a user that maintenance is required.

At process block 4612, the user device 4212 can provide the user with an option to contact a service provider. In one embodiment, the user device 4212 can receive a message from the cloud based server 4208 to provide the user with the option to contact a service provider. Alternatively, the user device 4212 can automatically provide the option to contact a service provider when the user device 4212 receives the message from the cloud based server 4208 indicating the nonrecoverable fault has occurred. If the user selects not to contact a service provider at process block 4612, the process can end at process block 4614. If the user does choose to contact a service provider, a connection can be made to a maintenance server at process block 4616. In one embodiment, the maintenance server can be located in the cloud based server 4208. Alternatively, the maintenance server can be in a separate cloud based server. Further, the maintenance server can be the cloud based server 4208. In one embodiment, the user device 4212 can establish a connection with the maintenance server directly. Alternatively, the user device 4212 can transmit a message to the cloud based server 4208 indicating that the user has selected to contact the service provider. The cloud based server 4208 can then access the maintenance server.

In one embodiment, the maintenance server can contain contact information for service providers authorized to provide maintenance to the automated residential heating device controller 4202. The maintenance server can have access to a user profile of the user and/or the product registration data provided by the user, such as discussed above. Alternatively, information from the user profile and/or product registration can be provided to the maintenance server via the cloud based server 4208. Using the information contained in the user profile and/or product registration data, the maintenance server can filter the possible service providers based on product data (make, model, installation, years in service, etc.), as well as user data (geographic location, usual distributor, past maintenance, etc.). This can allow for the proper service provider to be contacted, which can allow for more efficient product repair.

In a further embodiment, parameters associated with the nonrecoverable fault can be analyzed in the cloud based server 4208. The cloud based server 4208 can analyze the parameters associated with the fault and provide the analysis to the maintenance server. Based on the analysis, the maintenance server can create a list of materials needed to perform the maintenance. Examples of potential replacement parts can include, heaters, power supplies, thermostats, sensors, thermocouples, controllers, etc. Further, if there is sufficient data regarding the installation of the product, additional replacement parts can be automatically generated. For example, certain repairs can require new fittings, such as mounting brackets, plugs, cold leads, etc. If a complete bill of material (BOM) is available to the cloud based server 4208 regarding the initial installation of the automated residential heating device controller 4202, the cloud based server 4208 can analyze the BOM to determine which additional parts may be needed. Additionally, in some embodiments the maintenance server can have access to stock levels of replacement parts on hand for the service providers. Once the proper service provider is determined, the maintenance and/or cloud based server 4208 server can evaluate the stock list of the relevant service provider to determine if there is sufficient stock to perform the needed repair. If not, the maintenance and/or cloud based server 4208 can place an order for the replacement parts needed to perform the repair. For example, the maintenance and/or cloud based server 4208 can order the replacement parts from other service providers. Further, the maintenance and/or cloud based server 4208 can order the parts from a distributor or dealer. Finally, in some instances, the maintenance and/or cloud based server 4208 can order the parts directly from the manufacturer. In some embodiment, the maintenance and/or cloud based server 4208 server can automatically order the replacement parts once the user chooses to contact a service provider. Alternatively, the cloud based server 4208 can push a message to the user device 4212 requiring the user to approve any orders. In some examples, the maintenance and/or cloud based server 4208 server can provide an actual or estimated cost of the required replacement parts that can be provided to the user. Further, the maintenance server can wait until authorization is provided from the service provider before any replacement parts are issued.

At process block 4618, the service provider can be contacted. In one embodiment, the maintenance and/or cloud based server 4208 can contact the service provider. The maintenance and/or cloud based server 4208 can contact the service provider in various ways. In one example, an electronic message can be transmitted to the service provider regarding the maintenance issue. Examples of electronic messages can include text messages (SMS, MMS, etc.), e-mail, instant message, etc. Further, the maintenance and/or cloud based server 4208 can contact the service provider by using an automated voice message. The messages provided to the service provider can include information relating to the contact information and address of the user, the nature of the problem, the fault and associated parameters, historical data (previous service performed, faults received over time, etc), and/or the list of expected replacement parts. Further, in some embodiments, the user can be presented with a questionnaire when the user chooses to contact the service provider. The questionnaire can allow the user to select best times and methods for contacting the user and best times for the service provider to schedule the appointment. In further embodiments, the maintenance and/or cloud based server 4208 can have access to a scheduling/work order system of the service provider and can schedule an appointment automatically in the system.

Figure 47:
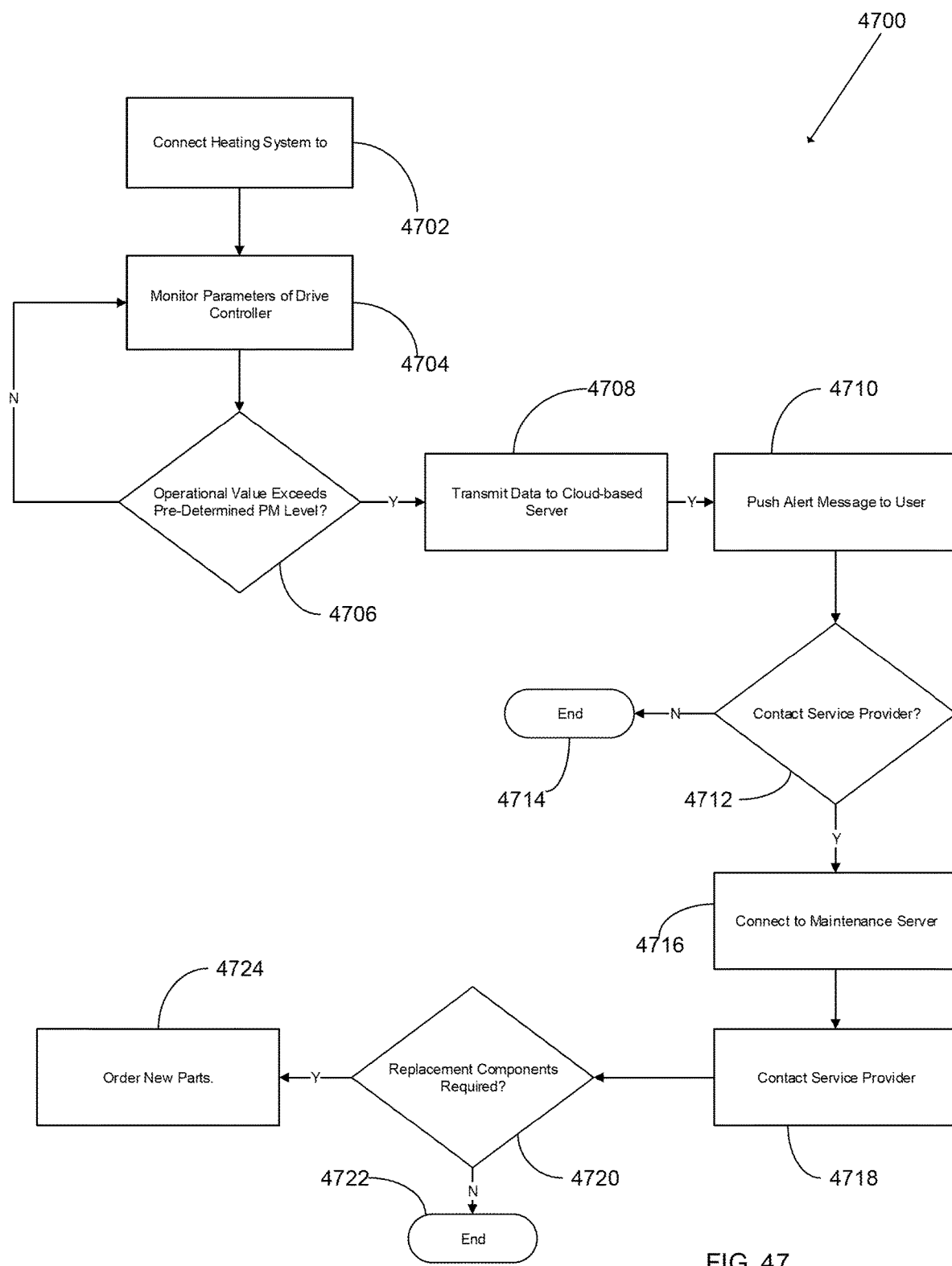
FIG. 47 is a flow chart of a preventative maintenance process for an automated residential heating device control system.

FIG. 47 illustrates a preventative maintenance process 4700. At process block 4702, the automated residential heating device controller 4202 can connected to the cloud based server 4208 at process block 4702. At process block 4704, parameters associated with the automated residential heating device controller 4202 can be monitored. In one embodiment, the automated residential heating device controller 4202 can monitor the parameters, which can then be transmitted to the cloud based server 4208 via the wireless adapter 4204. Alternatively, the wireless adapter 4204 can monitor the parameters. Parameters can include those listed above, as well as fault conditions, including ground faults, over-voltage faults, over-current faults, short circuit faults, open-circuit faults, or other relevant faults. At process block 4706, it can be determined if any of the parameters exceed predetermined preventative maintenance values. In one embodiment, the predetermined preventative maintenance values can be set by the user; alternatively, the predetermined values can be set within the automated residential heating device controller 4202 at the factory. In a further embodiment, the wireless adapter 4204 can determine if any fault condition parameters have been generated by the automated residential heating device controller 4202 at process block 4706 that would be related to the need for preventative maintenance, such as those discussed above. If no parameters exceed the predetermined preventative maintenance values at process block 4706, the process 4700 can return to process block 4704 and continue to monitor parameters associated with the automated residential heating device controller 4202. If a parameter is determined to exceed a predetermined preventative maintenance value at process block 4706, the wireless adapter 4204 can transmit data to the cloud based server 4208 indicating that one or more parameters have exceeded the predetermined preventative maintenance values at process block 4708. The cloud based server 4208 can then generate and push an alert message to the user device 4212 at process block 4710. In one embodiment, the cloud based server 4208 can push an alert message to a user's internet connected device 4212 using methods discussed above. In one embodiment, the alert message can inform the user that preventative maintenance is required for the automated residential heating device controller 4202.

At process block 4712, the user can be presented with an option to contact a service provider. In one embodiment, the user can be presented with the option to contact the service provider via the user device 4212. In a further embodiment, the user device 4212 can receive a message from the cloud based server 4208 to provide the user with the option to contact a service provider. Alternatively, the user device 4212 can automatically provide the option to contact a service provider when the user device 4212 receives the message from the cloud based server 4208, indicating one or more of the parameters have exceeded the predetermined preventative maintenance level(s). If the user chooses to not contact a service provider at process block 4712, the process can end at process block 4714. If the user does choose to contact a service provider, a connection can be made to a maintenance server at process block 4716. In one embodiment, the maintenance server can be located in the cloud based server 4208, as discussed above. Alternatively, the maintenance server can be in a separate cloud based server. Further, the maintenance server can be the cloud based server 4208. In one embodiment, the user device 4212 can establish a connection with the maintenance server directly. Alternatively, the user device 4212 can transmit a message to the cloud based server directly. Alternatively, the user device 4212 can transmit a message to the cloud based server 4208 indicating that the user has selected to contact the service provider. The cloud based server 4208 can then access the maintenance server to contact the service provider.

At process block 4718, the service provider can be contacted. In one embodiment, the maintenance and/or cloud based server 4208 can contact the service provider. The maintenance and/or cloud based server 4208 can contact the service provider in various ways. In one example, an electronic message can be transmitted to the service provider regarding the maintenance issue. Examples of electronic messages can include text messages (SMS, MMS, etc.), e-mail, instant message, etc. Further, the maintenance and/or cloud based server 4208 can contact the service provider by using an automated voice message. The messages provided to the service provider can include information relating to the contact information and address of the user, the nature of the problem, the fault and associated parameters, historical data (previous service performed, faults received over time, etc), and/or the list of expected replacement parts. Further, in some embodiments, the user can be presented with a questionnaire when the user chooses to contact the service provider. The questionnaire can allow the user to select best times and methods for contacting the user and best times for the service provider to schedule the appointment. In further embodiments, the maintenance and/or cloud based server 4208 can have access to a scheduling/work order system of the service provider, and can schedule an appointment automatically in the system.

At process block 4720, the maintenance and/or cloud based server 4208 can analyze the parameters exceeded the predetermined preventative maintenance values to determine what, if any, replacement components may be required. Based on the analysis, the maintenance server and/or cloud based server 4208 can create a list of materials needed to perform the preventative maintenance. Examples of potential replacement parts can include terminal blocks, control boards, thermocouples, heating cables, resistive heaters, plugs, controllers, power supplies, etc. Further, if there is sufficient data regarding the installation of the product, additional replacement parts can be automatically generated. For example, certain repairs can require new fittings, such as mounting brackets, plugs, etc. If a complete bill of material (BOM) is available to the cloud based server 4208 regarding the initial installation of the automated residential heating device control system 4200, the cloud based server 4208 can analyze the BOM to determine which additional parts may be needed.

If no replacement parts are needed, the process 4700 can end at process block 4722. However, if the analysis indicates that replacement parts will be needed, the maintenance and/or cloud based server 4208 can order the replacement parts at process block 4724. In some embodiments the maintenance server can have access to stock levels of replacement parts on hand for the service providers. Once the proper service provider is determined, the maintenance server can evaluate the stock list of the relevant service provider to determine if there is sufficient stock to perform the needed repair. If not, the maintenance server can place an order for the replacement parts needed to perform the repair. For example, the maintenance server can order the replacement parts from other service providers. Further, the maintenance server can order the parts from a distributor or dealer. Finally, in some instances, the maintenance server can order the parts directly from the manufacturer. In some embodiment, the maintenance server can automatically order the replacement parts once the user chooses to contact a service provider. Alternatively, the cloud based server 4208 can push a message to the user device 4212 requiring the user to approve any orders. In some examples, the maintenance server can provide an actual or estimated cost of the required replacement parts that can be provided to the user. Further, the maintenance and/or cloud based server 4208 can wait until authorization is provided from the service provider before any replacement parts are ordered.

The above systems can all collect and transmit data to a cloud based server for later analysis. In some instances, this data can be used by third parties for analysis. For example, municipal, state or federal agencies and departments (e.g., health departments, public works departments, the department of natural resources, etc.) can be sent the data for further analysis. In some embodiments, the data can be anonymized to scrub individual user information from the data. In some instances, the data can be organized geographically, regionally, or based on specific demographics within a certain area (e.g., residential user with pools and those without.) However, multiple methods of organizing the data can be used. In some embodiments, a report can be sent to the third party on a periodic basis, for example, daily, weekly, quarterly, etc. An example report can be commercial pool reports regarding various associated parameters (e.g., water usage, water quality, chemical levels, etc.). Further, utilities and utility providers can have access to the data to understand usage/consumption. In some examples, component level consumption can be provided to the utility. For example, a pool pump energy usage can be provided to a utility. In some instances, the utility can use the information to better optimize operations. In further embodiments, the data can provide redundant metering validation for the municipalities and or utilities.

Other examples of providing data to third parties can include providing environmental data to agencies such as the NOAA to provide localized ambient conditions. Additionally, the data can be sent to certification agencies such as UL, CSA, CER, NSF, etc. This data can be used by the certification agencies to validate their data related to products and/or systems. The data can further be used as diagnostic data for product suppliers. Additionally, the data can be used by original equipment manufacturers (OEM) for market research and/or product penetration purposes.

In some embodiments, batch data can be uploaded to a cloud based server from various connected devices. For example, the data can be pushed periodically, such as every 15 minutes, once per hour, once per day, etc. Similarly, batch data can be transmitted from the cloud based server to another server for further analysis, such as a third party server. This data can also be pushed periodically. In some instances, a particular event can cause the real time data to be pushed to a server or servers. For example, faults, alarms, component failures, etc., can all require the data to be immediately pushed to a cloud based server.

In another embodiment, product roadmaps can be developed based on the collected data. For example, on demand response and/or Energy Star Connected Functionality can be determined. Further, product roadmaps can be developed for single and multi-speed pumps, heaters, heat pumps, and lights, as well as all other components in the system. Further, roadmaps for products such as IntelliChem II and IntelliLevel from Pentair can be developed.

In addition to the features listed above, the described data analysis can be used for additional features, such as determining preventative maintenance on piston wear in motors, monitoring individual and aggregate component level trending patterns, reviewing collected data for diagnostic purposes, remote troubleshooting, and confirmation of configuration settings set during installation.

In other embodiments, the above disclosed information can be used with water purification systems, such as residential water purification systems. Similar to above, the water purification systems can upload parameters to a cloud based server, such as those discussed above. Example parameters can include motor data, such as current, voltage, speed, etc. Other parameters can include monitoring material levels, such as salt.

The data uploaded by the water purification systems can allow for various predictive and analytic data to be provided to a user or others with access. For example, by monitoring the salt levels, regular and proactive maintenance (i.e., maintenance of salt levels) can be determined. For example, and similar to above, the cloud based server can determine that a salt level is low, or soon will be low, and order replacement salt to ensure constant water purification is possible. This predictive analysis can help prevent downtime and ensure constant operation of the water purification system. Further, the motor current and/or other associated parameters can be analyzed to allow for a life expectancy of the motor to be generated. The prognosticated life expectancy of the motor can be used to provide predictive maintenance schedules, which can be used to ensure components are available when their need is expected. Additionally, water usage trending can be analyzed. Further, due to the fact that data can be taken and analyzed over a large period of time, seasonal usage trends can be developed, which can further aid in predictive maintenance of the purification system. Additionally, regeneration cycle patterns can be generated. Finally, in some examples, the water usage can be correlated with the number of tanks on commercial system for sizing validation. Further, additional data, such as the Total Dissolved Solids (TDS) in a water sample can be provided to the cloud based server as well for analysis.

In other examples, predictive data analysis can include performing prediction analysis on data to determine the likelihood of flooding in a residential home, such as in a basement. Consumer data and historical weather patterns can be aggregated and correlated to aid in generating the predictive analysis. In some examples, weather data, geographic data, GPS data, and component performance data can be correlated to generate a trend analysis. The trend analysis can be accessed by a user to plan for potential flooding. Further, the predictive flood analysis can be used to provide marketing and sales material based on regions and flood likelihoods.

In some embodiments, the aggregated data can be used to generate a preventative maintenance plan. By using the aggregated data, preventative maintenance programs can be put into place to reduce down-time. Further, by using data and data analysis to generate preventative maintenance schedules, fewer service centers are needed due to the reduction in emergency repairs. Further, predictive maintenance and failure data can be integrated into a distributor's or user's Enterprise Resource Planning (ERP) software. This can reduce downtime by ensuring that long-lead time parts and components are ordered sufficiently in advance to ensure availability based on expected failures. Further, inventory can be reduced by only stocking those parts expected to be used within a short time frame after receipt. In a further embodiment, nonconnected product operation can be inferred through collected sensor data. For example, monitoring water level cycles can provide information relating to operation of the pumping system.

Moreover, predictive and preventative maintenance programs as described above can be used to generate service fee models for a commercial and/or residential market. For example, a flat fee arrangement or yearly subscription program can be implemented that is based on the available analytic data to ensure maintenance is provided only when needed to provide a reduced cost program for a customer while ensuring an efficient service plan by the service provider. In certain residential markets, an upfront cost can be added to the purchase to cover additional service over a period of time. Finally, an extended warranty program can be developed based on the analytic data. For example, extended warranties can be based on known product usage, as well as aggregated predictive product life models.

Furthermore, the analytic data described above can provide increased energy efficiency based on performance optimization, component level prognostics and diagnostics, early warning alerts for flood prevention, improved warranties, confirmation of proper component installation, and field level performance data. Additionally, the analytic data can be provided to third party users for further analysis. For example, insurance companies can use the aggregated information for flood analysis. Further, utility providers and regulatory agencies can be provided the information for analysis on usages. For example, agricultural power and water usage trends. Finally, supplier bases can be provided the information for further analysis of failure modes.

Further embodiments can include sensors in sensitive areas, such as sump pits and/or crocks in residential or commercial applications. In some applications, a radon sensor can be in communication with a cloud based server using a wireless adapter, as described above. The radon sensor can detect a radon level in or around a sump pit and provide an alert to a user, via the cloud based server, when the radon level exceeds a pre-defined level. Further, water level sensors can further be in communication with a cloud based server via a wireless adapter for providing alerts to a user when a water level rises above, or falls below, a pre-defined level.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

The invention claimed is:

1. A method of remotely monitoring a chemical controller for use with a pool or spa, the method comprising:
    assigning an internet protocol address to the chemical controller;
    connecting a wireless adapter to the chemical controller;
    establishing a wireless connection between the wireless adapter and a cloud based server via a wireless gateway;
    establishing communication between the cloud based server and a remote user device;
    uploading a chemical level parameter and a geographic location from the chemical controller to the cloud based server;
    receiving at the cloud based server environmental data for the geographic location;
    providing for remote monitoring of the chemical level parameter from the remote user device over the wireless connection;
    updating the chemical level parameter provided to the remote user device in response to a refresh gesture being performed on an interface of the remote user device;
    determining whether the chemical level parameter is less than or greater than a predetermined value;
    operating the chemical controller to dispense chemicals based on whether the chemical level parameter is less than or greater than the predetermined value, the environmental data for the geographic location, and a particular day or a particular time of day.

2. The method of claim 1 wherein the environmental data includes at least one of air temperature, water temperature, rainfall level, humidity, and wind speed.

3. The method of claim 1, further comprising operating the chemical controller to dispense the chemicals at the particular time of day.

4. The method of claim 1 further comprising operating the chemical controller to dispense the chemicals on the particular day.

5. The method of claim 1 and further comprising uploading from the chemical controller to the cloud based server at least one of a flow level, a chemical supply level, a water chemical level, a temperature, a time of day, a chemical dosage, a chemical addition time, and water reservoir data.

6. The method of claim 5 wherein the water chemical level includes at least one of chlorine, salt, and pH.

7. The method of claim 1 wherein the chemical controller is at least one of a chlorinator, a pH-balance chemical system, and a salt-to-chlorine converter.

8. The method of claim 1 and further comprising sending an approval message to the remote user device requiring a user to approve ordering replacement chemicals from at least one preselected vendor.

9. The method of claim 1 and further comprising providing to the cloud based server preselected vendors associated with a user account.

10. The method of claim 1 and further comprising receiving from the remote user device and providing to the cloud based server preselected replacement chemical information including at least one of brand, concentration, quantity, and packaging.

11. The method of claim 1 and further comprising accessing a maintenance server to obtain at least one of a user profile and product registration data.

12. The method of claim 11 and further comprising filtering preselected vendors based on the geographic location.

13. The method of claim 1 and further comprising providing for remote monitoring of water quality parameters including at least one of pH, oxidation, reduction potential, conductivity, and turbidity.

14. The method of claim 1 and further comprising transmitting a pool report for the geographic location to the remote user device, the pool report including at least one of water usage, water quality, chemical levels, and energy usage.

15. The method of claim 1 and further comprising generating by the cloud based server chemical dispensing cycle patterns based on at least one of seasonal usage trends and historical weather patterns.

16. A method of remotely monitoring a chemical controller for use with a pool or spa, the method comprising:
- assigning an internet protocol address to the chemical controller;
- connecting a wireless adapter to the chemical controller;
- establishing a wireless connection between the wireless adapter and a cloud based server via a wireless gateway;
- establishing communication between the cloud based server and a remote user device;
- uploading a chemical level parameter and a geographic location from the chemical controller to the cloud based server;
- providing for remote monitoring of the chemical level parameter from the remote user device over the wireless connection;
- updating the chemical level parameter provided to the remote user device in response to a refresh gesture being performed on an interface of the remote user device;
- determining periodically whether the chemical level parameter is less than a predetermined value;
- sending messages to the cloud based server when the chemical level parameter is less than the predetermined value; and
- generating a trend analysis based on the messages to predict a date range when the chemical level parameter will be less than the predetermined value; and
- automatically dispensing chemicals at the geographic location during the date range.

17. The method of claim 16 and further comprising automatically placing an order for replacement chemicals for delivery to the geographic location.

18. The method of claim 17 and further comprising sending an approval message to the remote user device requiring a user to approve ordering replacement chemicals from at least one preselected vendor.

19. The method of claim 17 and further comprising providing to the cloud based server preselected vendors associated with a user account.

20. The method of claim 16 and further comprising receiving from the remote user device and providing to the cloud based server preselected replacement chemical information including at least one of brand, concentration, quantity, and packaging.

21. The method of claim 16 and further comprising accessing a maintenance server to obtain at least one of a user profile and product registration data.

22. The method of claim 21 and further comprising filtering preselected vendors based on the geographic location.

23. A method of remotely monitoring and controlling a chemical controller for use with a pool or spa, the method comprising:
- assigning an internet protocol address to the chemical controller;
- connecting a wireless adapter to the chemical controller;
- establishing a wireless connection between the wireless adapter and a cloud based server via a wireless gateway;
- establishing communication between the cloud based server and a remote user device;
- uploading a pH parameter from the chemical controller to the cloud based server;
- providing for remote monitoring of the pH parameter from the remote user device over the wireless connection;
- updating the chemical level parameter provided to the remote user device in response to a refresh gesture being performed on an interface of the remote user device;
- determining whether the pH parameter is greater than or less than a predetermined value;
- controlling from the remote user device over the wireless connection dispensing of chemicals by the chemical controller based on whether the pH parameter is greater than or less than the predetermined value.

24. The method of claim 23 and further comprising providing for remote monitoring of additional water quality parameters including at least one of oxidation, reduction potential, conductivity, and turbidity.

25. The method of claim 23 and further comprising generating by the cloud based server chemical dispensing cycle patterns.

26. The method of claim 25 and further comprising generating by the cloud based server chemical dispensing cycle patterns based on at least one of seasonal usage trends and historical weather patterns.

* * * * *